US011769070B2

(12) United States Patent
You et al.

(10) Patent No.: US 11,769,070 B2
(45) Date of Patent: Sep. 26, 2023

(54) QUANTUM COMPUTING BASED HYBRID SOLUTION STRATEGIES FOR LARGE-SCALE DISCRETE-CONTINUOUS OPTIMIZATION PROBLEMS

(71) Applicant: Cornell University, Ithaca, NY (US)

(72) Inventors: Fengqi You, Ithaca, NY (US); Akshay Ajagekar, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 17/767,247

(22) PCT Filed: Oct. 9, 2020

(86) PCT No.: PCT/US2020/055019
§ 371 (c)(1),
(2) Date: Apr. 7, 2022

(87) PCT Pub. No.: WO2021/072221
PCT Pub. Date: Apr. 15, 2021

(65) Prior Publication Data
US 2022/0414518 A1 Dec. 29, 2022

Related U.S. Application Data

(60) Provisional application No. 63/018,737, filed on May 1, 2020, provisional application No. 63/016,076, filed on
(Continued)

(51) Int. Cl.
*G06N 10/60* (2022.01)
*G06Q 10/04* (2023.01)

(52) U.S. Cl.
CPC ............ *G06N 10/60* (2022.01); *G06Q 10/04* (2013.01)

(58) Field of Classification Search
None
See application file for complete search history.

(56) References Cited

U.S. PATENT DOCUMENTS 10,339,466 B1 7/2019 Ding et al.
10,862,465 B1 12/2020 Cohen et al.
(Continued)

FOREIGN PATENT DOCUMENTS

CA 2681147 A1 * 10/2008 ............ B82Y 10/00
WO 2020072661 A1 4/2020

OTHER PUBLICATIONS

G. Papaioannou et al., "The Evolution of Cell Formation Problem Methodologies Based on Recent Studies (1997-2008): Review and Directions for Future Research," European Journal of Operational Research, May 10, 2011, 39 pages.
(Continued)

*Primary Examiner* — Alan Chen
(74) *Attorney, Agent, or Firm* — Ryan, Mason & Lewis, LLP

(57) ABSTRACT

Technologies for a quantum/classical hybrid approach to solving optimization problems is disclosed. In the illustrative embodiment, an optimization problem is decomposed into two sub-problems. The first sub-problem is solved on a classical computer, and a result from the first sub-problem is provided to a quantum computer. The quantum computer then solves the second sub-problem based on the result of the first sub-problem from the classical computer. The quantum computer can then provide a result to the classical computer to re-solve the first problem. The iterative calculation is continued until an end condition is met.

31 Claims, 13 Drawing Sheets

Related U.S. Application Data on Apr. 27, 2020, provisional application No. 62/913,146, filed on Oct. 9, 2019.

(56) References Cited

U.S. PATENT DOCUMENTS

| | | | |
|---|---|---|---|
| 2003/0167098 | A1 | 9/2003 | Walser et al. |
| 2008/0065573 | A1 | 3/2008 | Macready |
| 2008/0270331 | A1 | 10/2008 | Taylor et al. |
| 2008/0313114 | A1* | 12/2008 | Rose ............. G06N 10/00 712/E9.001 |
| 2011/0238378 | A1 | 9/2011 | Allen et al. |
| 2013/0132001 | A1 | 5/2013 | Yacout et al. |
| 2015/0205759 | A1 | 7/2015 | Israel et al. |
| 2016/0224515 | A1* | 8/2016 | Ronagh ............. G06F 17/11 |
| 2017/0177544 | A1* | 6/2017 | Zaribafiyan ......... G06N 5/01 |
| 2017/0364796 | A1 | 12/2017 | Wiebe et al. |
| 2018/0308007 | A1 | 10/2018 | Amin et al. |
| 2019/0080255 | A1* | 3/2019 | Allen ............. G06N 10/00 |
| 2019/0121566 | A1 | 4/2019 | Gold et al. |
| 2019/0220733 | A1 | 7/2019 | Fisher et al. |
| 2020/0118025 | A1 | 4/2020 | Romero et al. |
| 2020/0175408 | A1 | 6/2020 | Baughman et al. |
| 2020/0210876 | A1 | 7/2020 | Rolfe et al. |
| 2020/0401916 | A1 | 12/2020 | Rolfe et al. |
| 2020/0410384 | A1 | 12/2020 | Aspuru-Guzik et al. |

OTHER PUBLICATIONS

D. Bienstock, "Computational Study of a Family of Mixed-integer Quadratic Programming Problems," Mathematical Programming, vol. 74, Sep. 1999, 52 pages.

J. C. Meza et al., "A Direct Search Method for the Molecular Conformation Problem," Sandia National Laboratories, SAND93-8233, Unlimited Release, May 1993, 14 pages.

A. T. Phillips et al., "A Quadratic Assignment Formulation of the Molecular-Conformation Problem," Journal of Global Optimization, vol. 4, Mar. 1994, 14 pages.

W. E. Hart et al., "Pyomo: Modeling and Solving Mathematical Programs in Python," Mathematical Programming Computation, vol. 3, pp. 219-260.

J. Blazewicz et al., "The Job Shop Scheduling Problem: Conventional and New Solution Techniques," European Journal of Operational Research, vol. 93, No. 1, Aug. 23, 1996, 33 pages.

M. Gendreau et al., "Tabu Search," Chapter 2 in Handbook of Metaheuristics, International Series in Operations Research & Management Science 146, Sep. 30, 2010, pp. 41-59.

G. E. Santoro et al., "Optimization Using Quantum Mechanics: Quantum Annealing Through Adiabatic Evolution," Journal of Physics A: Mathematical and General, vol. 39, Aug. 18, 2006, pp. R393-R433.

R. S. Judson et al., "Do Intelligent Configuration Search Techniques Outperform Random Search for Large Molecules?" International Journal of Quantum Chemistry, vol. 44, No. 2, Sep. 5, 1992, pp. 277-290.

T. F. Havel et al., "The Combinatorial Distance Geometry Method for the Calculation of Molecular Conformation. I. A New Approach to an Old Problem," Journal of Theoretical Biology, vol. 104, No. 3, Oct. 7, 1983 pp. 359-381.

G. Xue, "Molecular Conformation on the CM-5 By Parallel Two-Level Simulated Annealing," Journal of Global Optimization, vol. 4, No. 2, Mar. 1, 1994, pp. 187-208.

H. Yu et al., "Neural Network and Genetic Algorithm-Based Hybrid Approach to Expanded Job-Shop Scheduling," Computers & Industrial Engineering, vol. 39, No. 3-4, Apr. 1, 2001, pp. 337-356.

U. Wemmerlöv et al., "Procedures for the Part Family/Machine Group Identification Problem in Cellular Manufacturing," Journal of Operations Management, vol. 6, No. 2, Feb. 1986, pp. 125-147.

J.-S. Chen et al., "Stepwise Decomposition Approaches for Large Scale Cell Formation Problems," European Journal of Operational Research, vol. 113, Feb. 16, 1999, pp. 64-79.

R. Lazimy, "Mixed-Integer Quadratic Programming," Mathematical Programming, vol. 22, Dec. 1982, pp. 332-349.

N. C. Suresh et al., "Group Technology and Cellular Manufacturing: Updated Perspectives," Introduction of Group Technology and Cellular Manufacturing: A State-of-the-Art Synthesis of Research and Practice, Kluwer Academic, 1998, 14 pages.

N. M. D. Oliveira et al., "QUBO Formulation For The Contact Map Overlap Problem," International Journal of Quantum Information, vol. 16, No. 8, Nov. 22, 2018, 19 pages.

International Search Report of PCT/US2020/055019, dated Jan. 27, 2021, 12 pages.

M. Neshat et al., "Artificial Fish Swarm Algorithm: A Survey of the State-of-the-Art, Hybridization, Combinatorial and Indicative Applications," Artificial Intelligence Review, vol. 42, May 6, 2012, pp. 965-997.

M. Booth et al., "Partitioning Optimization Problems for Hybrid Classical/Quantum Execution," D-WaveSystems Inc., Technical Report, Jan. 9, 2017, 13 pages.

A. Ajagekar et al., "Quantum Computing based Hybrid Solution Strategies for Large-scale Discrete-Continuous Optimization Problems," Computers & Chemical Engineering, vol. 132, Jan. 2020, 50 pages.

S. Koziel et al., "Computational Optimization, Methods and Algorithms," Studies in Computational Intelligence, vol. 356, Springer, 2011, 292 pages.

T. F. Edgar et al., "Optimization of Chemical Processes," 2nd Edition, McGraw-Hill Chemical Engineering Series, 2001, 666 pages.

L. T. Biegler et al., "Retrospective on Optimization," Computers and Chemical Engineering, vol. 28, Jul. 15, 2004, pp. 1169-1192.

I. E. Grossmann et al., "Part II: Future Perspective on Optimization," Computers and Chemical Engineering, vol. 28, Jul. 15, 2004, 54 pages.

C. A. Floudas et al., "A Review of Recent Advances in Global Optimization," Journal of Global Optimization, vol. 45, No. 3, Aug. 12, 2008, 36 pages.

S. Kirkpatrick et al., "Optimization by Simulated Annealing," Science, vol. 220, No. 4598, May 13, 1983, pp. 671-680.

C. Reeves, "Genetic Algorithms," Handbook of Metaheuristics, Chapters, 2010, pp. 55-82.

C. A. Mack, "Fifty Years of Moore's Law," IEEE Transactions of Semiconductor Manufacturing, vol. 24, No. 2, May 2011, pp. 202-207.

M. A. Nielsen et al., "Quantum Computation and Quantum Information," Cambridge University Press, 2010, 704 pages.

P. W. Shor, "Algorithms for Quantum Computation: Discrete Logarithms and Factoring," Proceedings 35th Annual Symposium on Foundations of Computer Science, Nov. 20-22, 1994, pp. 124-134.

L. K. Grover, "Quantum Mechanics Helps in Searching for a Needle in a Haystack," Physical Review Letters, vol. 79, Jul. 14, 1997, pp. 325-328.

A. W. Harrow et al., "Quantum Algorithm for Linear Systems of Equations," Physical Review Letters, vol. 103, No. 15, Oct. 9, 2009, 4 pages.

A. Montanaro, "Quantum Algorithms: An Overview," Nature, vol. 2, No. 15023, Jan. 12, 2016, 8 pages.

J. Preskill, "Quantum Computing in the NISQ Era and Beyond," arXiv:1801.00862v3, Jul. 31, 2018, 20 pages.

A. Ajagekar et al., "Quantum Computing for Energy Systems Optimization: Challenges and Opportunities," Energy, vol. 179, Jul. 15, 2019, 34 pages.

T. S. Humble et al., "Quantum Realism," Computer, vol. 52, Jun. 2019, pp. 13-17.

C. Coffrin et al., "Evaluating Ising Processing Units with Integer Programming," arXiv:1707.00355v2, Jun. 19, 2019, 19 pages.

T. T. Tran et al., "A Hybrid Quantum-Classical Approach to Solving Scheduling Problems," Proceedings of the Ninth International Symposium on Combinatorial Search, vol. 7, No. 1, Jul. 2016, pp. 98-106.

E. G. Rieffel et al., "A Case Study in Programming a Quantum Annealer for Hard Operational Planning Problems," Quantum Information Processing, arXiv:1407.2887v1, Jul. 14, 2014, 19 pages.

(56) References Cited

OTHER PUBLICATIONS

Y. Wang et al., "16-qubit IBM Universal Quantum Computer Can Be Fully Entangled," Nature Partner Journals Quantum Information, vol. 4, Sep. 27, 2018, 6 pages.
E. Gibney, "D-Wave upgrade: How Scientists Are Using the World's Most Controversial Quantum Computer," Nature, vol. 541, No. 7638, Jan. 26, 2017, pp. 447-448.
L. Gyongyosi et al., "Quantum Circuit Design for Objective Function Maximization in Gate-Model Quantum Computers," arXiv:1803.02460v2, Sep. 3, 2019, 33 pages.
T. Kadowaki et al., "Quantum Annealing in the Transverse Ising Model," Physical Review E—Statistical Physics, Plasmas, Fluids, and Related Interdisciplinary Topics, arXiv:cond-mat/9804280v1, Apr. 25, 1998, 23 pages.
D. Aharonov et al., "Adiabatic Quantum Computation is Equivalent to Standard Quantum Computation," SIAM Journal of Computing, arXiv:quant-ph/0405098v2, Mar. 26, 2005, 30 pages.
E. Zahedinejad et al., "Combinatorial Optimization on Gate Model Quantum Computers: A Survey," arXiv:1708.05294v1, Aug. 16, 2017, 19 pages.
H. Johnston, "Quantum-computing Firm Opens the Box," https://physicsworld.com/a/quantum-computing-firm-opens-the-box/#:~:text=A%20small%20firm%20based%20in,part%20of%20its%20technology%20works. May 12, 2011, 4 pages.
A. Lucas, "Ising Formulations of Many NP Problems," Frontiers in Physics, vol. 2, No. 5, Feb. 2014, 15 pages.
C. Klymko et al., "Adiabatic Quantum Programming: Minor Embedding With Hard Faults," Quantum Information Processing, arXiv:1210.8395v2, Nov. 7, 2012, 12 pages.
K. E. Hamilton et al., "Identifying the Minor Set Cover of Dense Connected Bipartite Graphs via Random Matching Edge Sets," Quantum Information Processing, arXiv:1612.07366v1, Dec. 21, 2016, 9 pages.
T. D. Goodrich et al., "Optimizing Adiabatic Quantum Program Compilation using a Graph-Theoretic Framework," Quantum Information Processing, arXiv:1704.01996v2, Jul. 27, 2017, 26 pages.
S. Okada et al., "Improving Solutions by Embedding Larger Subproblems in a D-Wave Quantum Annealer," Scientific Reports, vol. 9, No. 2098, Feb. 14, 2019, 10 pages.
J. Cai et al., "A Practical Heuristic for Finding Graph Minors," arXiv:1406.2741v1, Jun. 10, 2014, 16 pages.
T. S. Humble et al., "An Integrated Development Environment for Adiabatic Quantum Programming," Computational Science & Discovery, arXiv:1309.3575v1, Sep. 13, 2013, 26 pages.
D-Wave Systems Inc., "D-Wave System Documentation," https://docs.dwavesys.com/docs/latest/index.html, Accessed Mar. 21, 2022, 2 pages.
D. Venturelli et al., "Quantum Optimization of Fully Connected Spin Glasses," Physical Review X, vol. 5, Sep. 18, 2015, 8 pages.
V. S. Denchev et al., "What is the Computational Value of Finite-Range Tunneling?" Physical Review X, vol. 6, Aug. 1, 2016, 19 pages.
A. Perdomo-Ortiz et al., "Finding Low-energy Conformations of Lattice Protein Models by Quantum Annealing," Scientific Reports, vol. 2, No. 571, Aug. 13, 2012, 7 pages.
D. Venturelli et al., "Job Shop Scheduling Solver based on Quantum Annealing," 26th International Conference on Automated Planning and Scheduling, arXiv:1506.08479v2, Oct. 17, 2016, 15 pages.
F. Neukart et al., "Traffic Flow Optimization Using a Quantum Annealer," Frontiers in ICT, vol. 4, No. 29, Dec. 20, 2017, 6 pages.
D. Applegate et al., "A Computational Study of the Job-Shop Scheduling Problem," ORSA Journal on Computing, vol. 3, No. 2, Spring 1991, pp. 149-156.
C. D. Maranas et al., "Global Minimum Potential Energy Conformations of Small Molecules," Journal of Global Optimization, vol. 4, Mar. 1, 1004, pp. 135-170.
C. D. Maranas et al., "A Deterministic Global Optimization Approach for Molecular Structure Determination," The Journal of Chemical Physics, vol. 100, No. 2, Jan. 15, 1994, pp. 1247-1261.
T. Babej et al., "Coarse-grained Lattice Protein Folding on a Quantum Annealer," arXiv:1811.00713v1, Nov. 2, 2018, 12 pages.
R. S. Maier et al., "A Discrete-continuous Algorithm for Molecular Energy Minimization," Proceedings of the 1992 ACM/IEEE Conference on Supercomputing, Dec. 1992, pp. 778-786.
I. Harjunkoski et al., "Decomposition Techniques for Multistage Scheduling Problems Using Mixed-integer and Constraint Programming Methods," Computers & Chemical Engineering, vol. 26, Apr. 2002, 29 pages.
V. Jain et al., "Algorithms for Hybrid MILP/CP Models for a Class of Optimization Problems," Informs Journal on Computing, Feb. 6, 2001, 36 pages.
P. K. Dash et al., "Application of Minimal Radial Basis Function Neural Network to Distance Protection," IEEE Transactions on Power Delivery, vol. 16, No. 1, Jan. 2001, pp. 68-74.
M. A. Carreira-Perpinan et al., "On Contrastive Divergence Learning," Proceedings of the Tenth International Workshop on Artificial Intelligence and Statistics, Jan. 2005, 8 pages.
L. Xu et al., "A Classification Approach for Power Distribution Systems Fault Cause Identification," IEEE Transactions on Power Systems, vol. 21, No. 1, Feb. 2006, pp. 53-60.
International Search Report of PCT/US2021/017801, dated Feb. 2, 2022, 14 pages.
S. J. Nawaz et al., "Quantum Machine Learning for 6G Communication Networks: State-of-the-Art and Vision for the Future," IEEE Open Access, vol. 7, Apr. 17, 2019, pp. 46317-46350.
A. Ajagekar et al., "Quantum Computing Assisted Deep Learning for Fault Detection and Diagnosis in Industrial Process Systems," arXiv:2003.00264v2, Oct. 2, 2020, 35 pages.
C. Shang et al., "Data Analytics and Machine Learning for Smart Process Manufacturing Recent Advances and Perspectives in the Big Data Era," Engineering, vol. 5, Oct. 18, 2019, pp. 1010-1016.
J. Macgregor et al., "Monitoring, Fault Diagnosis, Fault-Tolerant Control and Optimization: Data Driven Methods," Computers & Chemical Engineering, vol. 47, Dec. 20, 2012, 12 pages.
S. Feld et al., "A Hybrid Solution Method for the Capacitated Vehicle Routing Problem Using a Quantum Annealer," arXiv:1811.07403v2, Jun. 14, 2019, 19 pages.
G. Laporte et al., "Classical and Modern Heuristics for the Vehicle Routing Problem," International Transactions in Operational Research, vol. 7, Sep. 1, 2000, pp. 285-300.
P. Munari et al., "A Generalized Formulation for Vehicle Routing Problems," arXiv:1606.01935v2, Sep. 16, 2017, 19 pages.
P. Ji et al., "Quadratic Programming for the Vehicle Routing Problem," The 7th International Symposium on Operations Research and Its Applications, Nov. 2008, pp. 82-90.
T. Benoist et al., "Randomized Local Search for Real-life Inventory Routing," Transportation Science, Aug. 2011, 23 pages.
Z. Zhong et al., "Globally Convergent Exact and Inexact Parametric Algorithms for Solving Large-scale Mixed-integer Fractional Programs and Applications in Process Systems Engineering," Computers & Chemical Engineering, vol. 61, Feb. 11, 2014, pp. 90-101.
Y. Chu et al., "Integrated Scheduling and Dynamic Optimization of Complex Batch Processes with General Network Structure Using a Generalized Benders Decomposition Approach," Industrial & Engineering Chemistry Research, vol. 52, May 13, 2013, pp. 7867-7885.
P. Toth et al., "An Overview of Vehicle Routing Problems," in The Vehicle Routing Problem, Society for Industrial and Applied Mathematics, 2002, pp. 1-26.
P. Toth et al., "Exact Solution of the Vehicle Routing Problem," in Fleet Management and Logistics, Springer, 1998, pp. 1-31.
D. Yue et al., "Global Optimization of Large-Scale Mixed-Integer Linear Fractional Programming Problems: A Reformulation-Linearization Method and Process Scheduling Applications," AIChE Journal, Nov. 2013, vol. 59, No. 11, pp. 4255-4272.
Y. Chu et al., "Integration of Production Scheduling and Dynamic Optimization for Multi-Product CSTRS: Generalized Benders Decomposition Coupled with Global Mixed-Integer Fractional Programming," Computers & Chemical Engineering, vol. 58, Nov. 11, 2013, pp. 315-333.

(56) References Cited

OTHER PUBLICATIONS

Y. Chu et al., "Integration of Scheduling and Dynamic Optimization of Batch Processes under Uncertainty: Two-Stage Stochastic Programming Approach and Enhanced Generalized Benders Decomposition Algorithm," Industrial & Engineering Chemistry Research, vol. 52, Oct. 18, 2013, pp. 16851-16869.

J. Gao et al., "Shale Gas Supply Chain Design and Operations toward Better Economic and Life Cycle Environmental Performance: MINLP Model and Global Optimization Algorithm," ACS Sustainable Chemistry & Engineering, vol. 3, May 31, 2015, pp. 1282-1291.

N. Wiebe et al., "Quantum Algorithm for Data Fitting," Physical Review Letters, arXiv:1204.5242v2, Jul. 3, 2012, 6 pages.

S. Aaronson, "Quantum Machine Learning Algorithms: Read the Fine Print." Nature Physics, vol. 11, No. 4, Apr. 2015, 5 pages.

X. Gao et al., "An Efficient Quantum Algorithm for Generative Machine Learning," arXiv:1711.02038v1, Nov. 6, 2017, 22 pages.

S. H. Adachi et al., "Application of Quantum Annealing to Training of Deep Neural Networks," arXiv:1510.06356v1, Oct. 21, 2015, 18 pages.

I. Kerenidis et al., "Quantum Recommendation Systems," arXiv:1603.08675v3, Sep. 22, 2016, 22 pages.

L. H. Chiang et al., "Fault Diagnosis in Chemical Processes Using Fisher Discriminant Analysis, Discriminant Partial Least Squares, and Principal Component Analysis," Chemometrics and Intelligent Laboratory Systems, vol. 50 Jan. 2000, pp. 243-252.

S. Yin et al., "A Comparison Study of Basic Data-Driven Fault Diagnosis and Process Monitoring Methods on The Benchmark Tennessee Eastman Process," Journal of Process Control, vol. 22, Jul. 21, 2012, pp. 1567-1581.

V. Venkatasubramanian et al., "A Review of Process Fault Detection and Diagnosis Part III: Process History Based Methods," Computers & Chemical Engineering, Mar. 15, 2003, vol. 27, No. 3, pp. 327-346.

T. Sorsa et al., "Application of Artificial Neural Networks in-Process Fault-Diagnosis," IFAC Proceedings Volumes, vol. 24, No. 6, Sep. 1991, pp. 423-428.

V. Venkatasubramanian et al., "A Neural Network Methodology for Process Fault Diagnosis," AIChE Journal, vol. 35, No. 12, Dec. 1989, pp. 1993-2002.

F. Lv et al., "Fault Diagnosis Based on Deep Learning," American Control Conference, Jul. 6-8, 2016, pp. 6851-6856.

T. Albash et al., "Adiabatic Quantum Computing," Reviews of Modern Physics, arXiv:1611.04471v2, Feb. 2, 2018, 71 pages.

M. Kano et al., "A New Multivariate Statistical Process Monitoring Method Using Principal Component Analysis," Computers and Chemical Engineering, vol. 25, Aug. 15, 2001, pp. 1103-1113.

J. F. Macgregor et al., "Process Monitoring and Diagnosis by Multiblock PLS Methods," AIChE Journal, vol. 40, No. 5, May 1994 pp. 826-838.

J.-M. Lee et al., "Statistical Process Monitoring with Independent Component Analysis," Journal of Process Control, vol. 14, No. 5, Aug. 2004, pp. 467-485.

J. Roland et al., "Noise Resistance of Adiabatic Quantum Computation Using Random Matrix Theory," Physical Review A, arXiv:quant-ph/0409127v1, Sep. 20, 2004, 9 pages.

D. S. Wild et al., "Adiabatic Quantum Search in Open Systems," Physical Review Letters, arXiv:1606.01898v2, Oct. 7, 2016, 16 pages.

M. H. S. Amin et al., "Thermally Assisted Adiabatic Quantum Computation," Physical Review Letters, arXiv:cond-mat/0609332v3, Feb. 1, 2008, 4 pages.

P. Smolensky, "Information Processing in Dynamical Systems: Foundations of Harmony Theory," Chapter 6 in Parallel Distributed Processing: Explorations in the Microstructure of Cognition: Foundations, Feb. 1986, pp. 194-281.

G. E. Hinton et al., "Reducing the Dimensionality of Data with Neural Networks," Science, vol. 313, Jul. 28, 2006, pp. 504-507.

R. Salakhutdinov et al., "Restricted Boltzmann Machines for Collaborative Filtering," Proceedings of the 24th International Conference on Machine Learning, Jun. 20-24, 2007, 8 pages.

A.-R. Mohamed et al., "Phone Recognition Using Restricted Boltzmann Machines," IEEE International Conference on Acoustics, Speech and Signal Processing, Mar. 14-19, 2010, 4 pages.

A. Fischer et al., "Training Restricted Boltzmann Machines: An Introduction," Pattern Recognition, vol. 47, No. 1, Jan. 2014, 27 pages.

J. J. Hopfield, "Neural Networks and Physical Systems with Emergent Collective Computational Abilities," Proceedings of the National Academy of Sciences, vol. 79, Apr. 1982, pp. 2554-2558.

G. Hinton, "A Practical Guide to Training Restricted Boltzmann Machines," Version 1, Aug. 2, 2010, 21 pages.

G. E. Hinton, "Training Products of Experts by Minimizing Contrastive Divergence," Neural Computation, vol. 14, No. 8, Aug. 2002, pp. 1771-1800.

G. E. Hinton, "Deep Belief Networks," Scholarpedia, vol. 4, No. 5, May 2009, 4 pages.

M. Welling et al., "Exponential Family Harmoniums with an Application to Information Retrieval," Proceedings of the 17th International Conference on Neural Information Processing Systems, Dec. 2004, pp. 1481-1488.

G. E. Hinton et al., "A Fast Learning Algorithm for Deep Belief Nets," Neural Computation, vol. 18, No. 7, Jul. 2006, pp. 1527-1554.

A. Perdomo-Ortiz et al., "Determination and Correction of Persistent Biases in Quantum Annealers," arXiv:1503.05679v1, Mar. 19, 2015, 11 pages.

Z. Bian et al., "Solving SAT and MaxSAT with a Quantum Annealer: Foundations, Encodings, and Preliminary Results," arXiv:1811.02524v1, Nov. 6, 2018, 56 pages.

M. Benedetti et al., "Estimation of Effective Temperatures In Quantum Annealers for Sampling Applications: A Case Study with Possible Applications in Deep Learning," Physical Review A, arXiv:1510.07611v4, Aug. 9, 2006, 15 pages.

K. E. S. Pilario et al., "Mixed Kernel Canonical Variate Dissimilarity Analysis for Incipient Fault Monitoring in Nonlinear Dynamic Processes," Computers and Chemical Engineering, vol. 123, Apr. 6, 2019, 32 pages.

S. J. Reddi et al., "On the Convergence of Adam and Beyond," arXiv:1904.09237v1, Apr. 19, 2019, 23 pages.

J. J. Downs et al., "A Plant-Wide Industrial-Process Control Problem," Chemical Engineering, vol. 17, No. 3, Mar. 1993, pp. 245-255.

I. Sutskever et al., "On the Convergence Properties of Contrastive Divergence," Proceedings of the Thirteenth International Conference on Artificial Intelligence and Statistics, vol. 9, Mar. 31, 2010, pp. 789-795.

S. J. Qin, "Survey on Data-driven Industrial Process Monitoring and Diagnosis," Annual Reviews in Control, vol. 36, No. 2, Dec. 2012, pp. 220-234.

H. Wu et al., "Deep Convolutional Neural Network Model Based Chemical Process Fault Diagnosis," Computers and Chemical Engineering, vol. 115, Jul. 12, 2018, pp. 185-197.

A. K. Jain et al., "Dimensionality and Sample Size Considerations in Pattern Recognition Practice," Handbooks of Statistics, vol. 2, Chapter 39, 1982, pp. 835-855.

Z. Zhang et al., "A Deep Belief Network Based Fault Diagnosis Model for Complex Chemical Processes," Computers & Chemical Engineering, vol. 107, Dec. 2017, pp. 385-407.

M. J. Willis et al., "Artificial Neural Networks in Process Estimation and Control," Automatica, vol. 28, No. 6, Nov. 1992, pp. 1181-1187.

K. B. Lee et al., "A Convolutional Neural Network for Fault Classification and Diagnosis in Semiconductor Manufacturing Processes," IEEE Transactions on Semiconductor Manufacturing, vol. 30, No. 2, May 2017, pp. 135-142.

J.-M. Lee et al., "Fault Detection and Diagnosis Based on Modified Independent Component Analysis," AIChE Journal, vol. 52, No. 10, Oct. 2006, pp. 3501-3514.

Q. P. He et al., "A New Fault Diagnosis Method Using Fault Directions in Fisher Discriminant Analysis," AIChE Journal, vol. 51, No. 2, Feb. 2005, pp. 555-571.

(56) References Cited

OTHER PUBLICATIONS

J. C. Hoskins et al., "Fault Diagnosis in Complex Chemical Plants Using Artificial Neural Networks," AIChE Journal, vol. 37, No. 1, Jan. 1991, pp. 137-141.

L. Luo et al., "Hierarchical Monitoring of Industrial Processes for Fault Detection, Fault Grade Evaluation, and Fault Diagnosis," AIChE Journal, vol. 63, No. 7, Jul. 2017, pp. 2781-2795.

M. Kano et al., "Comparison of Multivariate Statistical Process Monitoring Methods with Applications to The Eastman Challenge Problem," Computers and Chemical Engineering, vol. 26, No. 2, Feb. 15, 2002, pp. 161-174.

A. Miao et al., "An Improved Fisher Discriminant Analysis Algorithm Based on Procrustes Analysis for Adaptive Fault Recognition," Measurement and Control, vol. 52, No. 7-8, Sep. 1, 2019, pp. 1063-1071.

L. H. Chiang et al., "Fault Detection and Diagnosis in Industrial Systems," Springer-Verlag London, 2001, 281 pages.

L. H. Chiang et al., "Fault Diagnosis Based on Fisher Discriminant Analysis and Support Vector Machines," Computers & Chemical Engineering, vol. 28, No. 8, Jul. 15, 2004, pp. 1389-1401.

E. Russell et al., "Data-driven Methods for Fault Detection and Diagnosis in Chemical Processes," Springer-Verlag London, 2000, 193 pages.

A. Perdomo-Ortiz et al., "Opportunities and Challenges for Quantum-Assisted Machine Learning in Near-Term Quantum Computers," arXiv:1708.09757v2, Mar. 19, 2018, 13 pages.

M. Benedetti et al., "Quantum-Assisted Learning of Hardware-Embedded Probabilistic Graphical Models," Physical Review X, vol. 7, Nov. 30, 2017, 17 pages.

Z. Gao et al., "A Survey of Fault Diagnosis and Fault-Tolerant Techniques Part I: Fault Diagnosis with Model-Based and Signal-Based Approaches," IEEE Transactions on Industrial Electronics, vol. 62, No. 6, Mar. 26, 2015, 12 pages.

J. Biamonte et al., "Quantum Machine Learning," arXiv:1611.09347v2, May 10, 2018, 24 pages.

J. F. Benders, "Partitioning Procedures for Solving Mixed-variables Programming Problems," Numerische Mathematik, vol. 4, 1962, pp. 238-252.

K. Chen et al., "Fault Detection, Classification and Location for Transmission Lines and Distribution Systems: A Review on the Methods," High Voltage, vol. 1, No. 1, Apr. 2016, pp. 25-33.

G. Laporte, "The Vehicle Routing Problem: An Overview of Exact and Approximate Algorithms," European Journal of Operational Research, vol. 59, Jun. 25, 1992, pp. 345-358.

B. Golden et al., "The Vehicle Routing Problem: Latest Advances and New Challenges," vol. 43, Springer Science & Business Media, 2008, 601 pages.

J. K. Lenstra et al., "Complexity of Vehicle Routing and Scheduling Problems," Econometric Institute Report 7917/0, Mar. 4, 1980, 15 pages.

University of Washington, "Power Systems Test Case Archive," http://labs.ece.uw.edu/pstca/, Accessed Jul. 28, 2022, 2 pages.

J. Sun et al., "Automated Fault Detection Using Deep Belief Networks for the Quality Inspection of Electromotors," Technisches Messen, vol. 81, No. 5, Apr. 28, 2014, pp. 255-263.

S. R. Samantaray, "Decision Tree-Based Fault Zone Identification and Fault Classification in Flexible AC Transmissions-Based Transmission Line," IET Generation, Transmission & Distribution, vol. 3, No. 5, May 2009, pp. 425-436.

G. W. Taylor et al., "Factored Conditional Restricted Boltzmann Machines for Modeling Motion Style," Proceedings of the 26th International Conference on Machine Learning, Jun. 2009, 8 pages.

A. Ajagekar et al., "Quantum Computing based Hybrid Deep Learning for Fault Diagnosis in Electrical Power Systems," Supplementary Information, Applied Energy, Aug. 23, 2021, 31 pages.

P. Y. Moon et al., "A Logic Based Expert System (LBES) for Fault Diagnosis of Power System," IEEE Transactions on Power Systems, vol. 12, No. 1, Feb. 1997, pp. 363-369.

G. T. Heydt et al., "Applications of the Windowed FFT to Electric Power Quality Assessment," IEEE Transactions on Power Delivery, vol. 14, No. 4, Oct. 1999, pp. 1411-1416.

D. Chanda et al., "A Wavelet Multiresolution Analysis for Location of Faults on Transmission Lines," International Journal of Electrical Power & Energy Systems, vol. 25, No. 1, Jan. 2003, pp. 59-69.

P. K. Dash et al., "Power Quality Analysis Using S-Transform," IEEE Transactions on Power Delivery, vol. 18, No. 2, Apr. 2003, pp. 406-411.

R. Aggarwal et al., "Artificial Neural Networks In Power Systems: Part 2—Types Of Artificial Neural Networks," Power Engineering Journal, vol. 12, No. 1, Feb. 1998, pp. 41-47.

U. B. Parikh et al., "Fault Classification Technique for Series Compensated Transmission Line Using Support Vector Machine," International Journal of Electrical Power & Energy Systems, vol. 32, No. 6, Jul. 2010, pp. 629-636.

K. M. Silva et al., "Fault Detection and Classification in Transmission Lines Based on Wavelet Transform and ANN," IEEE Transactions on Power Delivery, vol. 21, No. 4, Oct. 2006, pp. 2058-2063.

P. Tamilselvan et al., "Failure Diagnosis Using Deep Belief Learning Based Health State Classification," Reliability Engineering & System Safety, vol. 115, Jul. 2013, pp. 124-135.

Y. Wang et al., "Using Conditional Restricted Boltzmann Machines for Spectral Envelope Modeling in Speech Bandwidth Extension," IEEE International Conference on Acoustics, Speech and Signal Processing (ICASSP), Mar. 2016, pp. 5930-5934.

W. A. Dos Santos Fonseca et al., "Simultaneous Fault Section Estimation and Protective Device Failure Detection Using Percentage Values of the Protective Devices Alarms," IEEE Transactions on Power Systems, vol. 28, No. 1, Feb. 2013, pp. 170-180.

A. Ajagekar et al., "Quantum Computing based Hybrid Deep Learning for Fault Diagnosis in Electrical Power Systems," Applied Energy, vol. 303, Dec. 2021, 11 pages.

A. Ajagekar et al., "Quantum Computing Assisted Deep Learning for Fault Detection and Diagnosis in Industrial Process Systems," Computers & Chemical Engineering, vol. 143, Dec. 5, 2020, 17 pages.

A.M. Gaouda et al., "Pattern Recognition Applications for Power System Disturbance Classification," IEEE Transactions on Power Delivery, vol. 17, No. 2, Jul. 2002, 8 pages.

J. G. Vlachogiannis et al., "A Comparative Study on Particle Swarm Optimization for Optimal Steady-State Performance of Power Systems," IEEE Transactions on Power Systems, vol. 21, No. 4, Nov. 2006, pp. 1718-1728.

Z.-L. Gaing, "Wavelet-Based Neural Network for Power Disturbance Recognition and Classification," IEEE Transactions on Power Delivery, vol. 19, No. 4, Oct. 2004, pp. 1560-1568.

V. Mnih et al., "Conditional Restricted Boltzmann Machines for Structured Output Prediction," The 27th Conference on Uncertainty in Artificial Intelligence, Jul. 2011, 9 pages.

R. Salakhutdinov, "Learning Deep Generative Models," Annual Review of Statistics and Its Application, vol. 2, No. 1, 2015, pp. 361-385.

\* cited by examiner

QUANTUM COMPUTING BASED HYBRID SOLUTION STRATEGIES FOR LARGE-SCALE DISCRETE-CONTINUOUS OPTIMIZATION PROBLEMS

CROSS-REFERENCE TO RELATED APPLICATIONS

The present application claims the benefit of U.S. Provisional Patent Application No. 62/913,146 by Fengqi You and Akshay Ajagekar, filed Oct. 9, 2019, and entitled "QUANTUM COMPUTING BASED HYBRID SOLUTION STRATEGIES FOR LARGE-SCALE DISCRETE-CONTINUOUS OPTIMIZATION PROBLEMS." The present application claims the benefit of U.S. Provisional Patent Application No. 63/016,076 by Akshay Ajagekar and Fengqi You, filed Apr. 27, 2020, and entitled "QUANTUM COMPUTING BASED HYBRID SOLUTION STRATEGIES FOR LARGE-SCALE DISCRETE-CONTINUOUS OPTIMIZATION PROBLEMS." The present application claims the benefit of U.S. Provisional Patent Application No. 63/018,737 by Fengqi You and Akshay Ajagekar, filed May 1, 2020, and entitled "QUANTUM COMPUTING BASED HYBRID SOLUTION STRATEGIES FOR LARGE-SCALE DISCRETE-CONTINUOUS OPTIMIZATION PROBLEMS." The entirety of each of those provisional applications is incorporated herein by reference.

STATEMENT OF GOVERNMENT SUPPORT

The Government has rights in this invention pursuant to User Agreement NP-11-0404 between Cornell University and UT-Battelle, LLC, which manages and operates Oak Ridge National Laboratory for the US Department of Energy.

BACKGROUND

Solving large-scale optimization problems has practical applications, such as protein folding, vehicle routing, planning, scheduling, supply chain management, etc. However, classical computers cannot always solve large-scale optimization problems on a practical timescale. Quantum computing promises faster and better solutions to large-scale optimization problems, but the current scale of quantum computers limits the feasibility of solving large-scale problems directly on quantum computers.

SUMMARY

According to one aspect of the disclosure, a method for solving optimization problems comprises (i) initializing, by a classical computer, a plurality of parameters of an optimization problem comprising an original objective and optionally an original set of constraints, wherein the optimization problem is decomposed into at least two sub-problems manually or automatically by a pre-processing unit comprising a decomposer, optionally a classifier and optionally a library stored in a memory, wherein the optimization problem is decomposed into a first sub-problem to be solved by a first algorithm on the classical computer and a second sub-problem to be solved by a second algorithm on a quantum processor, wherein the first sub-problem has a first set of one or more variables and the second sub-problem has a second set of one or more variables, wherein each variable of the second set of one or more variables is different from each variable of the first set of one or more variables; (ii) executing the first algorithm for the first sub-problem with use of the classical computer to determine a current result of the first algorithm; (iii) executing the second algorithm for the second sub-problem with use of the quantum processor based on the current result of the first algorithm to determine a current result of the second algorithm; (iv) executing the first algorithm for the first sub-problem with use of the classical computer and with use of the current result of the second algorithm and optionally with use of the current result of the first algorithm to determine the current result of the first algorithm; (v) repeating steps (iii) and (iv) one or more times; (vi) stop the repeating steps until a preset convergence criteria is reached. In other embodiments, the step (i) is the same as above and the steps (ii)-(vi) are: (ii) executing the first algorithm for the first sub-problem with use of the quantum processor to determine a current result of the first algorithm; (iii) executing the second algorithm for the second sub-problem with use of the classical computer based on the current result of the first algorithm to determine a current result of the second algorithm; (iv) executing the first algorithm for the first sub-problem with use of the quantum processor and with use of the current result of the second algorithm and optionally with use of the current result of the first algorithm to determine an updated current result of the first algorithm; (v) executing the second algorithm for the second sub-problem with use of the classical computer and with use of the current result of the first algorithm and optionally with use of the current result of the second algorithm to determine an updated current result of the second algorithm; (vi) repeating steps (iv) and (v) one or more times; (vii) stop the repeating steps until a preset convergence criteria is reached. In some embodiments, the preset convergence criteria is determined by at least a portion of the current result (e.g., the current result, the updated current result after current updating, or the latest current result for the current result in the latest iteration) of the first algorithm and at least a portion of the current result (e.g., the current result, the updated current result after current updating, or the latest current result for the current result in the latest iteration) of the second algorithm, for example, an upper bound (or a lower bound) of an objective determined by the current result of the first algorithm converges to a lower bound (or an upper bound) of the objective determined by the current result of the second algorithm. In some embodiments, the preset convergence criteria is determined by a first data value derived from the current result of the first algorithm and a second data value derived from the current result of the second algorithm (in the same iteration), wherein the first data value converges to the second data value. In some embodiments, a global optimization result or a global optimal solution of the optimization problem and/or the original optimization problem can be achieved by using and achieving the above convergence criteria. In other embodiments, the preset convergence criteria could be determined by at least a portion of the current results of the latest two or three iterations of the first algorithm, at least a portion of the current results of the latest two or three iterations of the second algorithm, at least a portion of the combined or processed current results of the optimization problem in the latest two or three iterations, or any combination thereof. If the convergence criteria is determined by the latest two or three iterations, such as no improvement of results in the latest two or three iterations, at least a local optimization result would be achieved but a global optimization result cannot be guaranteed.

In some embodiments, the first sub-problem is selected from a mixed-integer linear programming (MILP) problem, a relaxed mixed-integer linear programming (MILP) problem, a mixed-integer non-linear programming (MINLP) problem, a linear programming (LP), a non-linear programming (NLP) problem, a Binary Quadratic programming (BQP) problem, a Mixed-integer Quadratic Programming (MIQP) problem, or a Mixed-integer Fractional Programming (MIFP) problem; and the second problem is a quadratic unconstrained binary optimization (QUBO) problem or an optimization problem solvable by a quantum computer or quantum processor directly and/or independently. In some embodiments, the first algorithm is selected from algorithms or optimization solvers for a mixed-integer linear programming (MILP) problem, a relaxed mixed-integer linear programming (MILP) problem, a mixed-integer non-linear programming (MINLP) problem, a linear programming (LP), a non-linear programming (NLP) problem, a binary quadratic programming (BQP) problem, a mixed-integer quadratic programming (MIQP) problem, or a mixed-integer fractional programming (MIFP) problem; and the second algorithm is selected from algorithms for a quadratic unconstrained binary optimization (QUBO) problem or for an optimization problem solvable by a quantum computer or quantum processor directly and/or independently.

The objective of the optimization problem is to minimize or maximize a function comprising a set of variables and a set of parameters. In some embodiments, objective of the optimization problem is selected but not limited from minimizing potential energy, minimizing cost, minimizing fees, minimizing resources, maximizing ratio of income to cost, minimizing or maximizing a summation, a fraction, a multiplication or the combination thereof of certain combinations of variables and parameters matching an optimization target for a physical system. Solving the optimization problem can be used to figure out the best arrangement of the physical system, the best structure or the most feasible structure of the physical system, the best design of the physical system, the best operations of the physical system, and/or the best results the physical system can achieve.

In some embodiments, the optimization problem is a cellular manufacturing problem. A cell manufacture system comprises multiple manufacturing cells that perform multiple manufacturing processes. In order to achieve an optimal design of the cell manufacture system for a goal such as minimizing manufacturing costs or maximizing manufacturing efficiency, a set of variables and a set of parameters for all the manufacturing cells or choices of the manufacturing cells are provided and an optimization model for the manufacturing cells are also provided. The cellular manufacturing optimization problem can be solved by the QC-classical computer hybrid system.

In some embodiments, the optimization problem is an integer quadratic fractional program (IQFP) problem, wherein the first algorithm is an operation for assigning a value to a parameter and the second algorithm is solving a quadratic unconstrained binary optimization (QUBO) problem based on the parameter.

In some embodiments, the optimization problem is a vehicle routing problem. The vehicle routing system comprises a map comprising feasible travel routes and one or a plurality of vehicles, wherein the vehicles could be selected from cars, trucks, buses, airplanes, ships, autonomous vehicles, and/or the combination thereof. A set of variables and a set of parameters are provided wherein at least a portion of the parameters could be determined by the properties of the map, properties of the vehicles, properties of current status of the system or material utilized in the system (e.g. gasoline price), dynamic updates of the systems and/or the combination thereof. The optimization problem can be solved by the hybrid quantum computer-classical computer hybrid system. The optimal results of the optimization problem and/or instructions to achieve the optimal results can be transmitted back to a central management or coordination unit of the vehicle control or dispatch system. Based on the optimal results, the central management or coordination unit can send out instructions to controls the operations of the vehicles.

In some embodiments, each variable of the second set of one or more variables is a binary variable. In some embodiments, the variables of the first set of one or more variables are selected from continuous variables, integer variables, binary variables, and/or the combination thereof.

In some embodiments, repeating steps (iii) and (iv) one or more times comprises repeating steps (iii) and (iv) one or more times until an optimal solution of the optimization problem is determined.

In some embodiments, the method may further comprise decomposing the optimization problem into the first sub-problem and the second sub-problem.

According to one aspect of the disclosure, a system for solving optimization problems comprises a classical computer comprising a classical processor and one or more non-transitory storage media comprising a plurality of instructions that, when executed, cause the classical computer to initialize a plurality of parameters of an optimization problem, wherein the optimization problem are decomposed to a first sub-problem to be solved by first algorithm on the classical computer and a second sub-problem to be solved by a second algorithm on a quantum processor, wherein the first sub-problem has a first set of one or more variables and the second sub-problem has a second set of one or more variables, wherein at least one variable of the second set of one or more variables is different from the variables of the first set of one or more variables and/or wherein at least one variable of the first set of one or more variables is different from the variables of the second set of one or more variables; execute the first algorithm for the first sub-problem with use of the classical computer to determine a current result of the first algorithm; further comprising a quantum processor to execute the second algorithm for the second sub-problem with use of the quantum processor based on the current result of the first algorithm to determine a current result of the second algorithm, wherein the plurality of instructions further cause the classical computer to execute the first algorithm for the first sub-problem with use of the classical computer and with use of the current result of the second algorithm to determine an updated current result of the first algorithm, wherein the classical computer and the quantum processor are configured to repeat the execution of the first algorithm based on the current result of the second algorithm and repeat execution of the second algorithm based on the current result of the first algorithm, respectively, one or more times.

In some embodiments, the first algorithm is for solving a relaxed mixed-integer linear programming (MILP) problem and the second algorithm is for solving a quadratic unconstrained binary optimization (QUBO) problem.

In some embodiments, the optimization problem is a scheduling problem, a planning problem, or a supply chain optimization problem. In some embodiments, the optimization problem is a job-shop scheduling or planning problem for enterprise resource planning (ERP) or manufacturing execution system (MES) or scheduling over time with a limited scope. A physical system comprises a plurality of tasks, a plurality of resources wherein each resources comprises at least one relevant costs and related tasks, and at least one measure for the performance of the physical system, wherein the physical system is but not limited to an enterprise system, a manufacturing system, a supply chain system, a production system, etc. An optimization problem is used to determine the allocation of the resources to the tasks over a time period in a way that a predefined performance measure is optimized. The optimization problem can be solved by the hybrid quantum-classical computing system. Based on the optimal results of the optimization problem, an instruction or a guidance is generated to allocate the provided resources to the provided tasks or a series of instructions, guidance, plan, or decisions are generated to allocate the provided resources to the provided tasks over time.

In some embodiments, the first algorithm is a dual linear programming (LP) problem and the second algorithm is a quadratic unconstrained binary optimization (QUBO) problem.

In some embodiments, the optimization problem is a molecular design or a product design problem. In some embodiments, the optimization problem is a molecular conformation design problems, which is used in the areas of drug design, protein folding, chemical design, chemistry, and biotechnology. A molecule or a design of molecule comprises a plurality of atom elements or functional group elements and a plurality of bonds between or among two or more of the atom elements or functional group elements. An optimization problem is used to determine an optimal measure of the molecule or the design of molecule such as the minimal potential energy, and the corresponding optimal structure of the molecule under the optimal measure (e.g. minimal potential energy) comprising the optimized atom elements or optimized functional group elements and the optimized bonds between or among two or more of the optimal atom elements or optimal functional group elements. The optimization problem can be solved by the QC-classical computer hybrid system. In some embodiments, the application further comprises synthesizing at least one molecule based on the optimal results of the optimization problem calculated by the QC-classical computer hybrid system. In some embodiments, the molecule is a protein, a drug, a therapeutic agent, a small molecule, a polymer, an enzyme, a receptor of a target cell or target molecule, or an inhibitor of another molecule.

In accordance with the present disclosure, a hybrid quantum computer-classical computer (QC-CC) based computation system, comprising: a quantum computer part (e. g. one or more quantum computers, or a quantum computer subsystem of a hybrid system) comprises a quantum processor configured to solve at least one type of computation problem (e.g. one type of optimization problem, or one type of computation problem that is convertible or can be reformulated to an optimization problem) and a communication engine configured to control a communication circuitry to send and/or receive data between the quantum computer part and a classical computer part (e.g. one or more classical computers) optionally via a local or remote network; and a classical computer part (e.g. one or more classical computers, or a classical computer subsystem of a hybrid system) comprises at least one classical processor, a communication engine, and at least one non-transitory computer readable medium to store at least one computation solver, and optionally a computation problem decomposer, wherein the communication engine is configured to send and/or receive data between the classical computer part and the quantum computer part and optionally between the local classical computer and other remote classical computers, wherein the classical computation solver comprises an optimization problem solver configured to solve at least one type of optimization problem, wherein a computation problem decomposer comprises an optimization problem decomposer configured to decompose an original (large scale) optimization problem into at least two sub-problems, wherein at least one of the sub-problems (e.g. a first sub-problem) is configured to be solvable by a quantum computer; wherein the quantum computer solves at least one of the sub-problems by the quantum processor using a first algorithm and send a current result of the first algorithm to the classical computer via the communication engine of the quantum computer; wherein the classical computer solves the rest of the sub-problems (e.g. a second sub-problem) by the classical computation solver using a second algorithm to get a current result of the second algorithm; and the classical computer further generates a computation result of the original computation problem (e.g. an optimal result of the original optimization problem) based on the current result of the first algorithm and the current result of the second algorithm. In some embodiments, the hybrid QC-CC based computation system solves a computation problem in more than one iterations (e.g. N+1 iterations), such that in the above hybrid QC-CC based computation system, the quantum computer further receives data based on or derived from the current result of the second algorithm, updates one or more parameters of the at least one of the sub-problems (e.g. the first sub-problem) and further solves the at least one of the sub-problems in the iteration N+1 by the quantum processor using a first algorithm to generate an updated current result of the first algorithm and send the updated current result of the first algorithm to the classical computer via the communication engine of the quantum computer; and wherein the classical computer further receives the updated current result of the first algorithm via the communication engine of the classical computer, updates one or more parameters of the rest of the sub-problems (e.g. the second sub-problem) and further solves the rest of the sub-problems in the iteration N+1 by the classical computation solver using the second algorithm to generate an updated current result of the second algorithm; wherein N is selected from an integer number of at least one (N≥1) and wherein N increases as iterations increases; and wherein the at least one sub-problem (e.g. a first sub-problem) is an optimization problem with objective functions (e.g. a first objective function), and/or the result of the sub-problems (e.g. a second sub-problem) are (is) also optimization problems with objective functions (e.g. a second objective function); wherein the first objective function, the second objective function and the original objective function are different. In general, an optimization problem comprises an objective function in a format of minimizing or maximizing a function with variables and optionally subject to a set of constraints wherein the constraints could be null (no constraints) or a list of equality equations or inequality equations, or the combination thereof; wherein the objective function and constraints comprises variables and parameters. In some embodiments, the original objective function has a format of minimizing or maximizing a summation of function A and function B (e.g. min (function A+ function B) or max (function A+function B)); the first objective function has a format of minimizing or maximizing a summation of function A and function f1 (e.g. min (function A+function f1) or max (function A+function f1)); the second objective function has a format of minimizing or maximizing a summation of function B and function f2 (e.g. min (function B+function f2) or max (function B+function f2)); wherein function f1 in the first objective function is related to the rest of sub-problems (e.g. the second sub-problem) and is updated based on the current solution of the second algorithm in each iteration; and wherein function f2 in the second objective function is related to the at least one of sub-problems (e.g. the first sub-problem) and is updated based on the current solution of the first algorithm. In some embodiments, the function f1 and function f2 are non-zero, and both function f1 and function f2 are updated in each iteration. In other embodiments, at least of the functions f1 or f2 is zero, and at most one function (f1 or f2) is updated in each iteration. In other embodiments, function f1 and function f2 are zero. The function f1 or f2 could be one or more parameters, one or more variables, or a function comprises combinations of parameters and variables. One such example is illustrated by using hybrid QC-MIQP decomposition method to solve a cell formation manufacturing problem. In other embodiments, the original optimization problem has an original objective function having a format of minimizing or maximizing (function A) and subjects to an original set of constraints; the first sub-problem has a first objective function having a format of minimizing or maximizing (function B) and subjects to no constraint or a constraint set formulated as objective function; and the second sub-problem has second objective function having a format of minimizing or maximizing (function A) and subjects to relaxed set of constraints includes a portion of the original constraints such that the constraints are looser (or less tight) than the original set of constraints. The relaxed set of constraints is looser mainly due to the number of constraints is smaller than the number of constraints in the original set and optionally due to looser range of constraints. The function B is related to or formulated by the lost constraints which are in the original set of constraints but not in the relaxed set of constraints of the sub-problem. One such example is illustrated by using the hybrid QC-MILP decomposition method to solve a job-shop scheduling problem. In some embodiments, one or more parameters in one sub-problem could be updated based on the computation result of another sub-problem. In other embodiments, one or more variables could be fixed by assigning a fixed value in solving the related sub-problem based on the computation results of a different sub-problem or the same sub-problem in one iteration and updated in another iteration based on the updated computation results of the sub-problem. In some embodiments, the computation problem is a computation model. In some embodiments, the computation model is for a molecular structure, a manufacturing structure and/or operations, a vehicle routing structures and/or operations, a resource allocation structure and/or operations, a decision making problem, and/or any other real-world problems.

In some embodiments, the above hybrid quantum computer-classical computer (QC-CC) based computation system stops the iterations until a preset convergence criteria is reached. In some embodiments, the preset convergence criteria is based on the updated current result of the first algorithm and the updated current result of the second algorithm, for example, the gap between an upper bound (or a lower bound) of an objective determined by the current result of the first algorithm and a lower bound (or an upper bound) of the objective determined by the updated current result of the second algorithm is lower than a preset small number (e.g. $10^{-3}$, or $10^{-6}$ etc.). In some embodiments, the preset convergence criteria is determined by a first data value derived from the updated current result of the first algorithm and a second data value derived from the updated current result of the second algorithm, wherein the first data value converges to the second data value. In some embodiments, a global optimization result or a global optimal solution of the optimization problem and/or the original optimization problem can be achieved by using and achieving the above convergence criteria. In other embodiments, the preset convergence criteria could be determined by at least a portion of the current results of the latest two or three iterations of the first algorithm, the second algorithm or the combination thereof. If the convergence criterion is determined by the latest two or three iterations, such as no improvement of results in the latest two or three iterations or the improvement is smaller than a threshold value, a local optimal or near optimal result would be achieved but a global optimal result is not guaranteed. In some embodiments, the stop of iterations is determined by or only determined by the convergence of the latest current result of the first algorithm (e.g. for the first sub-problem) and the latest current result of the second algorithm (e.g. for the second sub-problem) in the latest iteration or the same iteration, but not between different iterations. In some embodiments, the computation results for the first algorithm (e.g. for the first sub-problem) between a current result of iteration N and an updated current result of iteration N+1 are not used to determine the stop of iterations (e.g. convergence, any improvement of results, or no improvement of results) or not used to determine the final results; and/or the computation results for the second algorithm (e.g. for the second sub-problem) between a current result of iteration N and an updated current result of iteration N+1 are not used to determine the stop of iterations (e.g. convergence, any improvement of results, or no improvement of results) or not used to determine the final results.

In some embodiments, the original optimization problem has an original constraint set comprising an original list of constraints; the first sub-problem solvable by the quantum processor has no constraint set or a constraint set formulated as objective function and wherein a portion of the original constraints related to the first sub-problem can be optionally reformulated into the objective function of the first sub-problem as part of the function f1; the second sub-problem or the rest of sub-problems has a second constraint set comprising a second list of constraints wherein at least a portion of the second list of constraints are directly or derived from the original list of constraints, and optionally another portion of the second list of constraints are related to the first sub-problems and/or updated based on the updated current solution of the first algorithm solved by the quantum processor. In some embodiments, another portion of the second list of constraints do not exist in the original list of constraints and another portion of the second list of constraints comprises a cut, a bound, a cutting plane, an inequality equation, and/or an equation. In some embodiments, the number of constraints in the second sub-problem or the rest of sub-problems is more than the number of constraints in the original optimization problem. In other embodiments, the number of constraints in the second sub-problem or the rest of sub-problems is less than the number of constraints in the original optimization problem, such that the second sub-problem is a relaxed optimization problem of the original optimization problem.

In some embodiments, hybrid quantum computer-classical computer (QC-CC) based computation system further comprising a pre-processing unit or classification unit includes a problem classifier in a classical computer configured to classify or identify the type of a given original optimization problem; a library or database stored in a memory of a classical computer comprising decomposition methods for each type of optimization problems in a list of optimization problem types; and an optimization problem decomposer configured to decompose the given original optimization problem into two or more sub-problems based on type of original optimization problem as a result of the pre-processing unit or problem classifier and the decomposition methods stored in the library or database for the specific type of the original optimization problem. In some embodiments, the hybrid quantum computer-classical computer (QC-CC) based computation system further comprises or links to an instruction unit configured to send instructions based on the optimal solution of the optimization problem. The instruction unit could be selected from a controller, a management system, a central management platform, an onsite management system, a display, a user interface, or any combination thereof.

In some embodiments, the classical computer and the quantum processor are connected by a network. In other embodiments, a user submits an original optimization problem in a local classical computer, sends to a remote (QC-CC) based computation system comprising a remote quantum computer and a remote classical computer via a network. In some embodiments, the computation results are sent back to the user's local classical computer. In other embodiments, the computation results are sent to one or more target devices or equipment. In some embodiments, the computation results are formulated as instructions to control the operations of one or more target devices or equipment. The instructions could be substantially real-time (such as for real-time optimization), in time series (such as for a scheduling problem), dynamic or static.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
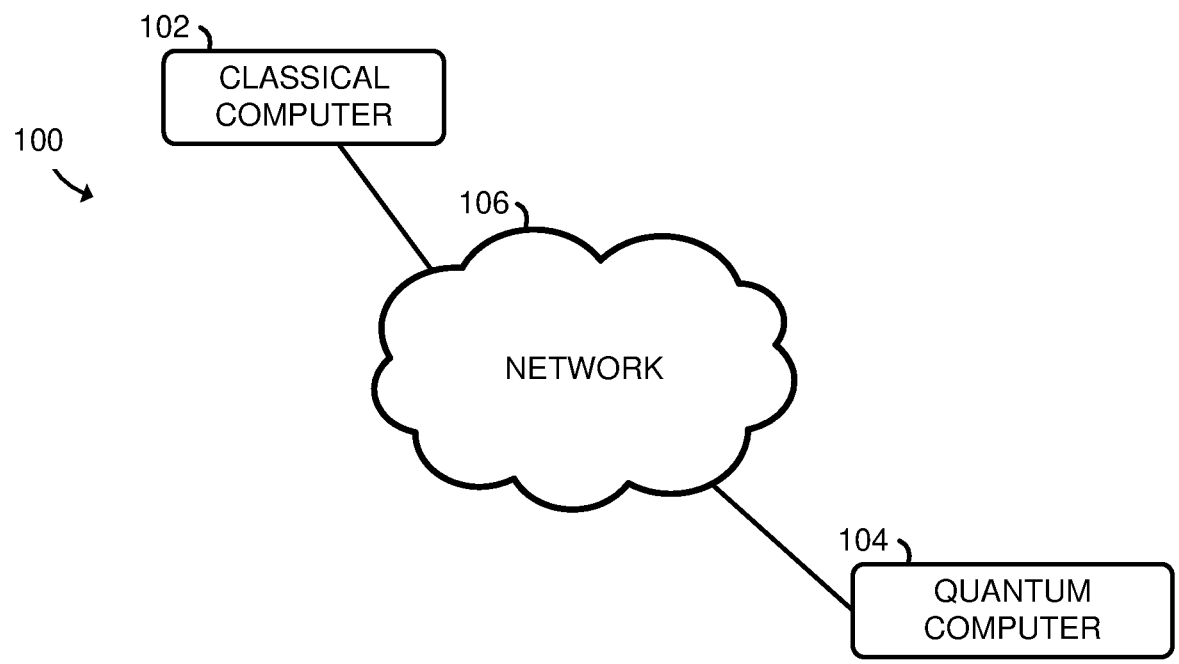
FIG. 1 is a simplified block diagram of a system including a network connecting a classical computer and a quantum computer.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 includes a classical computer 102 and a quantum computer 104 connected by a network 106. In use, in the illustrative embodiment, the classical computer 102 and the quantum computer 104 perform a hybrid classical/quantum optimization problem by iteratively solving different sub-problems of an optimization problem. In particular, in the illustrative embodiment, an optimization problem to be solved can be decomposed into two sub-problems, with one sub-problem assigned to the classical computer 102 and one sub-problem assigned to the quantum computer 104. The classical computer 102 can solve its sub-problem and send a result to the quantum computer 104. The quantum computer 104 can then solve its sub-problem based on the result of the classical computer 102. The quantum computer 104 can send its result to the classical computer 102, which can then solve its sub-problem based on the result of the quantum computer. This iterative process can continue until an end condition is reached, and a final result is determined. It should be appreciated that, in the illustrative embodiment, at least some of the variables that are being optimized in the sub-problem being solved on the classical computer are different from the variables that are being optimized in the sub-problem being solved on the quantum computer. Additionally, at least some of the variables that are being optimized in the sub-problem being solved on the quantum computer are different from the variables that are being optimized in the sub-problem being solved on the classical computer. In some embodiments, at least some of the variables being optimized in the sub-problem being solved on the classical computer are the same as some of the variables that are being optimized in the sub-problem being solved on the quantum computer.

The optimization problem to be solved can be any suitable optimization problem. For example, the optimization problem can be any suitable mixed-integer linear programing (MILP) or mixed-integer nonlinear programing (MINP), such as mixed-integer quadratic programming (MIQP) or integer quadratic fractional programming (IQFP). The optimization problem to be solved may be from any suitable field, such as chemical engineering, industrial processes, traffic control, electric power generation, flight path optimization, artificial intelligence, and protein folding.

It should be appreciated that, in some embodiments, a classical computer 102 implementing a classical global optimization solver may not be able to solve the optimization problems within a practical amount or time or with use of a practical amount of resources, while a hybrid algorithm executed on a classical computer 102 and a quantum computer 104 may be able to arrive at an exact or approximate solution with use of less time or resources. For example, state-of-the-art global optimization solver BARON running on a classical computer 102 may fail to solve MINLP optimization problems with more than 1,000 variables and constraints in a reasonable amount of time. Another state-of-the-art solver Gurobi may fail to provide an optimal solution for problems with more than 9,800 variables even after 24 hours of computational time on a classical computer 102. In contrast, the hybrid classical-quantum algorithm disclosed in this application can outperform general-purpose state-of-the-art solution techniques for solving the previously intractable large-scale MINLP problems containing, e.g., 45,000 variables. In particular, the approach disclosed herein can be used to solve MINLP optimization problems with more than 1,000 variables, 10,000 variables, 20,000 variables, 40,000 variables, 50,000 variables, 100,000 variables, or 1,000,000 variables, including for optimization problems not practically solvable by classical computers. It is also applicable for solving other large scale optimization problems which are general less challenging than MINLP problems, such as mixed integer linear programming (MILP) or nonlinear programming (NLP) problems with more than 50,000 variables, more than 100,000 variables, or more than 1,000,000 variables. In the general optimization problems, the variables could be discrete variables (such as integer variables or binary variables), continuous variables or the combination thereof.

The network 106 may be embodied as any type of network capable of communicatively connecting the classical computer 102 and the quantum computer 104. For example, the network 106 may be embodied as a remote classical computer 102 that is connected by a wide area network to the quantum computer 104. It should be appreciated that, in some embodiments, the quantum computer 104 may be at a specialized facility for quantum computing. A remote classical computer 102 may be able to submit tasks to or schedule jobs with the quantum computer 104. In such an embodiment, the quantum computer 104 is able to provide such services to multiple clients in different locations.

It should be appreciated that, in some embodiments, the classical computer 102 may be co-located with the quantum computer 104. For example, the classical computer 102 may be directly connected to a quantum processor (such as the quantum processor 302 in FIG. 3) without any network between them.

Figure 2:
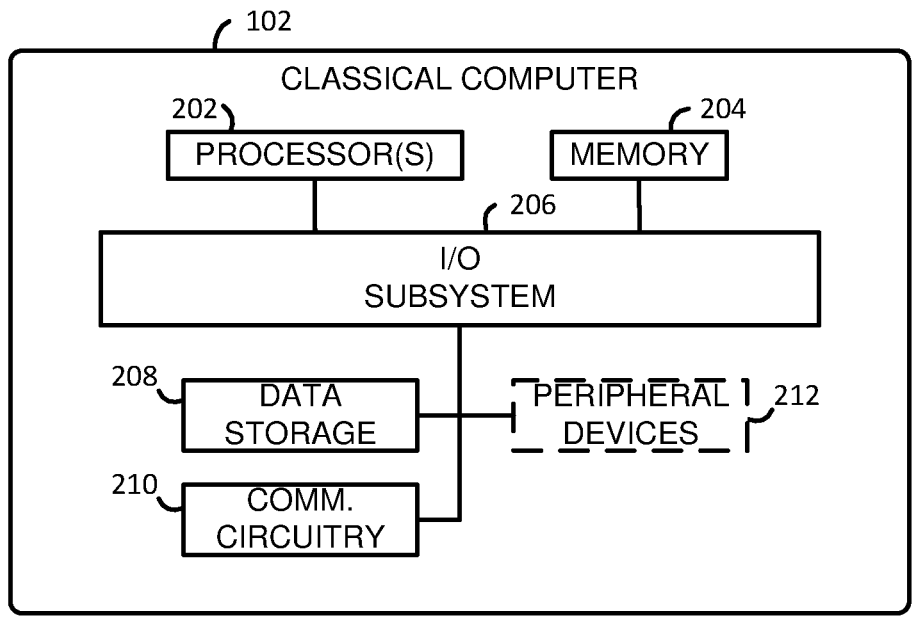
FIG. 2 is a simplified block diagram of at least one embodiment of the classical computer of FIG. 1.

Referring now to FIG. 2, an illustrative classical computer 102 of the system 100 may be embodied as any type of compute device capable of performing the functions described herein. For example, the classical computer 102 may be embodied as or otherwise be included in, without limitation, a server computer, a desktop computer, a sled or blade of a rack, a disaggregated computing system such as a rack scale architecture system, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device.

The illustrative classical computer 102 includes the processor 202, a memory 204, an input/output (I/O) subsystem 206, data storage 208, and communication circuitry 210. In some embodiments, one or more of the illustrative components of the classical computer 102 may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a microcontroller, or other processor or processing/controlling circuit.

Similarly, the memory 204 may be embodied as any type of volatile or non-volatile memory or data storage capable of performing the functions described herein. In operation, the memory 204 may store various data and software used during operation of the classical computer 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the classical computer 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the classical computer 102 on a single integrated circuit chip.

The data storage 208 may be embodied as any type of device or devices configured for the short-term or long-term storage of data. For example, the data storage 208 may include any one or more memory devices and circuits, memory cards, hard disk drives, solid-state drives, or other data storage devices.

The communication circuitry 210 may be embodied as any type of interface capable of interfacing the classical computer 102 with the network 106. The communication circuitry 210 may also be referred to or be embodied as a network interface controller (NIC). The communication circuitry 210 may be capable of interfacing with any appropriate cable type, such as an electrical cable or an optical cable. The communication circuitry 210 may be configured to use any one or more communication technology and associated protocols (e.g., Ethernet, Bluetooth®, WiMAX, near field communication (NFC), Omni-Path, etc.). Furthermore, in some embodiments, the communication circuitry 210 may be in a package separate from the processor 202, in a multi-chip package with the processor 202, or in a system-on-a-chip with the processor 202.

Of course, in some embodiments, the classical computer 102 may include additional components often found in a classical computer 102, such one or more peripheral devices 212. The peripheral devices 212 may include a display, a keyboard, a mouse, a camera, etc. The display may be embodied as any type of display on which information may be displayed to a user of the classical computer 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 3:
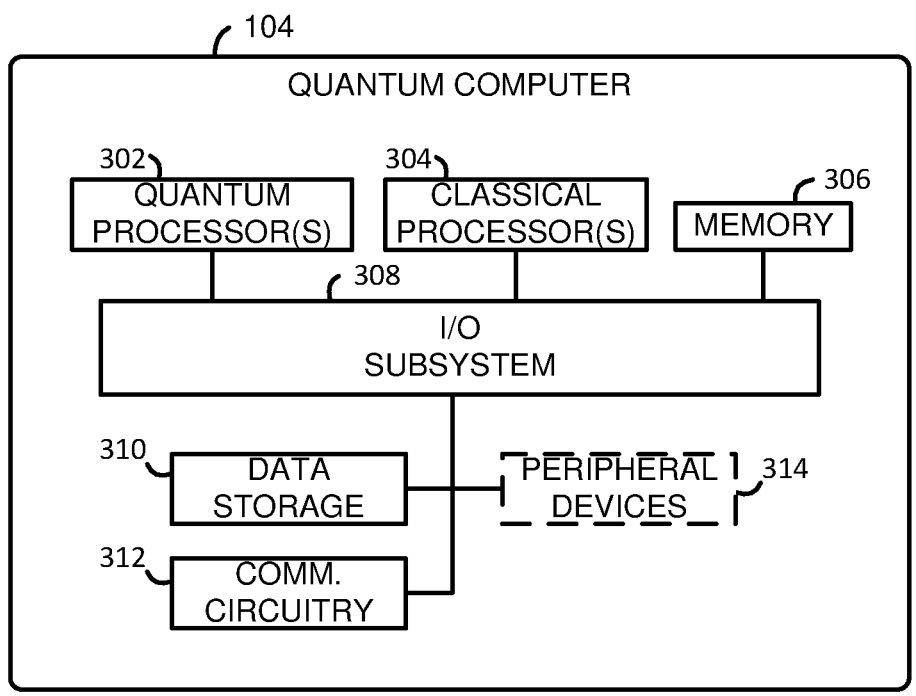
FIG. 3 is a simplified block diagram of at least one embodiment of the quantum computer of FIG. 1.

Referring now to FIG. 3, the quantum computer 104 of the system 100 may be embodied as any type of compute device with a quantum processor 302 capable of performing the functions described herein. For example, the quantum computer 104 may be embodied as or otherwise be included in, without limitation, a server computer, a desktop computer, a sled or blade of a rack, a multiprocessor system, a processor-based system, a consumer electronic device, and/or any other computing device.

The quantum processor 302 may be any suitable quantum processor. In the illustrative embodiment, the quantum processor 302 is a quantum annealing processor, such as a D-Wave One™, D-Wave Two™, The D-Wave 2X™, D-Wave 2000Q™, or D-Wave Advantage processor. In other embodiments, the quantum processor 302 may be embodied a gate-model quantum processor.

The quantum computer 104 may include a classical processor 304, a memory 306, an input/output (I/O) subsystem 308, data storage 310, communication circuitry 312, and peripheral devices 314. The processor 304, memory 306, the I/O subsystem 308, the data storage 310, and the communication circuitry 312 may be similar to the corresponding components of the classical computer 102, and the description of those components will not be repeated in the interest of clarity.

Figure 4:
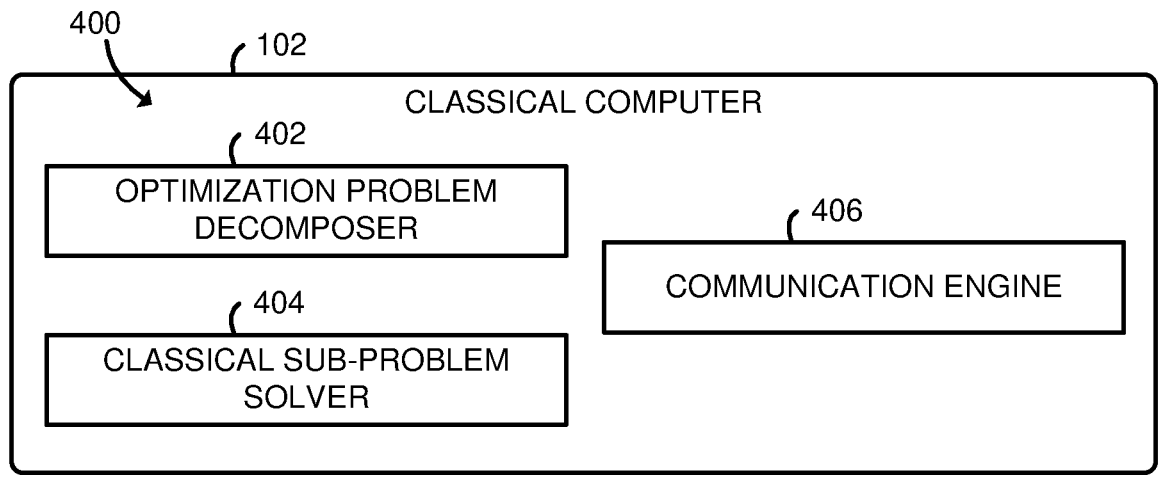
FIG. 4 is a block diagram of at least one embodiment of an environment that may be established by the classical computer of FIG. 2.

Referring now to FIG. 4, in an illustrative embodiment, the classical computer 102 establishes an environment 400 during operation. The illustrative environment 400 includes an optimization problem decomposer 402, a classical sub-problem solver 404, and a communication engine 406. The various components of the environment 400 may be embodied as hardware, software, firmware, or a combination thereof. For example, the various components of the environment 400 may form a portion of, or otherwise be established by, the processor 202, the memory 204, or other hardware components of the classical computer 102. As such, in some embodiments, one or more of the components of the environment 400 may be embodied as circuitry or collection of electrical devices (e.g., optimization problem decomposer circuitry 402, classical sub-problem solver circuitry 404, etc.). It should be appreciated that, in such embodiments, one or more of the circuits (e.g., the optimization problem decomposer circuitry 402, the classical sub-problem solver circuitry 404, etc.) may form a portion of one or more of the processor 202, the memory 204, the I/O subsystem 206, the communication circuitry 210, the data storage 208, an application specific integrated circuit (ASIC), a programmable circuit such as a field-programmable gate array (FPGA), and/or other components of the classical computer 102. For example, the classical sub-problem solver circuitry 404 may be embodied as the processor 202 and associated instructions stored on the data storage 208 and/or the memory 204 that may be executed by the processor 202. Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the processor 202 or other components of the classical computer 102. It should be appreciated that some of the functionality of one or more of the components of the environment 400 may require a hardware implementation, in which case embodiments of components which implement such functionality will be embodied at least partially as hardware.

The optimization problem decomposer 402, which may be embodied as hardware (e.g., circuitry), firmware, software, virtualized hardware, emulated architecture, and/or a combination thereof as discussed above, is configured to decompose an optimization problem into two or more sub-problems. As discussed below in more detail, an optimization problem may be decomposed into a relaxed MILP and a quadratic unconstrained binary optimization problem (QUBO), into a dual linear program and a QUBO, into a parametric QUBO, etc. In some embodiments, the decomposition may be encoded manually by a user, received from another compute device, or determined automatically.

The classical sub-problem solver 404, which may be embodied as hardware (e.g., circuitry), firmware, software, virtualized hardware, emulated architecture, and/or a combination thereof as discussed above, is configured to solve the sub-problem that is assigned to the classical computer 102. The classical computer 102 may use any suitable algorithm, such as one chosen from the Gurobi solver to solve a MILP. Gurobi is an optimization solver provides a plurality of algorithms (e.g. simplex algorithm, barrier algorithm, or concurrent optimization) to solve certain types of optimization problems including the continuous relaxations of mixed-integer problems (e.g. MILP) or continuous problems (e.g. LP, QP, QCP). Additionally, in some embodiments, the classical sub-problem solver 404 is configured to handle all operations of the optimization problem except the calculations performed on the quantum processor 302, such as updating upper and lower bounds, making integer cuts, updating parameter values, checking end conditions, etc.

The communication engine 406 is configured to control the communication circuitry 210. The communication engine 406 processes incoming messages from other compute devices as well as instructions from the classical computer 102 and outgoing messages from the classical computer 102. The communication engine 406 may be configured to use any one or more communication technology and associated protocols (e.g., Ethernet, Bluetooth®, WiMAX, near field communication (NFC), etc.). In the illustrative embodiment, the communication engine 406 sends and receives data relating to results of the various sub-problems to and from the quantum computer 104.

Figure 5:
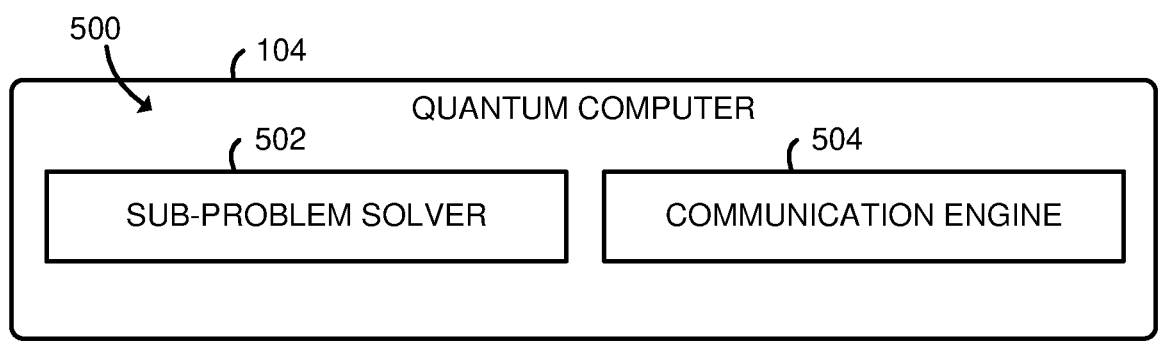
FIG. 5 is a block diagram of at least one embodiment of an environment that may be established by the quantum computer of FIG. 2.

Referring now to FIG. 5, in an illustrative embodiment, the quantum computer 104 establishes an environment 500 during operation. The illustrative environment 500 includes a sub-problem solver 502 and a communication engine 504. The various components of the environment 500 may be embodied as hardware, software, firmware, or a combination thereof. For example, the various components of the environment 500 may form a portion of, or otherwise be established by, the quantum processor 302, the classical processor 304, the memory 306, or other hardware components of the quantum computer 104. As such, in some embodiments, one or more of the components of the environment 500 may be embodied as circuitry or collection of electrical devices (e.g., sub-problem solver circuitry 502, communication circuitry 504, etc.). It should be appreciated that, in such embodiments, one or more of the circuits (e.g., the sub-problem solver circuitry 502, the communication circuitry 504, etc.) may form a portion of one or more of the quantum processor 302, the classical processor 304, the memory 306, the I/O subsystem 308, the data storage 310, the communication circuitry 312, an application specific integrated circuit (ASIC), a programmable circuit such as a field-programmable gate array (FPGA), and/or other components of the quantum computer 104. For example, sub-problem solver circuitry 502 may be embodied as the quantum processor 302, the classical processor 304, and associated instructions stored on the data storage 310 and/or the memory 306 that may be executed by the quantum processor 302 and the classical processor 304. Additionally, in some embodiments, one or more of the illustrative components may form a portion of another component and/or one or more of the illustrative components may be independent of one another. Further, in some embodiments, one or more of the components of the environment 500 may be embodied as virtualized hardware components or emulated architecture, which may be established and maintained by the classical processor 304 or other components of the quantum computer 104. It should be appreciated that some of the functionality of one or more of the components of the environment 500 may require a hardware implementation, in which case embodiments of components which implement such functionality will be embodied at least partially as hardware.

The sub-problem solver 502, which may be embodied as hardware (e.g., circuitry), firmware, software, virtualized hardware, emulated architecture, and/or a combination thereof as discussed above, is configured to solve the sub-problem assigned to the quantum computer 104. In the illustrative embodiment, the sub-problem assigned to the quantum computer 104 is a QUBO problem. In some embodiments, the QUBO problem may be larger than what can be represented on the quantum processor 302 at one time. In such embodiments, the QUBO problem may be partitioned into smaller sub-problems that are solved on the quantum processor 302, such as by using the qbsolv algorithm referenced above. Each iteration of the hybrid quantum computing (QC) partitioning algorithm includes multiple calls to the quantum computer to globally minimize each sub-QUBO and a tabu search call for local minimization performed on a classical processor 304.

The communication engine 504 is configured to control the communication circuitry 210. The communication engine 504 processes incoming messages from other compute devices as well as instructions from the classical computer 102 and outgoing messages from the classical computer 102. The communication engine 504 may be configured to use any one or more communication technology and associated protocols (e.g., Ethernet, Bluetooth®, WiMAX, near field communication (NFC), etc.). In the illustrative embodiment, the communication engine 504 sends and receives data relating to results of the various sub-problems to and from the classical computer 102.

Figure 6:
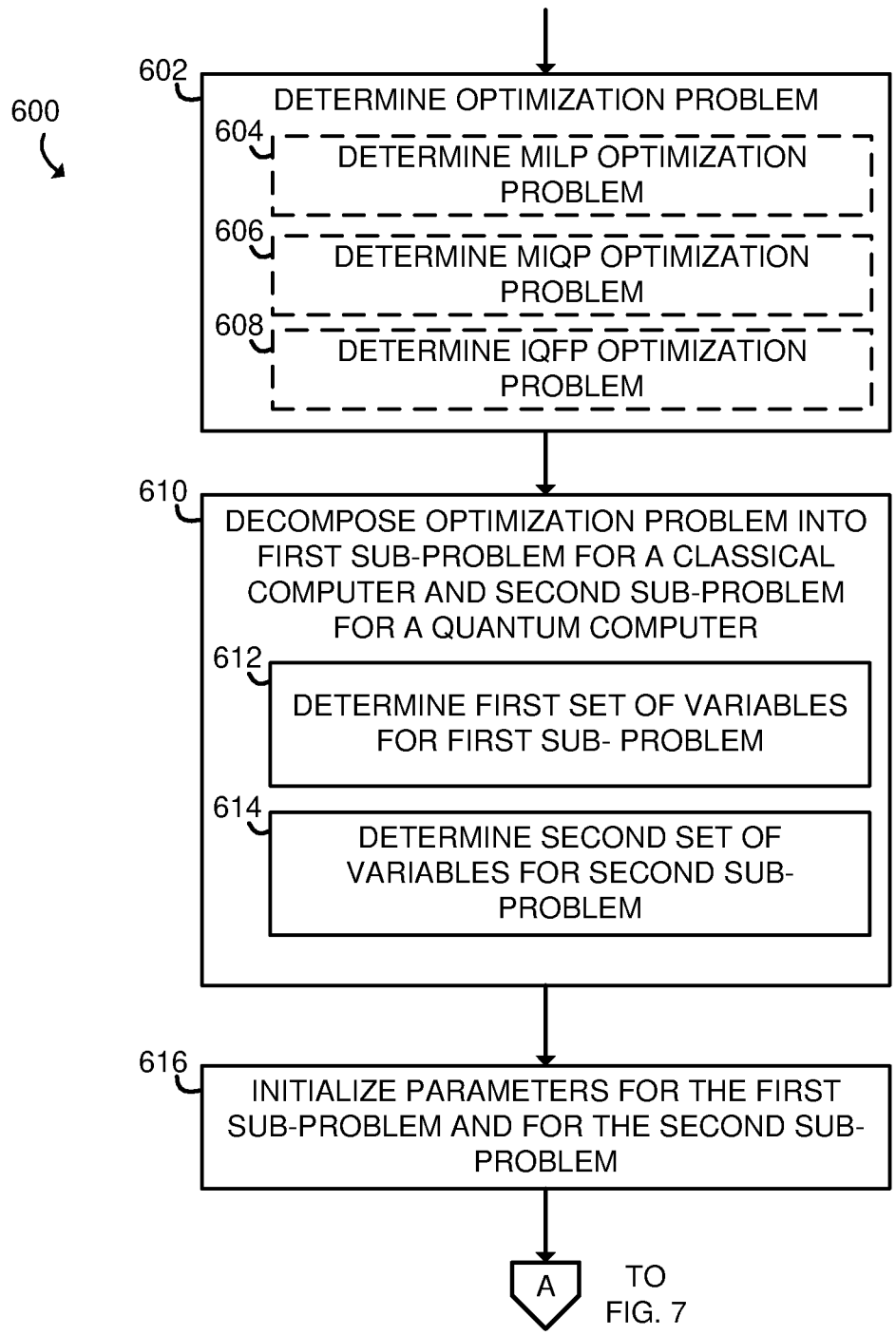
FIGS. 6-7 are a simplified flow diagram of at least one embodiment of a method for solving an optimization problem that may be executed by the system of FIG. 1.

Referring now to FIG. 6, in use, the system 100 may execute a method 600 for solving an optimization problem. The method 600 begins in block 602, in which the classical computer 102 determines an optimization problem to solve. The classical computer 102 may determine an optimization problem in any suitable manner, such as receiving an instruction from a user, receiving a request from a remote compute device, as part of a program executing on the classical computer 102, etc. In the illustrative embodiment, the optimization problem has an objective function, one or more binary or integer variables, one or more continuous variables, and one or more constraints on the variables.

The optimization problem may correspond to any suitable real-world problem, such as a scheduling problem, a cellular manufacturing problem, a vehicle routing problem, etc. The classical computer 102 may determine a MILP optimization problem in block 604, such as a scheduling problem. The classical computer may determine a MIQP optimization problem in block 606, such as a cellular manufacturing problem. The classical computer may determine an IQFP optimization problem in block 608, such as a vehicle routing problem.

In block 610, the classical computer 102 decomposes the optimization problem into a first sub-problem to be solved on the classical computer 102 and a second sub-problem to be solved on the quantum computer 104. The classical computer 102 determines a first set of variables for the first sub-problem in block 612, and determines a second set of variables for the second sub-problem in block 614. The classical computer 102 may decompose the optimization problem in any suitable manner, such as by receiving an instruction from a user, by automatically decomposing the problem, etc. The first sub-problem may be expressed in any suitable manner, such as a relaxed MILP, In some embodiments, the first sub-problem may be a single variable calculated based on results from the quantum computer 104. In the illustrative embodiment, the second sub-problem to be solved on the quantum computer 104 is expressed in the form of a quadratic unconstrained binary optimization (QUBO) problem with several binary variables.

In block 616, the classical computer 102 initializes the parameters for the first sub-problem and the second sub-problem. For example, the classical computer 102 may allocate memory for each variable, determine an initial value for each variable, determine an initial value for any constants or penalty parameters, etc. The classical computer 102 may determine an initial value for each variable, constant, or penalty parameter in any suitable manner, such as loading a value stored on the classical computer 102, accepting an input from a user of the classical computer 102, receiving a value from a remote compute device, etc. The penalty parameter may be empirically determined based on computational experiments. In the illustrative embodiment, the penalty parameter is selected to be higher than that ratio of the largest coefficient of the objective to the largest coefficient of the constraints. In the illustrative embodiment, all of the variables that are being optimized in the first sub-problem are different from all of the variables that are being optimized in the second sub-problem. In some embodiments, at least some of the variables that are being optimized in the first sub-problem may be the same as some of the variables that are being optimized in the second sub-problem. It should be appreciated that, in some embodiments, some or all of the variables being optimized on the quantum computer 104 may be initialized by the quantum computer 104 instead of the classical computer 102.

Figure 7:
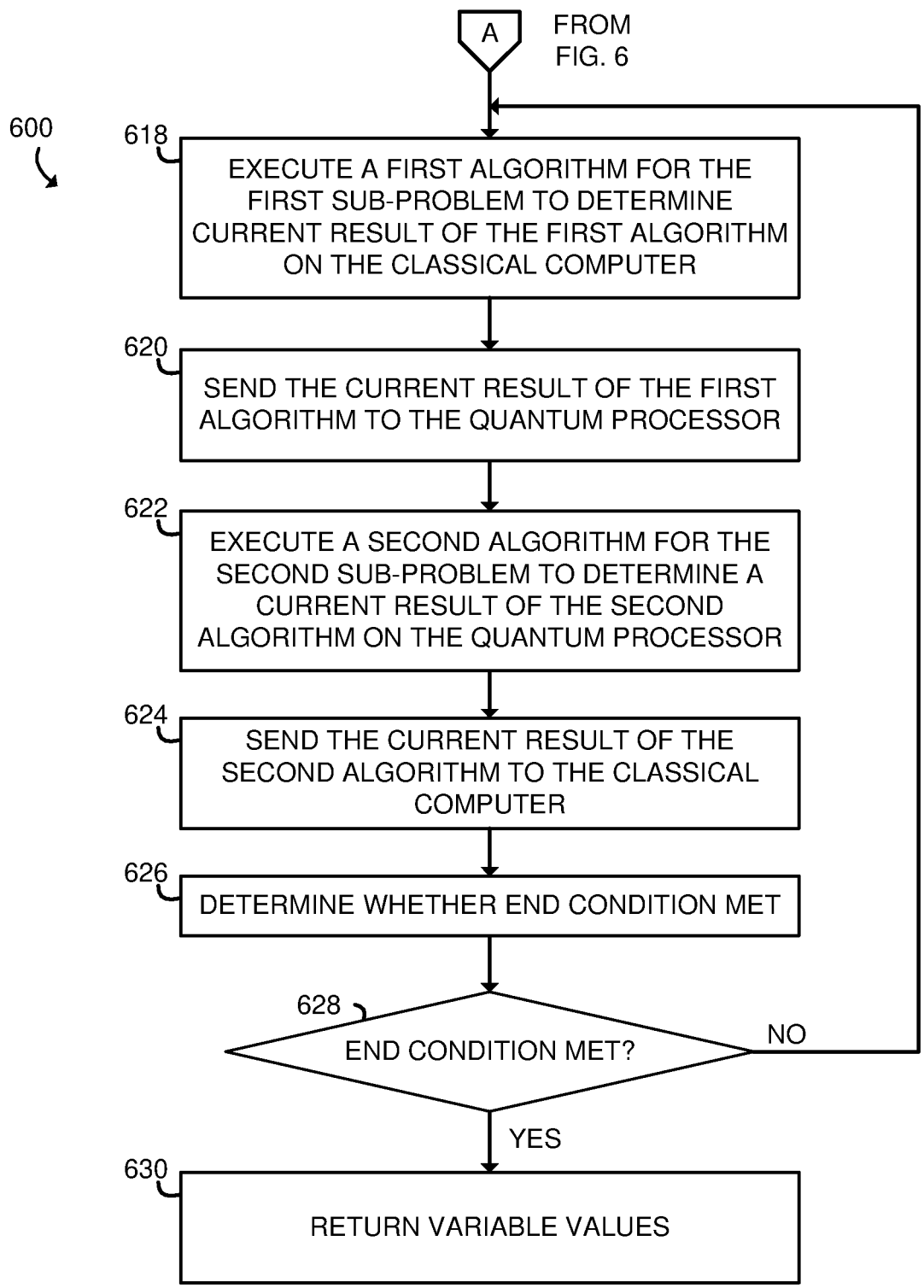

Referring now to FIG. 7, in block 618, the classical computer 102 executes a first algorithm for the first sub-problem to determine a current result of the first algorithm on the classical computer 102. In the illustrative embodiment, the first algorithm uses a current result of the second sub-problem as a parameter. Of course, the first time the first algorithm is executed, the first algorithm may use an initial value instead of a result of the second sub-problem, as there may not yet be a result of the second sub-problem. What the algorithm is and what the result is will depend on the particular sub-problem being solved. For example, in one embodiment, the first sub-problem may be embodied as a relaxed MILP, and the classical computer 102 may determine a value for each variable in the relaxed MILP. In the illustrative embodiment, an optimal solution for the relaxed MILP is determined. Additionally or alternatively, in some embodiments, an approximate solution for the first sub-problem may be determined in block 618. Although the classical computer 102 is shown as performing the first calculation in each iteration, it should be appreciated that, in some embodiments, the quantum computer 104 may perform the first calculation in each iteration.

In block 620, the classical computer 102 sends a current result of the first algorithm to the quantum computer 104. The result that is sent depends on the particular algorithm being solved. For example, if the problem being solved is a relaxed MILP, the values of the variables corresponding to the optimal solution may be sent to the quantum computer 104. In some embodiments, the result that is sent may be a direct calculation of a variable.

In block 622, the quantum computer 104 executes a second algorithm for the second sub-problem to determine a current result of the second algorithm on the quantum processor 302. In the illustrative embodiment, the second algorithm uses a current result of the first sub-problem as a parameter. In the illustrative embodiment, the quantum processor 302 solves a QUBO problem. It should be appreciated that, in some embodiments, the full QUBO problem may not be able to directly fit on the quantum processor 302, and the quantum processor 302 may process one part of the optimization problem at a time, such as by using a partitioning algorithm. For example, in one embodiment, the quantum processor 302 may solve a QUBO problem using the qbsolv algorithm described in "Partitioning Optimization Problems for Hybrid Classical/Quantum Execution" by Booth et al., dated Jan. 9, 2017, D-Wave Technical Report Series, which is incorporated herein by reference. It should be appreciated that, in some embodiments, the classical processor 304 may perform certain tasks to assist in solving the QUBO problem. It should further be appreciated that, in some embodiments, the quantum computer 104 may provide an approximate solution to the QUBO problem instead of an exact solution.

In block 624, the quantum computer 104 sends a current result of the second algorithm to the classical computer 102. In some embodiments, the quantum computer 104 may send current values of the variables to the classical computer 102. Additionally or alternatively, in some embodiments, the quantum computer 104 may send other results to the classical computer 102, such as integer cuts representing machines that could not be scheduled successfully based on the current results provided by the classical computer 102.

In block 626, the classical computer 102 determines whether an end condition is met. In some embodiments, the end condition is met when an exact optimal solution to the optimization problem is determined. Additionally or alternatively, an end condition can be met when a particular metric of the solution passes a threshold value, after a certain number of iterations, etc.

In block 628, if the end condition is not met, the method 600 loops back to block 618 to execute the first algorithm on the classical computer 102. It should be appreciated that, in each iteration, the current result (i.e., most recently updated result) of the first sub-problem is used as a parameter in the second sub-problem, and vice-versa. If the end condition is met, the method 600 proceeds to block 630, in which the values of the variable for the optimization problem are returned.

Figure 8:
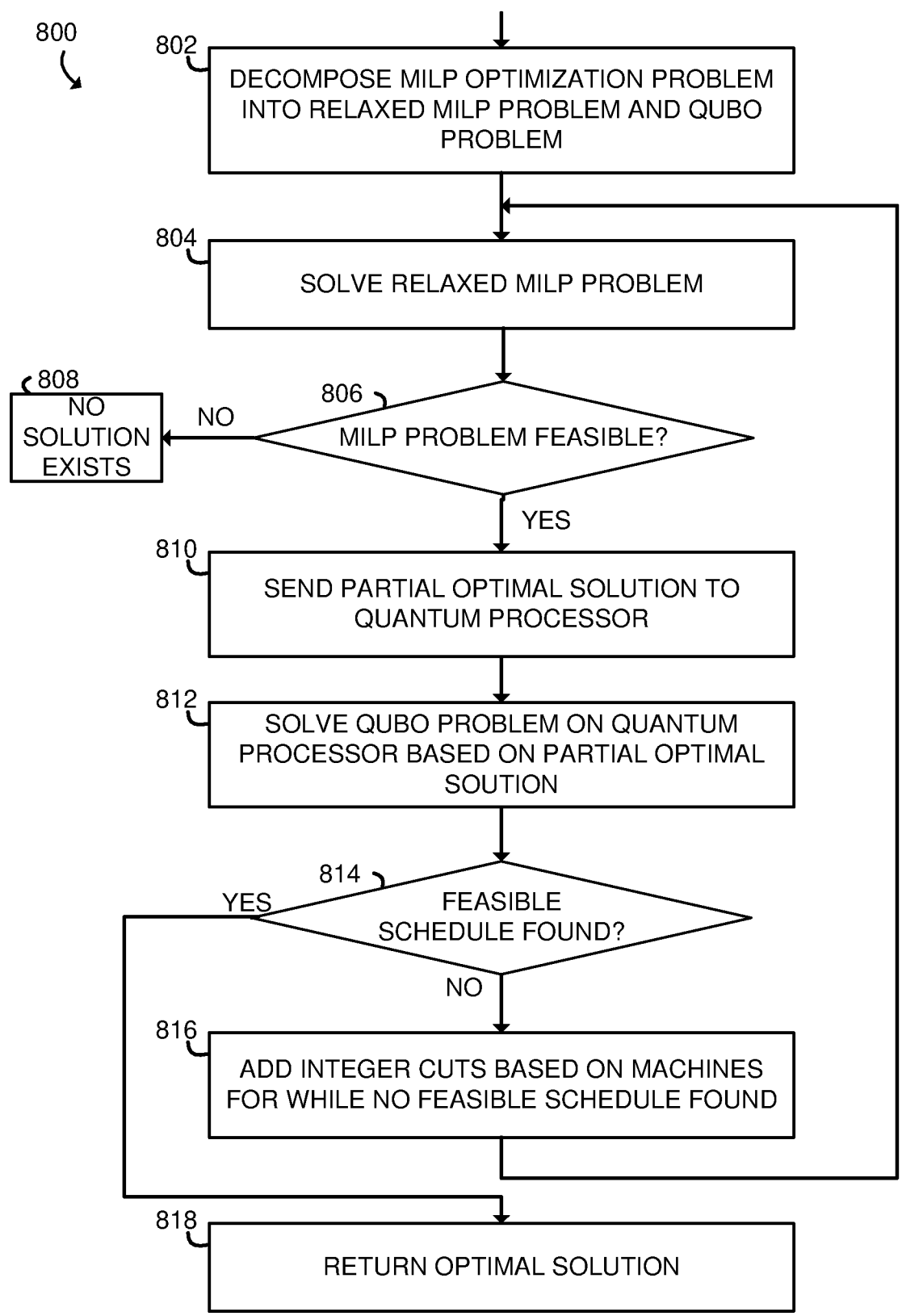
FIG. 8 is a simplified flow diagram of at least one embodiment of a method for solving a mixed-integer linear program (MILP) optimization problem that may be executed by the system of FIG. 1.

Referring now to FIG. 8, in use, the system 100 may execute a method 800 for solving a job-shop scheduling problem in the form of a MILP. This single-stage parallel scheduling problem considers a set of jobs I using a set of machines M. Processing job $i \in I$ on machine $m \in M$ requires $P_{im}$ amount of time and costs $C_{im}$. Job $i \in I$ can only begin after the release date, and must be completed before its due date represented by $R_i$ and $D_i$, respectively. The processing costs, processing times, and release and due dates for each job-machine pair are known beforehand, and are independent of the sequence.

The decision variables in this MILP model are $ts_i$, $x_{im}$ and $y_{ij}$, representing the start time of jobs, assignments, and sequence of jobs on each machine, respectively. Binary variables $x_{im}$ are assignment variables that indicate whether job i is assigned to machine m. The binary variables $y_{ij}$ are sequencing variables that are equal to one if jobs i and j are assigned to the same machine and job j is processed after job i. Using the above described variables and parameters, the MILP model for job-shop scheduling is formulated as follows.

$$\min \sum_{i \in I} \sum_{m \in M} C_{im} x_{im} \quad (1)$$

$$\text{s.t. } ts_i \geq R_i, \forall i \in I \quad (2)$$

$$ts_i \leq D_i - \sum_{m \in M} P_{im} x_{im}, \forall i \in I \quad (3)$$

$$\sum_{m \in M} x_{im} = 1, \forall i \in I \quad (4)$$

$$Y_{ij} + Y_{ij} \geq x_{im} + x_{jm} - 1, \forall i, j \in I, j > i, m \in M \quad (5)$$

$$ts_j \geq ts_i + \sum_{m \in M} P_{im} x_{im} - U(1 - y_{ij}), \forall i, j \in I, i \neq j \quad (6)$$

$$y_{ij} + y_{ji} \leq 1, \forall i, j \in I, j > i \quad (7)$$

$$y_{ij} + y_{ji} + x_{im} + x_{jn} \leq 2, \forall i, j \in I, j > i, \forall m, n \in M, m \neq n \quad (8)$$

$$ts_i \geq 0, \forall i \in I; \quad x_{im} \in \{0, 1\}, \quad y_{ij} \in \{0, 1\}, \quad (9)$$
$$\forall i \in I, \forall m \in M; \quad \forall i, j \in I, i \neq j$$

Eq. (1) gives the objective function and Eqs. (2)-(9) are constraints. The objective function in Eq. (1) is to minimize the processing costs associated with processing jobs assigned to the respective machines. Constraint (2) ensures that each job $i \in I$ is processed after its release date, and constraint (3) does not allow processing of any jobs later than their respective due dates. The assignment constraint (4) enforces that each job i is processed by a single machine for this single-stage scheduling model. Constraint (5) models the logical relationship between the assignment variables and the sequencing variables. It implies that if jobs i and j are assigned to the same machine m, then the jobs must be processed one after the other. The parameter U in sequencing constraint (6) is given by $U = \Sigma_{i \in I} \max_{m \in M} \{P_{im}\}$. The sequencing constraint ensures that job j starts processing after job i finishes, provided that both jobs i and j are assigned to the same machine. Start times of both jobs remain independent of each other if they are assigned to different machines. Constraints (7) and (8) are simple logical cuts that reduce the computational time required to solve the MILP problem by a significant amount. Constraint (7) is based on the logic relationship that either job j is processed after job i or vice versa, irrespective of their assigned machines. The last constraint ensures that the sequencing variables $y_{ij}$ and $y_{ji}$ are zero, if jobs i and j are assigned to different machines.

In block 802, the classical computer 102 decomposes the MILP problem of Eqs. (1)-(9) into a relaxed MILP problem and a QUBO problem. In the illustrative embodiment, the MILP problem is decomposed by a user programming the classical computer 102 is to solve a particular relaxed MILP problem and programming the quantum computer 104 to solve a particular QUBO problem. The relaxed MILP problem is shown in Eqs. (10) and (11), and the QUBO problem is shown in Eq. (12).

$$\min \sum_{i \in I} \sum_{m \in M} C_{im} x_{im} \quad (10)$$

$$\left.\begin{array}{l} \text{s.t. } ts_i \geq R_i \; \forall i \in I \\ ts_i \leq D_i - \sum_{m \in M} P_{im} x_{im}, \; \forall i \in I \\ \sum_{m \in M} x_{im} = 1, \; \forall i \in I \\ ts_i \geq 0, \; \forall i \in I \\ x_{im} \in \{0, 1\}, \; \forall i \in I, \forall m \in M \end{array}\right\} \text{Relaxed } MILP \quad (11)$$

$$\left.\begin{array}{l} \min H = \sum_{i,j \in S} 1 - y_{ij} - y_{ji} + 2 y_{ij} y_{ji} + y_{ij} \left( U(ts_i^* - ts_j^*) + \sum_{m \in M} P_{im} x_{im}^* \right) \\ S = \{i, j \mid x_{im}^* = x_{jm}^* = 1, \; \forall i, j \in I, \forall m \in M\} \end{array}\right\} QC \text{ step} \quad (12)$$

The objective function (10) is the same as that of the original MILP model in Eq. (1). Constraints (2)-(4) and (9) form the constraints of the hybrid model. These timing and assignment constraints together form a new set of constraints (11) for the relaxed MILP model. Constraints (5)-(8) are concerned with sequencing jobs, and are reduced to the model in the QC step shown in Eq. (12). The QC step uses start times for each job as parameters in order to determine a sequence for the same. The Hamiltonian H represents a single objective function, which uses the identical sequencing variables $y_{ij}$ and takes the form of a QUBO problem. The size of set S in Eq. (12) depends on the number of jobs assigned to the same machine, for which scheduling start times have already been determined. The hybrid QC-MILP decomposition combines the deterministic aspect for solving the relaxed MILP problem with the quick search space traversal of QC techniques for solving the problem in the QC step.

In block 804, the classical computer 102 solves the relaxed MILP problem. The classical computer 102 may use any suitable algorithm to solve the relaxed MILP problem, such as a deterministic Gurobi solver. Solutions to the relaxed MILP problem produces an assignment of machines to process each job, and is the partial optimal solution denoted by $x_{im}*$ and $ts_i*$.

In block 806, the classical computer 102 checks whether the relaxed MILP problem is feasible. If the relaxed MILP problem is not feasible, then no solution exists for the original problem and the algorithms stops in block 808. If the relaxed MILP problem is feasible, the method 800 proceeds to block 810, in which the classical computer 102 sends the variables denoted by $x_{im}*$ and $ts_i*$ to the quantum computer 104.

In block 812, the quantum computer 104 solves the QUBO problem described in Eq. (12). In this block, the quantum computer 104 determines a schedule for each machine and the assigned jobs. The quantum computer 104 uses the partial optimal solutions from the classical computer 102 to solve the Hamiltonian using the quantum processor 302 in order to locate a feasible schedule in the integer space. The result of the QUBO is then sent to the classical computer 102.

In block 814, the classical computer 102 checks whether the quantum computer 104 has found a feasible solution. A feasible solution at this step indicates that the optimal solution has been determined, and a lack of a feasible solution indicates that integer cuts must be added for machines that could not be scheduled successfully. If a feasible solution has not been found, the method proceeds to block 816, in which the classical computer 102 adds integer cuts to the relaxed MILP problem to exclude any conflicting assignments. For each machine with an infeasible schedule, the integer cut formulation is $\Sigma_{i \in S'} x_{im} \leq |S'|-1$, where S' is the set of jobs assigned to machine m. It should be appreciated that the integer cuts are cumulative, which the integer cuts added in block 816 being in addition to any integer cuts already made. The method 800 then loops back to block 804 to re-solve the relaxed MILP with the additional integer cuts.

It should be noted that, in the illustrative embodiment, the variable assignments of the QUBO solution are sent from the quantum computer 104 to the classical computer 102. The variable assignments are used to determine the integer cuts but are not directly used in the relaxed MILP problem. As a result, in some embodiments, the quantum computer 104 may determine appropriate integer cuts based on the QUBO solution and may send the result of the determined integer cuts to the classical computer 102 without sending the variable values to the classical computer 102.

Referring back to block 814, if a feasible schedule is found, the method 800 proceeds to block 818, in which an optimal solution is returned. If a feasible solution exists for the problem in the second phase of the hybrid algorithm, the algorithm will converge to a global optimum. Thus, it should be noted that the hybrid QC-MILP decomposition method converges to an optimal solution or proves infeasibility in finite number of iterations.

Figure 9:
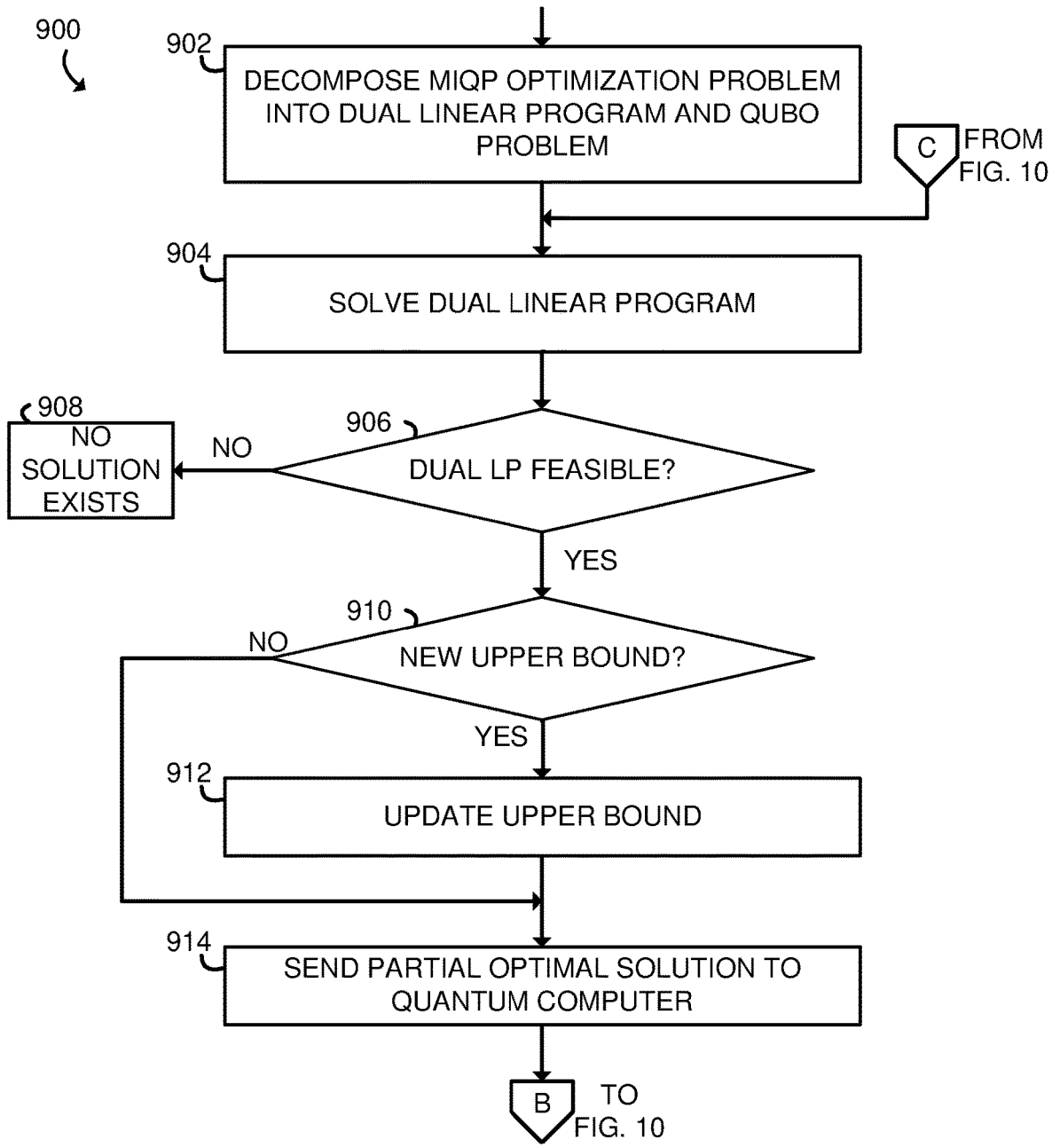
FIGS. 9-10 are a simplified flow diagram of at least one embodiment of a method for solving a mixed-integer quadratic program (MIQP) optimization problem that may be executed by the system of FIG. 1.

Referring now to FIG. 9, in use, the system 100 may execute a method 900 for solving a cellular manufacturing problem in the form of a MIQP. Cellular manufacturing is an important application of group technology and is being widely applied in manufacturing industries. In this manufacturing approach, the equipment is arranged to facilitate continuous flow production, resulting in increased work flow, reduced response and production times, and increased profits. In cellular manufacturing, the manufacturing system is divided into several cells. Similar parts are processed in the same cell, such that the interactions of machines and parts within a cell are maximized to improve efficiency. The first step of cellular manufacturing system design is cell formation which involves selecting parts and machines that will be allocated to each cell. The objective of the manufacturing cell formation problem is to minimize the total cost associated with intracellular movement, resource utilization, and machine set-ups.

Several variants of the manufacturing cell formation model exist in literature. Factors like resource and operational costs, intra-cellular movement costs, resource utilization costs, grouping efficiency, and others are considered in the manufacturing cell formation model formulation. In the MIQP model addressed in the method 900, the operational requirements for each part are known beforehand. This formulation involves grouping a set of parts P and a set of machines M into subsystems termed as cells denoted by the set R. The cost of inter-cell movement per unit of part $i \in P$ is given by $c_i$, with $v_i$ units of each part i in the manufacturing system. The cost of part $i \in P$ not utilizing machine $j \in M$ is represented by $u_{ij}$. Each part i needs to be processed $o_{ij}$ times on machine j, and $a_{ij}$ is a real-valued parameter that indicates whether a part i requires machine j. A non-zero value of $a_{ij}$ implies that part i requires machine j for processing. These operational parameters for cellular manufacturing are known a priori and remain independent of any external factors like product demand and operational changes.

The decisions involved in the manufacturing cell formation problem is to determine the parts and machines assigned to each cell $k \in R$. The continuous assignment variables $x_{ik}$ denote whether part i is assigned to cell k, and binary assignment variable $y_{jk}$ is equal to one when machine j is assigned to the cell k. Assignment variable $x_{ik}$ is bounded between zero and one with its non-zero value implying that part i is processed in cell k. Using the above described variables and parameters, the MIQP model for the manufacturing cell formation problem can be formulated as follows.

$$\min \sum_{i \in P} \sum_{j \in M} \sum_{k \in R} c_i v_i o_{ij} a_{ij} x_{ik}(1 - y_{jk}) + \sum_{i \in P} \sum_{j \in M} \sum_{k \in R} u_{ij} v_i (1 - a_{ij}) x_{ik} y_{jk} \quad (13)$$

$$s.t. \sum_{k \in R} x_{ik} = 1, \quad \forall i \in P \quad (14)$$

$$\sum_{k \in R} y_{jk} = 1, \quad \forall j \in M \quad (15)$$

$$0 \leq x_{ik} \leq 1, \quad \forall i \in P, \forall k \in R \quad (16)$$

$$y_{jk} \in \{0, 1\}, \quad \forall j \in M, \forall k \in R \quad (17)$$

The objective function in (13) represents the total cost to be minimized where the first term represents the total cost of inter-cell movement. Second term of this objective function represents the total cost of resource underutilization. It should be noted that the variable $x_{ik}$ and parameter $a_{ij}$ are set as real numbers bounded between [0,1] to ensure consideration of alternate routings. Constraint (14) ensures allocation of each part to a cell. Similarly, constraint (15) ensures that each machine can be assigned to only one cell. In this MIQP model, no restrictions are placed on machine pairs in a particular cell, and it is assumed that any machine can be placed in any cell irrespective of other assignments. Capacity limitations of the number of machines in each cell are also discarded to allow flexibility, but such restrictions can be easily considered by adding constraints of the form $M_{min} \leq \Sigma_{j \in M} y_{jk} \leq M_{max}$. It should be noted that empty cells are also allowed in the formulated model.

In block 902, the classical computer 102 decomposes the MIQP optimization problem. The decomposition is based on Benders decomposition, by considering the above manufacturing cell formation problem given in Eq. (13) to (16) as the primal problem. The dual of this problem is constructed after introducing new variables to replace the quadratic terms in the primal problem. Note that dual variables corresponding to the upper bound in constraint (16) are not needed. The decomposed algorithm iteratively generates upper and lower bounds on the optimal value by solving smaller subproblems.

The primal problem is MIQP with quadratic terms in the objective function using the set of continuous variables $x_{ik}$ and binary variables $y_{jk}$. The dual problem is constructed corresponding to this primal problem, and is referred to as the dual linear programming (LP) model. The dual LP model is linear with objective function (18) and constraints given in (19). This problem consists of four sets of real variables $l_{ijk}$, $m_{ijk}$, $n_{ijk}$ and $s_i$, where $l_{ijk}$, $m_{ijk}$ and $n_{ijk}$ are nonnegative variables and $s_i$ are free variables.

$$\max \sum_{i \in P} s_i - \sum_{i \in P} \sum_{j \in M} \sum_{k \in R} y^*_{jk} m_{ijk} + \sum_{i \in P} \sum_{j \in M} \sum_{k \in R} (y^*_{jk} - 1) n_{ijk} \quad (18)$$

$$\left. \begin{aligned} \text{s.t.} \sum_{j \in M} l_{ijk} - \sum_{j \in M} n_{ijk} + s_i &\leq \sum_{j \in M} c_i v_i o_{ij} a_{ij}, \quad \forall \, i \in P, \forall \, k \in R \\ n_{ijk} - l_{ijk} - m_{ijk} &\leq u_{ij} v_i (1 - a_{ij}) - c_i v_i o_{ij} a_{ij}, \quad \forall \, i \in P, \forall \, j \in M, \forall \, k \in R \\ l_{ijk}, m_{ijk}, n_{ijk} &\geq 0 \\ s_i \text{ unbounded} & \end{aligned} \right\} \text{Dual } LP \quad (19)$$

The corresponding sub-problem to be solved on the quantum computer 104 is:

$$\left. \begin{aligned} \min H &= H_{obj} + H_c \\ \text{s.t.} \; H_{obj} &= -\sum_{j \in M} \sum_{k \in R} \left( \sum_{t=1}^{T} A Q_{jkt} + 2 B Q_{jkt}(F_t - Z^*_{T-1}) \right) y_{jk} + \sum_{j \in M} \sum_{\substack{k \in R \\ k \in R}} \sum_{m \in M} \sum_{n \in R} \left( \sum_{t=1}^{T} Q_{jkt} Q_{mnt} \right) y_{jk} y_{mn} \\ H_c &= \sum_{j \in M} \left( 1 - \sum_{k \in R} y_{jk} + 2 \sum_{k \in R} \sum_{n > k, n \in R} y_{jk} y_{jn} \right) \\ Q_{jkt} &= \sum_{i \in P} \hat{m}_{ijk} - \hat{n}_{ijk} \\ F_t &= \sum_{i \in P} \hat{s}_i - \sum_{i \in P} \sum_{j \in M} \sum_{k \in R} \hat{n}_{ijk} \end{aligned} \right\} QC \text{ step} \quad (20)$$

The objective of the QC step in (20) is to determine the assignments of machines to respective cells. The Hamiltonian H represents a single objective function that uses the sequencing variables $y_{jk}$ and takes the form of a QUBO problem. It includes two distinct Hamiltonians represented by $H_{obj}$ and $H_c$ corresponding to the objective function and constraint (15), respectively. Parameter values A and B are fixed and determined empirically. QC step is dynamic in nature and changes with each solution iteration. Additionally, the size of the problem in the QC step that contains all possible machine-cell assignments, remains constant. The classical computer 102 also initializes the upper bound to an initial value (such as positive infinity), the lower bound to an initial value (such as negative infinity) and all assignment variables $y_jk$, to initial values (such as assigning all machines to the first cell).

In block 904, the classical computer 102 solves the dual LP problem, such as by using the MILP solver Gurobi. Optimal values of the variables $m_{ijk}$, $n_{ijk}$ and $s_i$, are obtained by solving the dual LP problem. The objective function value of the dual LP problem denoted by $Z_T^*$.

In block 906, the classical computer 102 checks whether the dual LP problem is feasible. If the dual LP problem is not feasible, then no solution exists for the original problem and the algorithms stops in block 908. If the dual LP problem is feasible, the method 900 proceeds to block 910, in which the classical computer 102 determines whether a new upper bound has been determined. The upper bound is updated based on whether the objective function value $Z_T^*$ is lower than the current upper bound. If so, the upper bound is updated in block 912.

In block 914, the classical computer 102 sends optimal values of the variables $m_{ijk}$, $n_{ijk}$ and si obtained by solving the dual LP problem (denoted as $\hat{m}_{ijk}$, $\hat{n}_{ijk}$, and $\hat{s}_i$, respectively) to the quantum computer 104.

Figure 10:
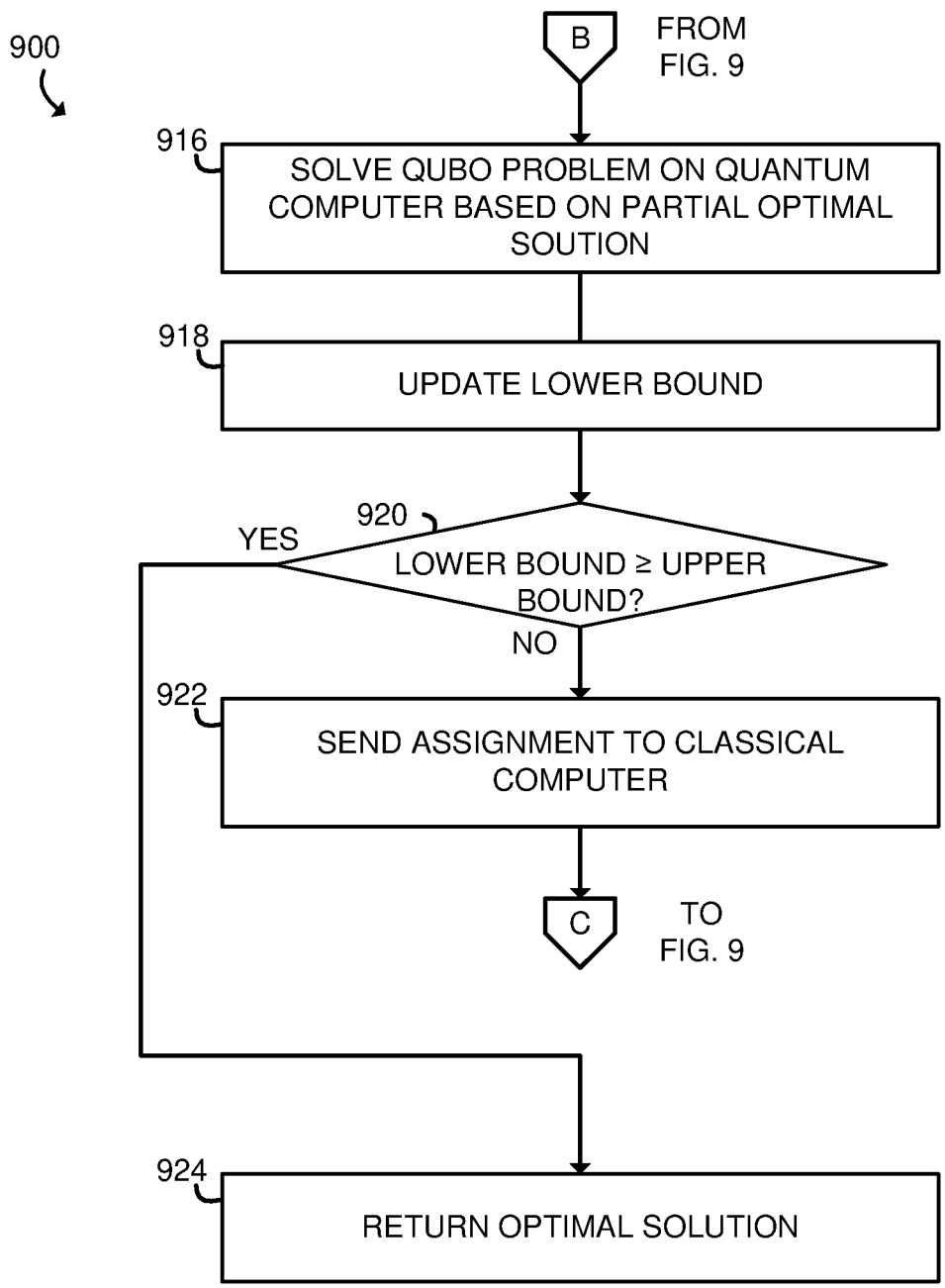

Referring now to FIG. 10, in block 916, the quantum computer 104 solves the QUBO problem on the quantum processor 302 based on the partial optimal solution of the dual LP problem to yield the assignment decisions $\overline{y}_{jk}$ corresponding to all machine-cell pairs. The objective value obtained through the QC step, $\hat{Z}_T$ during the $T^{th}$ decomposition iteration, is determined using equation $$\hat{Z}_T = \max_t \left( F_t - \sum_{j \in M, k \in R} Q_{jkt} \hat{y}_{jk} \right).$$

Functional forms of $F_t$ and $Q_{jkt}$ are provided in the QC step. In block 918, the lower bound is updated using this maximum value obtained through solving the problem in the QC step.

In block 920, if the lower bound is equal to or greater than the upper bound, then the optimal solution has been determined, and the optimal solution is returned in block 924. Otherwise, the assignment variables obtained from solving the problem in the QC step are sent to the classical computer 102, and the method 900 loops back to block 904 to solve the dual LP problem with the updated assignment variables.

Figure 11:
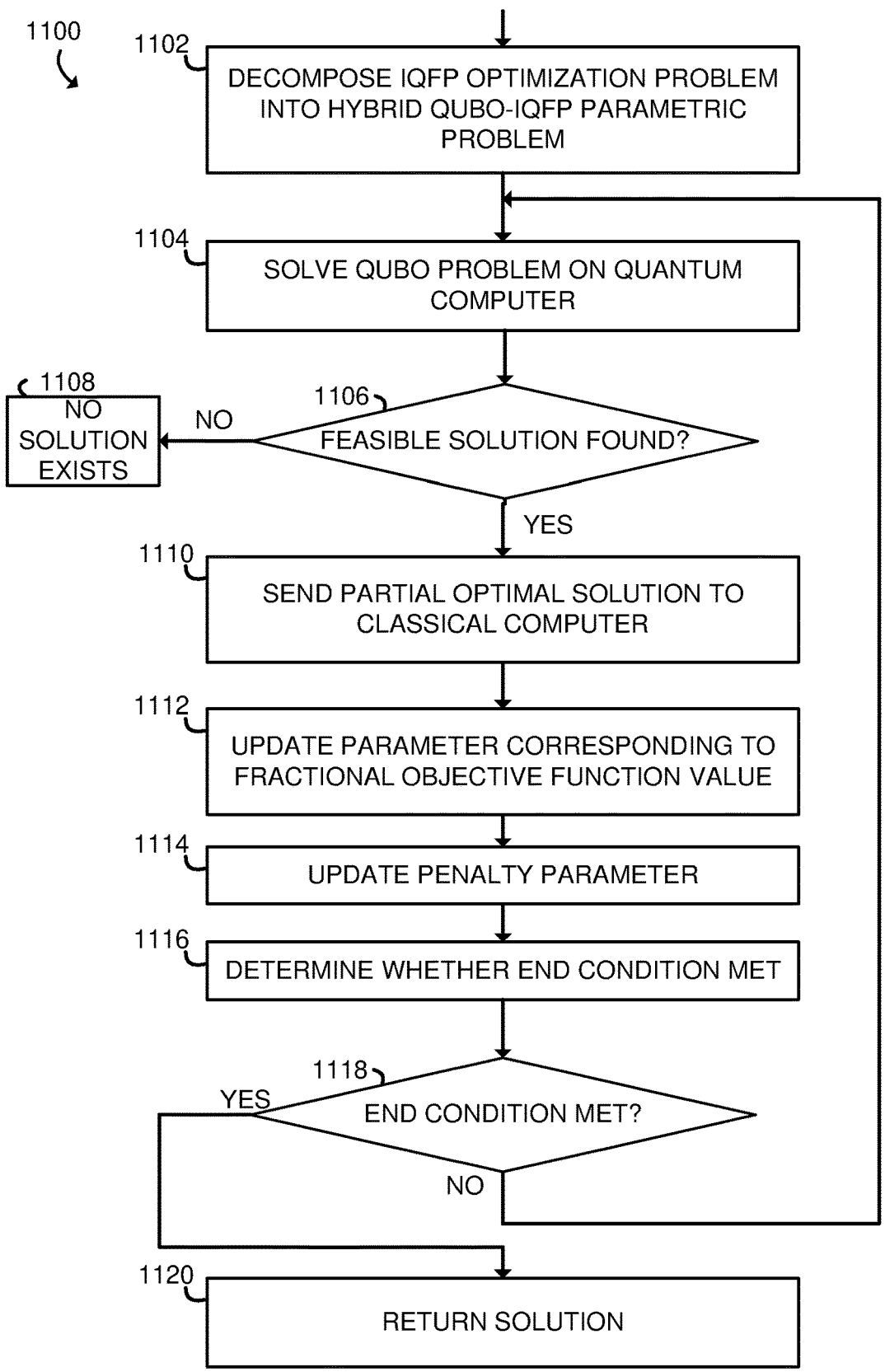
FIG. 11 is a simplified flow diagram of at least one embodiment of a method for solving an integer quadratic fractional program (IQFP) optimization problem that may be executed by the system of FIG. 1.

Referring now to FIG. 11, in use, the system 100 may execute a method 1100 for solving a vehicle routing problem in the form of an IQFP. The vehicle routing problem is concerned with determining an optimal set of routes for a fleet of vehicles in order to serve a given set of customers or locations, in order to minimize the total transportation cost. Operational constraints must also be satisfied when minimizing the global transportation cost.

The vehicle routing problem can be represented by a quadratic vehicle flow model for a variant of the capacitated vehicle routing problem. The purpose of the quadratic formulation is to significantly reduce the number of constraints, so that it can also serve as a basis for more complicated vehicle routing problem variants. The formulation involves a vertex set V representing the customer and depot locations, where the vertex 0 represents the depot. Customers are to be serviced by the available vehicles in set H. Set N is a collection of steps covered by the vehicle. The maximum number of allowable steps for a vehicle is equal to the number of vertices so as to avoid multiple visits to the same location. The cost of travelling from location $i \in V$ to location $j \in V$ is denoted by $C_{ij}$, and the working time for the same pair of locations is represented by $W_{ij}$. The working time and travel costs between two locations are not considered to be proportional as the costs and time are influenced by several external factors, thus mimicking real-world conditions.

The vehicle routing problem aims to determine at most |H| optimal routes such that specific design requirements are satisfied along with operational constraints, while minimizing total travel cost/time or maximizing profits. The decision variables in this model are the set of binary variables $x_{ip}^v$ that indicate whether the customer location $i \in V$ is visited by vehicle $v \in H$ at step $p \in N$ of its route. Using the above described variables and parameters, the vehicle flow model for the vehicle routing problem can be written as follows.

$$\min \frac{\sum_{v \in H} \sum_{i \in V} \sum_{j \in V} \sum_{p \in N} C_{ij} x_{ip}^v x_{jp+1}^v}{\sum_{v \in H} \sum_{i \in V} \sum_{j \in V} \sum_{p \in N} W_{ij} x_{ip}^v x_{jp+1}^v} \quad (21)$$

$$\text{s.t.} \sum_{v \in H} \sum_{p \in N} x_{ip}^v = 1, \forall i \in V \setminus \{0\} \quad (22)$$

$$\sum_{i \in V \setminus \{0\}} x_{ip}^v = \sum_{i \in V} x_{ip+1}^v, \forall p \in N, \forall v \in H \quad (23)$$

$$x_{ip}^v \in \{0, 1\}, \forall v \in H, \forall p \in N, \forall i \in V \quad (24)$$

The objective of this problem in (21) is to minimize the logistic ratio defined as the ratio of total cost incurred to the overall resources spent to serve the customers. The numerator of objective function in this IQFP model indicates the total travelling cost of vehicles; the denominator represents the total working time used to serve all the customer locations. Each customer must be visited and serviced only once by exactly one vehicle, as given by constraint (22). The set $V \setminus \{0\}$ represents all the customer locations only, where the $0^{th}$ vertex is the depot location. Constraint (23) enforces that a vehicle servicing a customer must leave for another customer or return to the depot in the next step of its route. No capacity restrictions are placed on the vehicle, and complete flexibility is assumed of its demand and supply operations. The demand capacity constraints are not considered in this vehicle flow model. However, such constraints can be easily incorporated into this formulation to facilitate the formulation of some complex variants of the vehicle routing problem.

In block 1102, the classical computer 102 decomposes the IQFP optimization problem. The decomposition adopts an efficient parametric algorithm along with quantum computing-based techniques. The decomposition approach uses an extension of inexact parametric algorithm as a basis framework for the global optimization of fractional programming problems. The algorithm iteratively solves the problem in the quantum computing step until convergence is achieved. An objective for the quantum computer is shown in Eq. (25).

$$\left. \begin{array}{l} \min H = H_{obj} + AH_c \\ \text{s.t. } H_{obj} = \sum_{v \in H} \sum_{i \in V} \sum_{j \in V} \sum_{p \in N} (C_{ij} - \lambda W_{ij}) x_{ip}^v x_{jp+1}^v \\ H_c = \sum_{i \in V \setminus \{0\}} \left( \sum_{v \in H} \sum_{p \in N} x_{ip}^v - 1 \right)^2 + \sum_{v \in H} \sum_{p \in N} \left( \sum_{i \in V \setminus \{0\}} x_{ip}^v - \sum_{i \in V} x_{ip+1}^v \right)^2 \end{array} \right\} QC \text{ step} \quad (25)$$

The objective of Eq. (25) is to determine the set of optimal routes for the formulated vehicle routing problem. Solving the problem in the QC step minimizes the Hamiltonian H that takes the form of a QUBO problem. This Hamiltonian includes two separate Hamiltonians $H_{obj}$ and $H_c$ shown in the QC step that correspond to the quadratic objective function and the route and service constraints, respectively. The model uses a parameter $\lambda$ that is dynamic in nature and changes with each iteration. Penalty weight A in the QUBO problem also changes with each iteration and is set considerably higher than any coefficient in $H_{obj}$. Thus, the QUBO problem in the QC step is dynamic in nature, but the size of this QUBO problem remains constant with the number of binary variables equal to that of variables in the original IQFP problem. The parameter $\lambda$ is set to an initial value of zero In block 1104, the quantum computer 104 solves the QUBO to obtain a set of feasible vehicle routes denoted by $\hat{x}_{ip}^v$. In block 1106, the classical computer 102 checks whether feasible vehicle routes were found. If not, then no solution exists for the original problem and the algorithms stops in block 908. If feasible vehicle routes are found, the vehicle routes are sent to the classical computer 102 in block 1110.

In block 1112, the classical computer 102 updates the parameter $\lambda$ to be the current value of the objective function in Eq. (21). In block 1114, the classical computer 102 updates the penalty parameter for the next iteration. In the illustrative embodiment, the penalty parameter is set to the objective function value of the original IQFP problem.

In block 1116, the classical computer 102 determines whether an end condition is met. In the illustrative embodiment, the metric to check for the end condition is the change in change in parameter $\lambda$ from one iteration to the next. If the change in $\lambda$ is below a threshold, then the end condition is met.

In block 1118, if the end condition is met, the method 800 proceeds to block 1120 to return the assigned vehicle routes. If not, the method 800 loops back to block 1104 to resolve the QUBO problem with the updated parameter.

It should be appreciated that applications of optimization problems are not limited to the specific examples given herein. Rather, a similar approach of formulating optimization problem into a manner suitable for a quantum processor 302 can be used for a wide variety of optimization problems. For example, in one embodiment, a molecular conformation problem may be formulated into a QUBO problem, allowing the conformation problem to be solved on a quantum processor 302.

Any spatial arrangement of the atoms in a molecule that result from rotations about their single bonds are termed as molecular conformations Minimization of total potential energy associated with configuration of atoms in a molecule is known as the molecular conformation problem. To eliminate complex nonlinearities, the molecular conformation problem can be modeled by a discrete approximation on a 3-dimensional lattice. Solution to this simplified discretization of the molecular conformation problem can serve as a starting point for the global optimization of the continuous molecular conformation problem.

A molecule comprising of B atoms modeled as single spheres or beads is placed inside a 3-dimensional cubic lattice with N sites such that N≥B. In a string of beads model, the molecule consists of B beads, $a_1, a_2, \ldots a_B$, where $a_i$ denotes the ith bead in the primary sequence. Between every pair of consecutive beads $a_i$ and $a_{i+1}$, there exists a bond of length $lb_i$. The binary assignment variable $x_{ij}$ represents the assignment of bead i at lattice site $s_j$. Pairwise potential between beads $a_i$ and $a_k$ placed at sites $s_j$ and $s_l$ is modeled as Leonard-Jones (LJ) potential given by $U_{ijkl}^{LJ}$ in Eq. (26), where $\varepsilon_{ik}$ and $\sigma_{ik}$ are LJ parameters representing the depth of potential well and distance at which interparticle potential is zero, respectively. These parameter values are dependent on the nature of beads.

$$U_{ijkl}^{LJ} = 4\varepsilon_{ik}\left(\left(\frac{\sigma_{ik}}{r_{jl}}\right)^{12} - \left(\frac{\sigma_{ik}}{r_{jl}}\right)^{6}\right) \tag{26}$$

A bond stretching potential $U_{ijkl}^{bond}$ is introduced between each consecutive pair of beads $a_i$ and $a_k$ given in Eq. (27). Distance between lattice sites $s_j$ and $s_l$ is given by $r_{jl} = \|s_j - s_l\|_2$. The penalty parameter $\beta$ enforces that the distances between consecutive beads remain within an allowable distance of the required bond lengths. $U_{ijkl}$ represents the total potential energy contribution to the free energy of the system due to placement of beads $a_i$ and $a_k$ at sites $s_j$ and $s_l$. Moreover, the terms $U_{ijil}$ and $U_{ijkj}$ are set to a very high value to ensure that no two beads are placed at the same location, and no bead is assigned to two locations. Bond bending potentials and torsional potentials are ignored in this case due to their trivial contribution to the free energy of the system and for the sake of simplicity. The molecular conformation problem is to determine the locations of beads within the cubic lattice, set of bond lengths, and bond angles.

$$U_{ijkl}^{bond} = \beta(r_{jl} - lb_i)^2 \tag{27}$$

$$U_{ijkl} = U_{ijkl}^{LJ} + U_{ijkl}^{bond} \tag{28}$$

The discretized molecular conformation problem can be formulated as a quadratic assignment problem. The quadratic term $U_{ijkl}x_{ij}x_{kl}$ represents the direct contribution to total free energy when the bead $a_i$ and $a_k$ are assigned to sites $s_j$ and $s_l$, respectively. The objective function in Eq. (29) is the total potential energy of the system to be minimized Constraints in (30) are assignment constraints to ensure that each bead occupies exactly one lattice site. Constraint (31) makes sure that at most one bead occupies each lattice site $s_j$.

$$\min \sum_i^B \sum_j^N \sum_k^B \sum_l^N U_{ijkl} x_{ij} x_{kl} \tag{29}$$

$$\text{s.t.} \sum_{j=1}^N x_{ij} = 1, \ \forall \, i = 1, 2, \ldots B \tag{30}$$

$$\sum_{i=1}^B x_{ij} \leq 1, \ \forall \, j = 1, 2, \ldots N \tag{31}$$

$$x_{ij} \in \{0, 1\}, \ \forall \, i = 1, \ldots, B, \forall \, j = 1, \ldots, N \tag{32}$$

The molecular conformation problem can be formulated as a QUBO problem by modeling the assignment constraints as weighted penalty functions. Eq. (33) represents the QUBO formulation of the Hamiltonian to be minimized for the molecular conformation problem.

$$\min H = \tag{33}$$

$$\sum_i^B \sum_j^N \sum_k^B \sum_l^N U_{ijkl} x_{ij} x_{kl} + A \sum_{i=1}^B \left(\sum_{j=1}^N x_{ij} - 1\right)^2 + A \sum_{j=1}^N \left(\sum_{i=1}^B x_{ij}\left(\sum_{k=1}^B x_{kj} - 1\right)\right)$$

The weight parameter A is chosen such that $A \gg U_{ijkl}$ to enforce constraint satisfaction. It should also be noted that the size of this dense QUBO problem increases quadratically with the number of binary variables. With the molecular conformation problem presented in the form of a QUBO, it can be solved on the quantum processor 302 in the same manner referenced above, such as by using the qbsolv algorithm.

Figure 12:
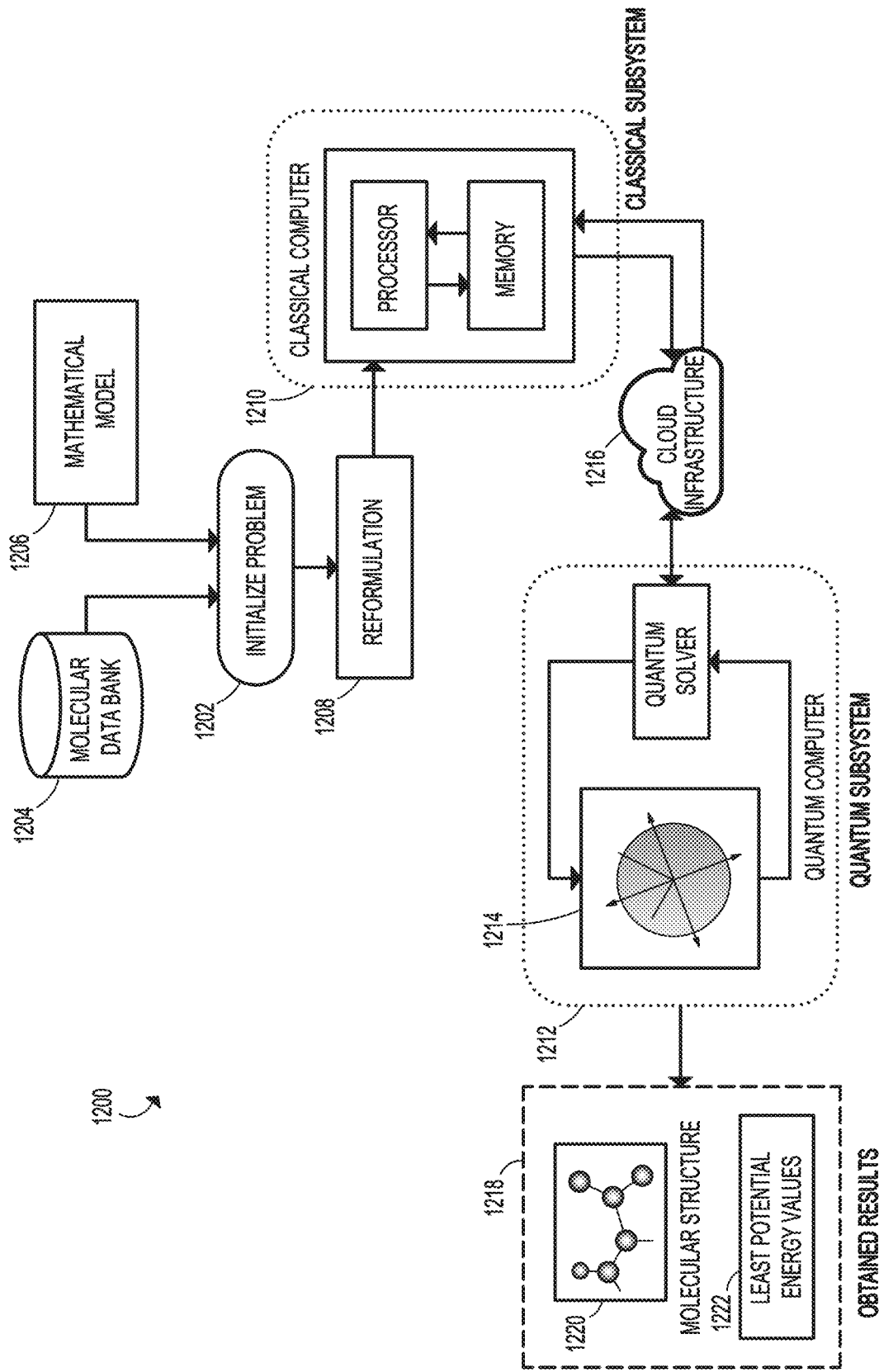
FIG. 12 is a simplified diagram of at least one embodiment of a system for solving molecular conformation problems and similar problems such as protein folding.

Referring now to FIG. 12, in one embodiment, a system 1200 for solving molecular conformation problems and similar problems like protein folding is shown. The molecular conformation problem is initialized in block 1202 using structural and functional data from molecular data banks 1204 combined with a formulated mathematical model 1206. This molecular data bank 1204 can be acquired both through experiments and molecular simulations. The conformation problem is reformulated into a quadratic integer optimization problem in block 1208 where any classical computer 1210 can be used to store and process the said optimization problem. This problem is solved with a quantum solver 1212 assisted by a quantum computer 1214. Any quantum computing architecture capable of solving such quadratic integer problems can be used in this framework. The quantum computer 1214 need not be locally placed. To this end, the optimization problems can be solved remotely on quantum computers by sending the problem parameters over a cloud using the cloud infrastructure 1216 in place. Solutions 1218 to this optimization problem include the structural information 1220 of the molecule under study and the molecular conformation with least free energy 1222 can be predicted through this information.

Figure 13:
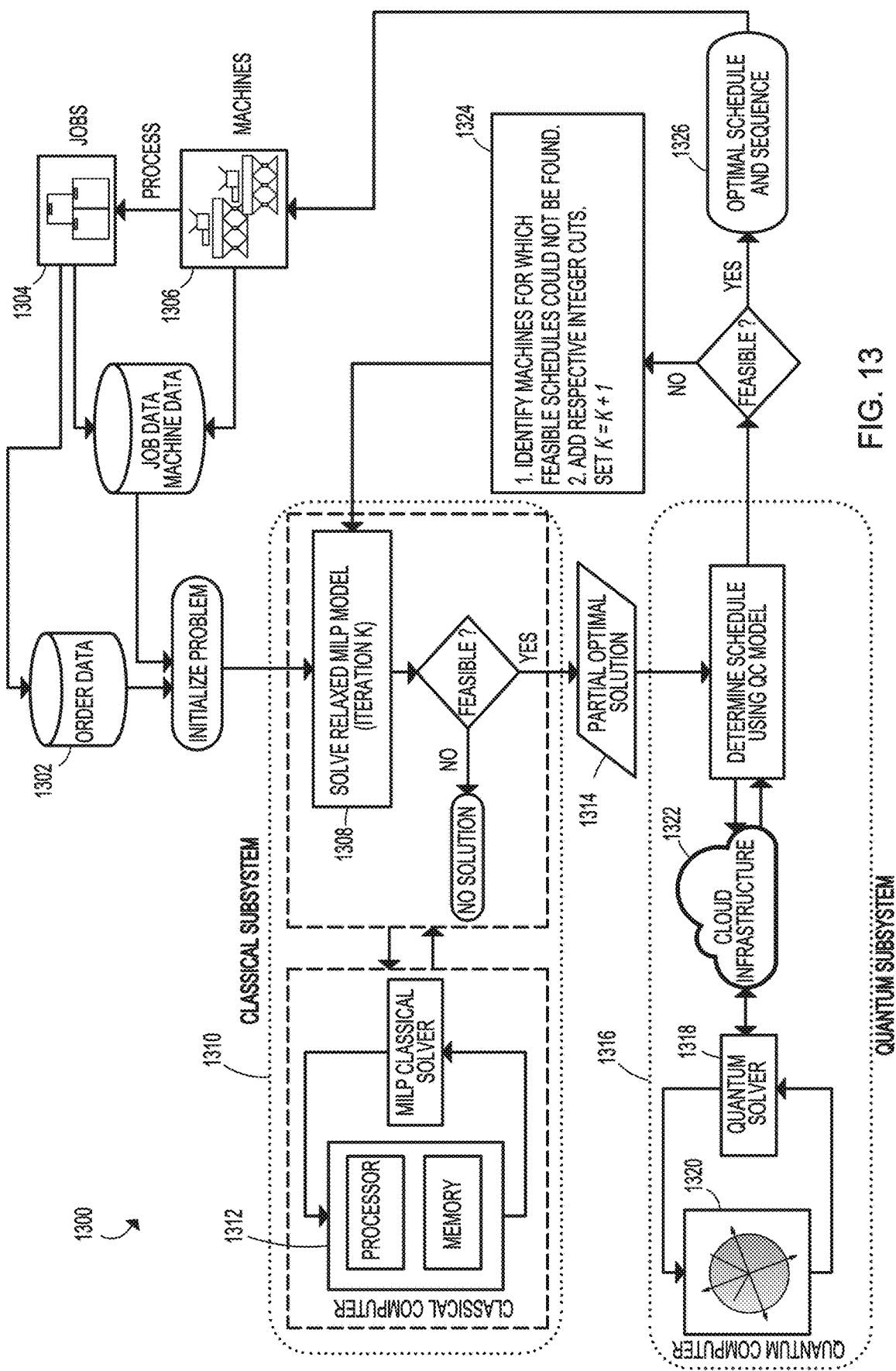
FIG. 13 is a simplified diagram of at least one embodiment of a system for solving scheduling problems using a hybrid QC-MILP decomposition.

Referring now to FIG. 13, in one embodiment, a system 1300 for solving scheduling problems using a hybrid QC-MILP decomposition is shown. The scheduling optimization problem can be initialized with the data obtained through available orders 1302, jobs 1304, machines 1306, and other relevant process components. Constraints for scheduling and sequencing can also be formulated using this obtained data. The relaxed problem 1308 is solved on the classical subsystem 1310 by any classical solver like Gurobi, CPLEX, CBC, and others on any classical computer 1312. The partial optimal solution 1314 produced by the classical subsystem is used by the quantum subsystem 1316 to determine optimal schedule. The problem in the quantum computing step is solved using quantum solver 1318 assisted by any suitable quantum computer 1320. Problems in the quantum computing step can be solved locally or remotely depending on the location of quantum computer hardware. Remote quantum computing operation is facilitated by cloud infrastructure 1322 that is set up to promote quantum computing's applicability. Based on solutions obtained through the quantum subsystem 1316, integer cuts are added to the relaxed problem at block 1324 and is re-solved by the classical subsystem 1310. The optimal schedule 1326 is used by the machines 1306 to process the jobs 1304/orders 1302 such that minimum cost is incurred.

Figure 14:
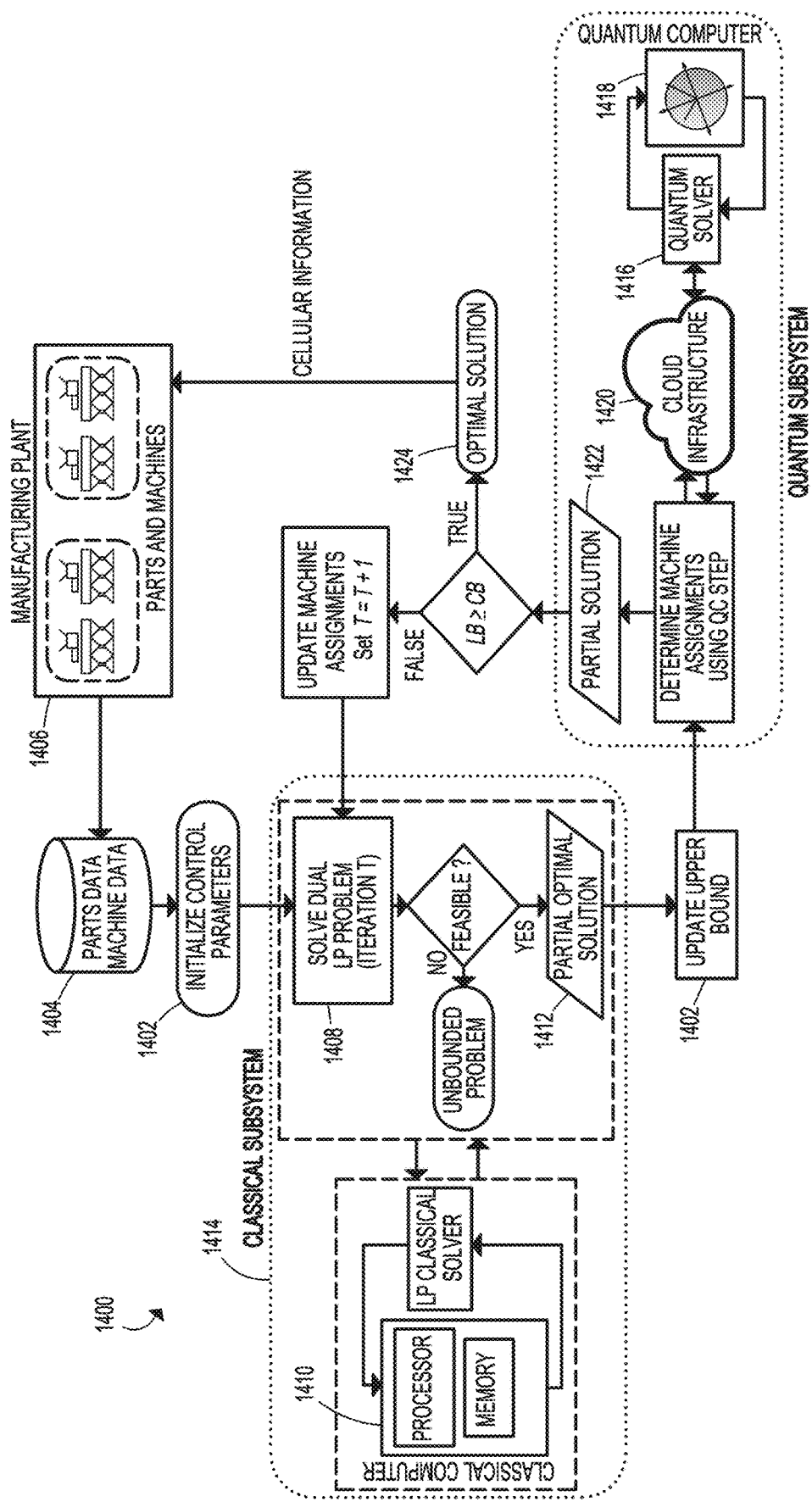
FIG. 14 is a simplified diagram of at least one embodiment of a system for solving manufacturing cell formation problems in cellular manufacturing system design using the hybrid QC-MIQP stepwise decomposition method.

Referring now to FIG. 14, in one embodiment, a system 1400 for solving manufacturing cell formation problems in cellular manufacturing system design using the hybrid QC-MIQP stepwise decomposition method is shown. The problem and control parameters are initialized in block 1402 using the plant data 1404 acquired from the manufacturing plant 1406. The dual problem 1408 is solved using any classical solver like Gurobi, CPLEX, CBC, and others on any classical computer 1410. Solution 1412 to this problem is an upper bound on the desired optimal solution. The partial optimal solution 1402 produced by the classical subsystem 1414 is used to compute machine assignments in the quantum computing step. Problems in the quantum computing step are solved by a quantum solver 1416 that is assisted by any quantum computing architecture 1418 capable of solving quadratic integer optimization problems. These optimization problems can be solved locally or remotely on quantum computers by sending the problem parameters over cloud using the cloud infrastructure 1420 in place. Solution 1422 obtained using the quantum computing subsystem provides a lower bound on the desired optimal solution. This process is repeated with updated machine assignments until the optimality conditions are satisfied. The final optimal solutions 1424 include division of machines and parts into cells such that their production cost is minimized and profits are maximized.

Figure 15:
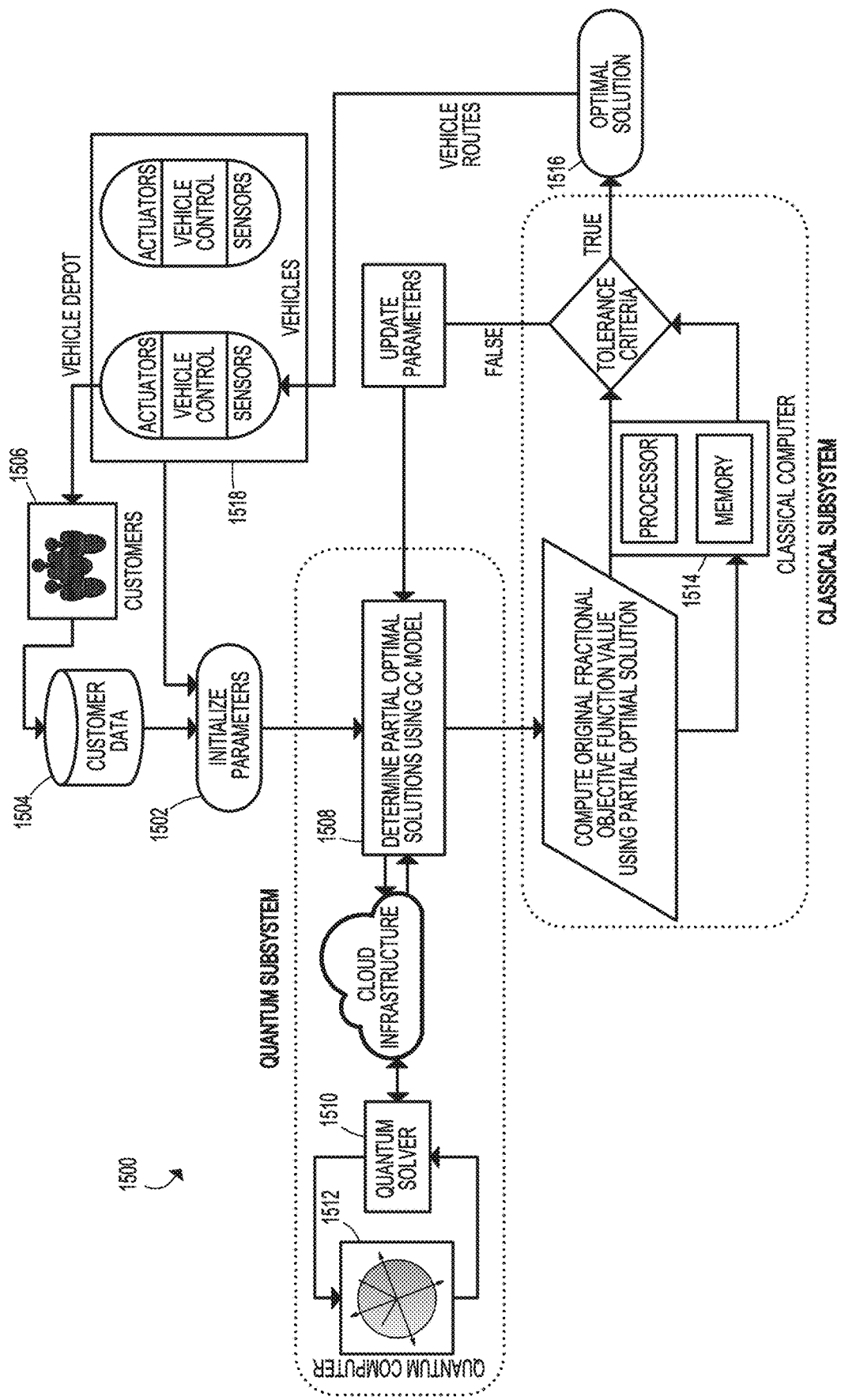
FIG. 15 is a simplified diagram of at least one embodiment of a system 1500 for solving vehicle routing problems and similar integer fractional optimization problems using hybrid QC-IQFP parametric methods.

Referring now to FIG. 15, in one embodiment, a system 1500 for solving vehicle routing problems and similar integer fractional optimization problems using hybrid QC-IQFP parametric methods are shown. The optimization problem is initialized in block 1502 using order data 1504 from customers 1506 and the vehicular data available beforehand or collected in real-time. Partial optimal solutions 1508 to this optimization problem are obtained using quantum solver 1510 assisted by a quantum computing architecture 1512 capable of solving quadratic integer optimization problems. The original fraction objective function value is computed on a classical computer 1514. The steps are repeated until the optimality criteria is satisfied. Optimal solution 1516 obtained through this framework include optimal routes for the vehicles to follow such that the costs incurred are minimized. This information can be used by vehicles directly in case of autonomous vehicles or by drivers to drive to the desired locations from the vehicle depot 1518.

Problems Solvable by the Hybrid Quantum Computer-Classical Computer (QC-CC) Based Computation System QC-CC based hybrid systems and methods to solve complex large-scale optimization problems are disclosed herein, especially for discrete-continuous optimization problems. The aim of the disclosed systems and methods is for the general mixed-integer nonlinear programming (MINLP) problems. To demonstrate the application of the disclosed systems and methods, the disclosure specifically listed four exemplary problems, e.g. molecular conformation problem, job-shop scheduling problem, manufacturing cell formation problem, and vehicle routing problem. Those problems are formulated as binary quadratic programs (BQPs), mixed-integer linear programs (MILPs), mixed-integer quadratic programs (MIQPs), and integer quadratic fractional programs (IQFPs), respectively, and all of them can be solved by the QC-CC based hybrid systems successfully with similar or better results and efficiency than only using the classical computer with the state of the art classical optimization solver. Some large problems that cannot be solved by only using the classical computer are successfully solved by the QC-CC based hybrid systems. The MILP, NLP, and LP are simplified version of MINLP problems; the BQPs, MIQPs, and IQFPs are subtypes of MINLP problems. All of those formulations are encompassed within the MINLP class of problems. The disclosed systems and methods can efficiently tackle the complex large scale MINLP problems, including but not limited to problem classes of BQP, MILP, MIQP, and IQFP. The decomposition methods for each of the problem classes together with decomposition methods for other problem classes (most of them would be easier) can form a library to instruct the preprocessing or classification of any given optimization problem. Any typical optimization problems with real-world complexity that can be formulated as one of these classes in the library could also be solved with the corresponding QC-CC based hybrid systems and methods. The present disclosure provides a few examples of typical real-world optimization problems. Problems relevant to molecular and drug design, location or resource allocation, planning scheduling, production, electronic components manufacturing, communication, machine learning, data science, and other fields like archeology and sports, can be solved with corresponding QC-CC based hybrid systems and methods. The hybrid QC-MILP decomposition method can solve commonly occurring MILP problems in production planning, scheduling, telecommunication networks, cellular networks, energy systems, industrial design and synthesis, and autonomous vehicle guidance. Applications of MIQP problems include water resources, portfolio optimization, optimal control, manufacturing and planning in industries and can be solved with the hybrid QC-MIQP stepwise decomposition method. Problems that deal with minimizing industrial waste, maximizing return on investment, routing, maintenance, numerical analysis, and optimizing relative rates, can generally be formulated as IQFP problems and can be solved by the hybrid QC-IQFP parametric method. This list of problems provided is not exhaustive and several other problems could potentially be reformulated and solve with the disclosed QC-CC based hybrid systems and methods. Overall, discrete-continuous optimization problems belonging to the class of MINLPs can be solved by the disclosed QC-CC based hybrid systems and methods.

Deterministic Global Optimization Based on Iterative QC-CC Decomposition Methods In some embodiments, an original optimization problem could be reformulated or decomposed to at least two (optimization) sub-problems which have smaller sizes than the original problem, wherein at least one of the at least two sub-problems is called master (optimization) problem(s), and the remaining (optimization) sub-problems are also called (optimization) sub-problems. A decomposition method solves the original problem by solving the master problem(s) and the remaining sub-problem(s), using an iterative method, which solves the problems by iteratively computing between a classical computing system and a quantum computing system with a quantum processor. In a specific example, the QC-CC based hybrid systems iteratively generate upper bound and lower bound for an optimal value by solving master problem(s) and remaining sub-problem(s) by a quantum computer and a classical computer separately. Each iteration requires solving the at least one master problem and at least one sub-problem, wherein at least one of the sub-problems or master problems is solved by the quantum computing system and the remaining sub-problem(s) or master problem are solved by the classical computing system. This computation of each iteration can be done sequentially or in parallel based on the structure of the master problem and/or sub-problems. In some embodiments, a first bound (upper bound or lower bound) can be generated by solving at least one of the at least two sub-problems (e.g. at least one of the sub-problems or master problems) in order to solve the original optimization problem. A second bound (lower bound or upper bound) can be generated by solving at least another one of the at least two sub-problems (e.g. the remaining sub-problem(s) or master problems) in order to solve the original optimization problem. In each iteration, at least one bound of the lower bound and upper bound can be updated based on the computation results of the hybrid QC-CC system. While the upper bound and lower bound converge or converge to a preset convergence threshold value (a sufficient small number such as <0.001, <0.000001, etc.), the optimal solution or the global optimal solution of the master optimization problem and the original optimization problem can be obtained.

In some embodiments, although the QC step could return local optimal solutions or multiple solutions for the sub-problems due to QC's probabilistic nature, the disclosed QC-CC hybrid system can obtain or guarantee optimality and/or global optimal solutions for the original problem in finite number of iterations, based on the optimization theory. For example, a global optimality is guaranteed by convergence of proper upper bound and lower bound for the global optimal solution, especially for an optimization problem with one or more local optimal solutions, such as a MINLP problem. Alternatively, one may also prove infeasibility of getting global optimal solutions in finite number of iterations, for example, due to failure of convergence.

In some embodiments, each iteration may comprise at least two phases. In the first phase, the quantum computing system solves at least one sub-problem (e.g. a first sub-problem) of the at least two sub-problems wherein the results comprise a feasible solution for the sub-problem (e.g. a first sub-problem). In the second phase, the classical computing system receives results from the quantum computing system comprising a feasible solution and generates at least one updated parameter based on the computation results of the first phase for the second phase computation, wherein the at least one updated parameter can be selected from a lower bound (LB), an upper bound (UP), an integer cut, a cutting plane, a partial optimal solution, an optimal solution, a feasible optimal solution, one or more parameters for a second sub-problem, values or ranges for one or more variables for the second sub-problem and/or any combination thereof. In the second phase, the classical computing system solves the remaining sub-problems of the at least two sub-problems (e.g. a second sub-problem, or a master problem) and generates at least another updated parameter based on the computation results of the second phase for the first phase computation, wherein the at least another one updated parameter can be selected from an upper bound (UP), a lower bound (LB), an integer cut, a cutting plane, a partial optimal solution, an optimal solution, a feasible optimal solution, one or more parameters for a first sub-problem, values or ranges for one or more variables for the first sub-problem, and/or any combination thereof. The at least one updated parameter and the at least another updated parameter are different.

In other embodiments, each iteration may comprise at least two phases. In the first phase, the classical computing system solves at least one sub-problems of the at least two sub-problems (e.g. a first sub-problem, or a master problem), wherein the results comprise an optimal solution for the sub-problem. In the second phase, the quantum computing system solves at least another sub-problem of the at least two sub-problems (e.g. a second sub-problem) wherein the results comprise a feasible solution for the second sub-problem. The optimal solution of the first sub-problem solved by a classical computing system can generate at least one updated parameter based on the computation results of the first phase for the second phase computation, wherein the at least one updated parameter can be selected from a lower bound (LB), an upper bound (UP), an integer cut, a cutting plane, a partial optimal solution, one or more parameters for the second sub-problem, and/or any combination thereof. In some embodiments, a feasible solution of the second sub-problems solved by a quantum computing system can generate at least another one updated parameter based on the computation results of the second phase for the first phase computation of the next iteration, wherein the at least another one updated parameter can be selected from an upper bound (UP), a lower bound (LB), an integer cut, a cutting plane, a partial optimal solution, an optimal solution, a feasible solution, one or more parameters for the first sub-problem in the next iteration, values or ranges for one or more variables for the first sub-problem, and/or any combination thereof.

In some embodiments, each iteration may comprise solving at least two optimization problems comprising at least one master problem and at least one sub-problem. One (the first) of the two optimization problems is solved by a quantum computing system and another (the second) of the two optimization problems is solved by a classical computing system using a classical optimizer or classical optimization solver.

The optimization sub-problem solved by a classical computer could be an optimization problem selected from a MILP problem, a MIQP problem, a MINLP problem, a nonlinear programming (NLP) problem, an integer programming (IP) problem, or a linear programming (LP) problem. The classical optimization solver could be selected from a MILP solver, a MIQP solver, a MINLP solver, an NLP solver, a LP solver, a global optimization solver, a general optimization solver, or any combination thereof, for example, a global MINLP optimization solver.

Among the exemplary application cases, the scheduling problem and the manufacturing cell formation problem can be solved by the iterative QC-CC hybrid system and decomposition methods, and the global optimal solutions are obtained upon the convergence controlled by the classical computer and the quantum computer, such as the upper/lower bound computed by the classical computer converges to the lower/upper bound computed by the quantum computer; or the lower bound computed by the classical computer converges to the upper bound computed by the quantum computer. For example, if the objective is maximization, the QC step gives the lower bound; if the objective is minimization, the QC step gives the upper bound.

In some embodiments, the quantum computer or the hybrid QC-CC based computation system further comprises a classical processor to further decompose the at least one sub-problem (e.g. the first sub-problem) into a plurality of sub-sub-problems. In such decomposition, the at least one sub-problem (e.g. the first sub-problem) and the sub-sub-problems are Quadratic Unconstrained Binary Optimization (QUBO) problems. The system formulates at least one QC (optimization) sub-problems and at least one classic (optimization) sub-problems. Each optimization sub-problem includes at least one objective function (with variables) and the objective functions of the sub-problems for QC and the classic one are different. Then the system solve both (optimization) sub-problems with an option of iteratively updating parameters for both or at least one (optimization) sub-problems until an optimal solution for the general optimization problem is obtained. In some embodiments, the optimal solution for the general optimization problem is a global optimal solution, which can be theoretically proved and has been confirmed in illustrated examples of small sized problems by using a global optimization solver in the classic computer.

QC-CC Based Hybrid System and Method Solve Other Computation Problems which can be Converted into an Optimization Problem The present QC-CC based hybrid systems and methods can also be used to solve any other computation problems that could be converted or formulated as optimization problems. For example, most machine learning problems can be reduced to optimization problems and computational optimization forms the basis of machine learning. Classical optimization algorithms in machine learning often take up long computational times and require large CPU and GPU resources when applied to high-dimensional problems. Optimization in machine learning involves minimizing the defined errors or losses computed between the observations and the predictions. In practice, several types of losses can be chosen to be minimized subject to model constraints. For example, machine learning algorithms like linear regression, and time series analysis, requires minimization of mean square error (MSE) loss as shown in Eq. 34. While applying regularization to machine learning problems, optimization problems can be subject to several constraints like LASSO regression constraint, ridge regression constraint, elastic net constraint, etc. Support vector machine is a popular classification technique in machine learning and is achieved by solving a complex optimization problem as shown in Eq. 35. Clustering techniques in unsupervised machine learning like k-means involves minimizing the distance between data points and their assigned cluster centers as shown in Eq. 36 and are subject to required assignment constraints. Deep learning which is a rapidly growing branch of machine learning requires finding the optimal model parameters while minimizing loss function required by specific tasks. In deep learning, MSE loss in Eq. 34 is minimized for regression tasks, while cross entropy (CE) loss as shown in Eq. 37 is minimized for classification tasks. KL divergence loss in Eq. 38 is minimized for generative models in deep learning like variational autoencoder, generative adversarial networks, deep Boltzmann machines, etc.

$$\min MSE = \sum_i \left(y_i^{observed} - y_i^{predicted}\right)^2 \tag{34}$$

$$\min_{w,b} \frac{1}{2} w^T w \tag{35}$$

$$\text{s.t. } y_i(w^T x_i + b) \geq 1 \ \forall \ i$$

$$\min \sum_i \sum_k y_{ik} \left(\sum_j (x_{ij} - z_{jk})^p\right)^{1/p} \tag{36}$$

$$\min CE = -\sum_c y_c \log p_c \tag{37}$$

$$\min D_{KL}(P\|Q) = \sum_x P(x) \log\left(\frac{P(x)}{Q(x)}\right) \tag{38}$$

The above optimization problems in machine learning belong to the class of nonlinear optimization problems and can be solved as a special case of mixed-integer nonlinear programming (MINLP) problems. Special classes of such optimization problems in machine learning algorithms can also be formulated as mixed-integer linear programs, mixed-integer quadratic programs, and mixed-integer fractional programs. Due to the complex nature of optimization problems in machine learning arising from high-dimensionality and large number of observations, classical optimization algorithms might not be effective and may yield sub-optimal solutions. Their limitations can be overcome by quantum computing (QC)-classical computing (CC) based hybrid solutions strategies disclosed herein, which can effectively solve such complex problems. A quantum advantage can be applied to these optimization problems with the developed QC-based hybrid solution strategies for large-scale discrete-continuous optimization problems.

In some embodiments, a computation problem to be solved by a machine learning algorithm is formulated as an optimization problem by a pre-processing unit stored in a machine/computer readable non-transitory storage medium of a classical computer or classical computing system, wherein the pre-processing unit comprises instructions, algorithm and/or a library to convert a given computation problem into a converted computation problem comprising at least one (converted) optimization problem based on a selected machine learning algorithm. The converted computation problem comprising an optimization problem is solved by a hybrid QC-CC computation system and method (e.g. the hybrid QC-CC computation system and method in this disclosure) to obtain an optimal solution of the converted computation problem. The optimal solution could be a global optimal solution. The classical computer further comprises a post-processing unit stored in a machine/computer readable non-transitory storage medium of the classical computer configured to automatically translate or convert the optimal solution or results of the (converted) optimization problem back into a solution for the original computation problem. In another word, a hybrid QC-CC computation system solves a machine learning problem using a selected machine learning algorithm by solving an optimization problem converted from the original machine learning problem and the selected machine learning algorithm. The machine learning algorithm could be selected from but not limited to a linear regression, time series analysis, support vector machine, neural network algorithm, k-means, and other clustering algorithms in unsupervised machine learning, variational autoencoder, generative adversarial networks, or deep Boltzmann machines, etc. The original machine learning problem could be a supervised learning problem, a regression problem, a classification problem, an unsupervised learning problem, a clustering problem, a reinforcement learning problem, or a deep learning problem, and wherein the machine learning algorithm could be any supervised learning algorithm, any unsupervised learning algorithm, any reinforcement learning algorithm or any deep learning algorithm that can be converted into a converted computation problem comprising at least one optimization problem.

Decomposition Algorithms Used to Decompose an Optimization Problem into Two or More Sub-Problems.

Embodiments of hybrid quantum computing (QC)-classical computing (CC) solution strategies for large-scale discrete-continuous optimization problems (comprising one or more discrete variables and one or more continuous variables) advantageously exploit the decomposable structure of optimization problems. The main requirement that should be satisfied by the decomposition technique is that the two sub-problems obtained by decomposing the original optimization problem are solvable by classical and quantum computer, respectively. The general idea behind any decomposition procedure is to separate the complicating variables and constraints that prevent straightforward solution of the problem, such that the resulting sub-problems are easier to solve. In many cases, selective decomposition techniques made available as a library cannot be directly used but can be customized (optionally with instructions) to decompose the optimization problem for further application of hybrid QC-CC solution strategies. The main idea is to identify the most appropriate decomposition method based on the structure of the original discrete-continuous optimization problem.

Dantzig-Wolfe decomposition is an algorithm for solving linear programs and separates complicating constraints into smaller and easy to solve sub-problems.

A certain large-scale mixed-integer linear programs can be decomposed into smaller sub-problems using Benders decomposition. In this technique, a dual of the optimization problem is solved to generate Benders cuts and further minimize cost subject to all available Benders cuts. Some of the main drawbacks for these linear decomposition techniques are time-consuming iterations, poor feasibility and optimality cuts, and ineffective initial iterations.

Generalized Benders decomposition for mixed-integer nonlinear programs also operates under several convexity restrictions and does not always guarantee a global optimum.

Lagrangean decomposition is a decomposition technique that generates easier sub-problems for complex optimization problems with complicating constraints. However, this method is cursed by large number of required iterations and time-consuming estimation of bounds.

Bilevel decomposition algorithm is another class of decomposition technique that can be built on top of existing decomposition techniques and are usually developed to reduce computational cost. However, advantages offered by such techniques are not quite apparent for large-scale problem instances.

Parametric method based on reformulation and decomposition. It is suitable for formulating a parametric sub-problem of the original problem that could be easier to solve than the original problem. Iterative solution of the parametric sub-problem would lead to a solution of the original, complicated problem.

Some of the widely used decomposition techniques listed above are suitable for a specific class of optimization problems and require a specific problem structure. In most cases, library of such decomposition techniques may not be sufficient to meet the requirements of hybrid QC-CC solutions strategies. Therefore, an informed choice regarding the application or development of decomposition technique should be made by the users of QC-CC solution strategies for large-scale discrete-continuous optimization problems. In some embodiments, a decomposition method by decomposing a mixed-integer (linear or non-linear) programming problem into a smaller mixed-integer linear (or mixed-integer non-linear) programming problem (e.g. a continuous variable rich sub-problem) and a smaller, mixed-integer (linear or non-linear) programming or pure integer programming sub-problem (e.g. a discrete variable rich sub-problem or a pure discrete variable sub-problem).

In some embodiments, one sub-problem is solved using classic computing method, and another sub-problem with more discrete variables is solved using quantum computing method. In some embodiments, based on the structure (e.g. problem structure, objective function structure, and/or constraint structure) and variables of an optimization problem, one or more decomposition algorithm is selected from a library comprising a list of decomposition algorithms and instructions and decompose the optimization problem into one or more discrete-variable-rich sub-problems and one or more continuous-variable-rich sub-problems. The discrete-variable-rich sub-problems and continuous-variable-rich sub-problems are compared to the original optimization problem, wherein the discrete-variable-rich sub-problems has a higher ratio of (number of discrete-variables)/(number of total variables) than the ratio of (number of discrete-variables)/(number of total variables) in the original optimization problem, and the continuous-variable-rich subproblems has a higher ratio of (number of continuous variables)/(number of total variables) than the ratio of (number of continuous variables)/(number of total variables) in the original optimization problem. Preferably, the ratio of (number of discrete-variables)/(number of total variables) for the discrete-variable-rich sub-problem is high enough to enable its solution by a quantum computer. Most preferably, all the variables in the discrete-variable-rich sub-problem are discrete variables, and the sub-problem are a QUBO problem or can be reformulated as a QUBO problem without reducing solution quality. In some embodiments, a discrete-variable-rich sub-problem still comprises a (small) ratio of continuous variables. Such discrete-variable-rich sub-problem can still be reformulated as a QUBO problem but with additional validation, solution feasibility checking, post adjustment or post-processing steps for the computation results of the QUBO problem. In some embodiments, the solution of the QUBO problem can be used as a feasible solution for the discrete-variable-rich sub-problem comprising continuous variables, where the feasible solution may not be optimal but close to the optimal solution of discrete-variable-rich sub-problem. In some embodiments, the discrete-variable-rich sub-problems are solved by a quantum computer or quantum computing system comprising a quantum processor; the continuous variable-rich sub-problems are solved by a classical computer or classical computing system. In some embodiments, the discrete variable-rich sub-problem is further reformulated or relaxed as a QUBO problem. In some embodiments, the continuous-variable-rich sub-problem is further modified based on the differences between the discrete-variable-rich sub-problem and the QUBO problem. In other embodiments, the continuous-variable-rich sub-problem remains the same. And the convergence of the solutions for the two or more sub-problems guarantee the converged feasible solutions as an optimal solution. In some embodiments, the continuous-variable-rich sub-problem comprise both continuous variables and discrete variables. In some embodiments, the continuous-variable-rich sub-problem comprises continuous variables only, but not necessary. Reducing the ratio of discrete variables may reduce the computation complexity of the optimization problem.

In some embodiments, based on the structure and variables of an optimization problem, one or more decomposition algorithm is selected from a decomposition algorithm library comprising a list of decomposition algorithms and decomposition instructions, and decompose the optimization problem into two or more sub-problems, wherein the decomposition instructions comprise categories of problems classified based on the structure and variables, suitable decomposition algorithms matching each category of problems, and resulting types of sub-problems after decomposition.

In some embodiments, an above mentioned decomposition unit further comprising a check engine stored in a computer readable non-transitory storage medium to check computation feasibility of the sub-problems in the hybrid QC-CC computation system, e.g. if the decomposed sub-problems satisfy the requirement (e.g. solvability) of the hybrid QC-CC computation system. In some embodiments, if a first selected decomposition algorithm failed for one special optimization problems, especially for some uncategorized or multi-categorized optimization problems, a second decomposition algorithm will be applied and feasibility will be measured by the check engine. If the second decomposition algorithm fails, more decomposition algorithms will be selected one by one in sequence or in parallel until at least one feasible decomposition is achieved. In some embodiments, the check engine may further provide a ranking (e.g. a scored ranking) for multiple feasible decomposition algorithms, and send the sub-problems decomposed by the top ranked decomposition algorithm into the QC-CC computation system.

In some embodiments, the decomposition algorithm comprises an algorithm selected from Dantzig-Wolfe decomposition, Benders decomposition, Generalized Benders decomposition, Lagrangean decomposition, Bilevel decomposition algorithm, Parametric method based reformulation and decomposition, or any combination or derived algorithm thereof. In some embodiments, the decomposition algorithm decomposes an optimization problem into at least two sub-problems comprising a first sub-problem includes a first set of variables to be solved by a quantum computer comprising a quantum processor and a second sub-problem includes a second set of variables to be solved by a classical computer comprising a classical processor, wherein the first set of variables is discrete variable rich, and the second set of variables is continuous variable rich. In some embodiments, after decomposition, a sub-problem to be solved by a quantum computer has a set of variables with at least 60%, at least 70%, at least 80%, at least 90%, at least 95%, at least 99% or 100% variables to be discrete variables, preferably the higher, the better because the current quantum processor are used to solve problems with discrete/binary variables. In some embodiments, after decomposition, a sub-problems to be solved by a classical computer has a set of variables with at least 20%, at least 30%, at least 40%, at least 50%, at least 60%, at least 70%, at least 80%, at least 90%, at least 95%, at least 99% or 100% variables to be continuous variables. Here the continuous variable rich means the ratio of continuous variables in the sub-problem is higher than the ratio of continuous variables in the original optimization problem. In most situation, higher ratio of continuous variables is preferred as it may reduce the computation complexity of the mixed-integer programming problems.

In some embodiments, a hybrid QC-CC computation system, comprising: a quantum computing system with a quantum processor to solve at least one type of optimization problem or optimization sub-problem and a communication engine to transmit solutions over a local or remote network; and a classical computing system comprises a classical processor configured to perform classical computation, and a communication engine to communicate with the quantum computing system, and to specify at least one optimal objective and optimal values of variables associated with the optimal objective, wherein the quantum computing system and the classical computing system, in combination, are configured to solve the optimization problem by performing the steps of: (a) decomposing the optimization problem into two or more sub-problems; generating a first part with at least one sub-problem solvable by the quantum computing system and a second part with at least one sub-problem solvable by the classical computing system; (b) solving the first part with at least one sub-problem by the quantum computing system; (c) receiving the computation results from the quantum computing system for the first part with at least one sub-problem by the classical computing system; (d) solving the second part with at least one sub-problem by the classical computing system; (e) communicating the computation results from the quantum computing system for the first part with at least one sub-problem and the computation results from the classical computing system for the second part with at least one sub-problem; (f) wherein the act of communicating comprises updating at least one parameter for the first part with at least one sub-problem based on the computation results from the second part with at least one sub-problem and/or updating at least one parameter for the second part with at least one sub-problem based on the computation results from the first part with at least one sub-problem; and (g). repeating the steps of b-f iteratively until reaching a preset convergence limit.

EXAMPLES

Illustrative examples of the technologies disclosed herein are provided below. An embodiment of the technologies may include any one or more, and any combination of, the examples described below.

Example 1 includes a system for solving optimization problems, the system comprising a classical computer comprising a classical processor and one or more non-transitory storage media comprising a plurality of instructions that, when executed, cause the classical computer to initialize a plurality of parameters of an optimization problem, wherein the optimization problem is decomposed into a first sub-problem to be solved by a first algorithm on the classical computer and a second sub-problem to be solved by a second algorithm on a quantum processor, wherein the first sub-problem has a first set of one or more variables and the second sub-problem has a second set of one or more variables, wherein each variable of the second set of one or more variables is different from each variable of the first set of one or more variables; execute the first algorithm for the first sub-problem with use of the classical computer to determine a current result of the first algorithm; further comprising a quantum processor to execute the second algorithm for the second sub-problem with use of the quantum processor based on the current result of the first algorithm to determine a current result of the second algorithm, wherein the plurality of instructions further cause the classical computer to execute the first algorithm for the first sub-problem with use of the classical computer and with use of the current result of the second algorithm to determine the current result of the first algorithm, wherein the classical computer and the quantum processor are configured to repeat the execution of the first algorithm based on the current result of the second algorithm and repeat execution of the second algorithm based on the current result of the first algorithm, respectively, one or more times.

Example 2 includes the subject matter of Example 1, and wherein the first algorithm is a relaxed mixed-integer linear programming (MILP) problem solver and the second algorithm is a quadratic unconstrained binary optimization (QUBO) problem solver.

Example 3 includes the subject matter of any of Examples 1 and 2, and wherein the optimization problem is a job-shop scheduling problem.

Example 4 includes the subject matter of any of Examples 1-3, and wherein the first algorithm is a dual linear programming (LP) problem solver and the second algorithm is a quadratic unconstrained binary optimization (QUBO) problem solver.

Example 5 includes the subject matter of any of Examples 1-4, and wherein the optimization problem is a cellular manufacturing problem.

Example 6 includes the subject matter of any of Examples 1-5, and wherein the optimization problem is an integer quadratic fractional program (IQFP) problem, wherein the first algorithm is an operation for assigning a value to a parameter and the second algorithm is a quadratic unconstrained binary optimization (QUBO) problem based on the parameter.

Example 7 includes the subject matter of any of Examples 1-6, and wherein the optimization problem is a vehicle routing problem.

Example 8 includes the subject matter of any of Examples 1-7, and wherein each variable of the second set of one or more variables is a binary variable.

Example 9 includes the subject matter of any of Examples 1-8, and wherein repeating steps (iii) and (iv) one or more times comprises repeating steps (iii) and (iv) one or more times until an optimal solution of the optimization problem is determined.

Example 10 includes the subject matter of any of Examples 1-9, and wherein the classical computer and the quantum processor are connected by a network.

Example 11 includes the subject matter of any of Examples 1-10, and wherein at least one variable of the second set of one or more variables is different from at least one variable of the first set of one or more variables; or wherein at least one variable of the second set of one or more variables is the same as at least one variable of the first set of one or more variables.

Example 12 includes the subject matter of any of Examples 1-11, and further including a pre-processing unit configured to convert the optimization problem and a selected algorithm into a converted optimization problem, and a post-processing unit configured to convert an optimal solution of the converted optimization problem into a solution of the optimization problem; wherein the pre-processing unit and the post-processing unit are stored in the one or more non-transitory storage media and wherein the converted optimization problem is solved by the system to generate the optimal solution.

Example 13 includes the subject matter of any of Examples 1-12, and wherein the optimization problem is a machine learning problem and the selected algorithm is a machine learning algorithm.

Example 14 includes the subject matter of any of Examples 1-13, and further including an instruction unit configured to send instructions based on the optimal solution of the optimization problem, wherein the instruction unit is selected from a controller, a management system, a central management platform, an onsite management system, a display, a user interface, or any combination thereof.

Example 15 includes the subject matter of any of Examples 1-14, and wherein the current result of the first algorithm of the current result of the second algorithm comprises at least one updated parameter selected from a lower bound (LB), an upper bound (UP), an integer cut, a cutting plane, a partial optimal solution, an optimal solution, a feasible optimal solution, and/or any combination thereof.

Example 16 includes a method for solving optimization problems, the method comprising (i) initializing, by a classical computer, a plurality of parameters of an optimization problem, wherein the optimization problem has a first sub-problem comprising a first set of one or more variables and a second sub-problem comprising a second set of one or more variables, the first sub-problem to be solved by a first algorithm on the classical computer and the second sub-problem to be solved by a second algorithm on a quantum processor, the first set of one or more variables has at least one variable that is different from the second set of one or more variables and the second set of one or more variables has at least one variable that is different from the first set of one or more variables; (ii) executing the first algorithm for the first sub-problem with use of the classical computer to determine a current result of the first algorithm; (iii) executing the second algorithm for the second sub-problem with use of the quantum processor based on the current result of the first algorithm to determine a current result of the second algorithm; (iv) executing the first algorithm for the first sub-problem with use of the classical computer and with use of the current result of the second algorithm to determine the current result of the first algorithm; (v) repeating steps (iii) and (iv) one or more times.

Example 17 includes the subject matter of Example 16, and wherein the first algorithm is a relaxed mixed-integer linear programming (MILP) problem solver and the second algorithm is a quadratic unconstrained binary optimization (QUBO) problem solver.

Example 18 includes the subject matter of any of Examples 16 and 17, and wherein the optimization problem is a job-shop scheduling problem.

Example 19 includes the subject matter of any of Examples 16-18, and wherein the first algorithm is a dual linear programming (LP) problem solver and the second algorithm is a quadratic unconstrained binary optimization (QUBO) problem solver.

Example 20 includes the subject matter of any of Examples 16-19, and wherein the optimization problem is a cellular manufacturing problem.

Example 21 includes the subject matter of any of Examples 16-20, and wherein the optimization problem is an integer quadratic fractional program (IQFP) problem, wherein the first algorithm is an operation for assigning a value to a parameter and the second algorithm is a quadratic unconstrained binary optimization (QUBO) problem based on the parameter.

Example 22 includes the subject matter of any of Examples 16-21, and wherein the optimization problem is a vehicle routing problem.

Example 23 includes the subject matter of any of Examples 16-22, and wherein each variable of the second set of one or more variables is a binary variable.

Example 24 includes the subject matter of any of Examples 16-23, and wherein repeating steps (iii) and (iv) one or more times comprises repeating steps (iii) and (iv) one or more times until an optimal solution of the optimization problem is determined.

Example 25 includes the subject matter of any of Examples 16-24, and further including decomposing the optimization problem into the first sub-problem and the second sub-problem.

Example 26 includes the subject matter of any of Examples 16-25, and further including decomposing the first sub-problem or the second sub-problem into two or more sub-sub-problems.

Example 27 includes the subject matter of any of Examples 16-26, and wherein the original optimization problem is decomposed into at least two sub-problems manually or automatically by a pre-processing unit comprising a decomposer, and optionally a classifier and a library stored in a memory of the classical computer.

Example 28 includes the subject matter of any of Examples 16-27, and wherein the second algorithm is to solve a quadratic unconstrained binary optimization (QUBO) problem; and wherein the first algorithm is an optimization algorithm stored in the one or more non-transitory storage media configured to solve an optimization problem selected from a mixed-integer linear programming (MILP) problem, a relaxed mixed-integer linear programming (MILP) problem, a mixed-integer non-linear programming (MINLP) problem, a linear programming (LP), a non-linear programming (NLP) problem, a binary quadratic programming (BQP) problem, a mixed-integer quadratic programming (MIQP) problem, or a mixed-integer fractional programming (MIFP) problem.

Example 29 includes a method for solving optimization problems, the method comprising (i) providing an original optimization problem comprising an original objective function and optionally an original set of constraints; (ii) initializing, by a classical computer or input data from a user, a plurality of parameters of an optimization problem; (iii) decomposing the original optimization problem into at least two sub-problems comprising a first sub-problem to be solved by a first algorithm on the classical computer and a second sub-problem to be solved by a second algorithm on a quantum processor; (iv) executing the first algorithm for the first sub-problem with use of the classical computer to determine a current result of the first algorithm; (v) executing the second algorithm for the second sub-problem with use of the quantum processor based on the current result of the first algorithm to determine a current result of the second algorithm; (vi) executing the first algorithm for the first sub-problem with use of the classical computer and with use of the current result of the second algorithm to determine the current result of the first algorithm; (vii) repeating steps (v) and (vi) one or more times.

Example 30 includes a hybrid quantum computer-classical computer (QC-CC) based computation system comprising a quantum computer part comprises of a quantum processor configured to solve at least one type of optimization problem and a communication engine configured to control a first communication circuitry to send and/or receive data between the quantum computer and one or more classical computers optionally via a local or remote network; and a classical computer part comprises at least one classical processor, a communication engine, and at least one non-transitory computer readable storage medium to store at least one classical computation solver and optionally at least one computation problem decomposer, wherein the communication engine is configured control a second communication circuitry to send and/or receive data between the classical computer and the quantum computer and optionally between a local classical computer and other remote classical computers, wherein the classical computation solver comprises an optimization problem solver configured to solve at least one type of optimization problem, and wherein the computation problem decomposer is configured to decompose an optimization problem into at least two sub-problems comprising a first sub-problem and a second sub-problem; wherein at least one sub-problem or the first sub-problem is solvable by a quantum computer and wherein the quantum computer solves the at least one sub-problem or the first sub-problem by the quantum processor using a first algorithm and send a current result of the first algorithm to the classical computer via the communication engine of the quantum computer; and wherein the classical computer solves the rest of the sub-problems or the second sub-problem by the classical computation solver using a second algorithm to get a current result of the second algorithm; optionally, the quantum computer solves the at least one sub-problem or the first sub-problem in iteration 2 and send an updated current result of the first algorithm to the classical computer; and optionally the classical computer solves the rest of sub-problems or the second sub-problem in iteration 2 by the classical computation solver using the second algorithm to get an updated current result of the second algorithm; wherein the classical computer further generates an output based on the current result of the first algorithm and the current result of the second algorithm, or optionally based on the updated current result of the first algorithm and the updated current result of the second algorithm; wherein the output comprises an optimal result of the optimization problem.

Example 31 includes the subject matter of Example 30, and wherein the quantum computer further receives data based on or derived from the latest current result of the second algorithm, updates one or more parameters of the at least one of the sub-problems or the first sub-problem, and solves the at least one of the sub-problems or the first sub-problem in the iteration N+1 by the quantum processor using a first algorithm to generate an updated current result of the first algorithm and send the updated current result of the first algorithm to the classical computer via the communication engine of the quantum computer; wherein the classical computer further receives the updated current result of the first algorithm, updates one or more parameters of the rest of the sub-problems or the second sub-problem and further solves the rest of the sub-problems or the second sub-problem in the iteration N+1 by the classical computation solver using the second algorithm to generate an updated current result of the second algorithm; wherein N is a integer number of at least 1 (N≥1) and wherein N increases by one as iteration increases; and wherein the classical computer generates an output based on the latest current result of the second algorithm and optionally the latest current result of the first algorithm when a criteria is reached.

Example 32 includes the subject matter of any of Examples 30 and 31, and wherein the first sub-problem is an optimization problem comprises a first objective function, and the second sub-problem is an optimization problem comprises a second objective function; wherein the first objective function for the first sub-problem, the second objective function for the second sub-problem, and an original objective function for the optimization problem are different.

Example 33 includes the subject matter of any of Examples 30-32, and wherein the original objective function has a format of minimizing or maximizing the summation of function A and function B, and the computation problem decomposer configured to decompose the original the first objective function has a format of minimizing or maximizing the summation of function A and function f1, and the second objective function has a format of minimizing or maximizing the summation of function B and function f2, wherein the function f1 in the first objective function is related to the second sub-problem and is updated based on the current solution of the second algorithm in each iteration; and wherein the function f2 in the second objective function is related to the first sub-problem and is updated based on the current solution of the first algorithm; wherein the function A and function B comprise variables, and the function f1 and/or function f2 could be selected from zero, a value, a parameter or a function with at least one variable.

Example 34 includes the subject matter of any of Examples 30-33, and wherein the function f1 and function f2 are non-zero, and both function f1 and function f2 are updated in each iteration.

Example 35 includes the subject matter of any of Examples 30-34, and wherein either function f1 or function f2 is zero, and only one function of f1 and f2 is updated in each iteration.

Example 36 includes the subject matter of any of Examples 30-35, and wherein the function f1 or function f2 comprises one or more parameters, one or more variables, or a function comprises combinations of parameters and variables.

Example 37 includes the subject matter of any of Examples 30-36, and wherein the iteration N+1 increases to a finite number until a preset convergence criteria is reached.

Example 38 includes the subject matter of any of Examples 30-37, and wherein the preset convergence criteria is determined by at least a portion of the current result of the first algorithm and at least a portion of the current result of the second algorithm.

Example 39 includes the subject matter of any of Examples 30-38, and wherein the preset convergence is determined by a first data value derived from the latest current result of the first algorithm and a second data value derived from the latest current result of the second algorithm, wherein the difference or gap between the first data value and the second data value is smaller than a prespecified threshold value.

Example 40 includes the subject matter of any of Examples 30-39, and wherein an upper bound of an objective value determined by the current result of the first algorithm converges to a lower bound of the objective value determined by the current result of the second algorithm.

Example 41 includes the subject matter of any of Examples 30-40, and wherein a lower bound of an objective determined by the current result of the first algorithm converges to an upper bound of the objective determined by the current result of the second algorithm.

Example 42 includes the subject matter of any of Examples 30-41, and wherein the optimal result of the optimization problem is a global optimal solution when one or more local optimal solutions are feasible for the optimization problem.

Example 43 includes the subject matter of any of Examples 30-42, wherein the optimization problem is a mixed-integer linear programming (MILP) problem, a relaxed mixed-integer linear programming (MILP) problem, a mixed-integer non-linear programming (MINLP) problem, a linear programming (LP), a non-linear programming (NLP) problem, a binary quadratic programming (BQP) problem, a mixed-integer quadratic programming (MIQP) problem, or a mixed-integer fractional programming (MIFP) problem.

Example 44 includes the subject matter of any of Examples 30-43, and wherein the optimization problem is a mixed integer non-linear programming (MINLP) problem.

Example 45 includes the subject matter of any of Examples 30-44, and wherein the first sub-problem is selected from a mixed-integer linear programming (MILP) problem, a relaxed mixed-integer linear programming (MILP) problem, a mixed-integer non-linear programming (MINLP) problem, a linear programming (LP), a non-linear programming (NLP) problem, a binary quadratic programming (BQP) problem, a mixed-integer quadratic programming (MIQP) problem, or a mixed-integer fractional programming (MIFP) problem; and wherein the second sub-problem is a quadratic unconstrained binary optimization (QUBO) problem or an optimization problem solvable by a quantum computer or quantum processor directly or independently.

Example 46 includes the subject matter of any of Examples 30-45, and wherein the optimization problem comprises an original constraint set comprising an original list of constraints; the first sub-problem solvable by the quantum processor has no constraint set or a constraint set formulated as objective function; and the second sub-problem has a second constraint set comprising a second list of constraints wherein at least a portion of the second list of constraints directly come from or are derived from the original list of constraints.

Example 47 includes the subject matter of any of Examples 30-46, and wherein the optimization problem comprises an original constraint set comprising an original list of constraints; the first sub-problem solvable by the quantum processor has no constraint set or a constraint set formulated as objective function; wherein the second sub-problem has a second constraint set comprising a second list of constraints wherein at least a portion of the second list of constraints are directly come from or derived from the original list of constraints; and optionally wherein the number of constraints in the second list of constraints is more than the number of constraints in the original list of constraints or less than the number of constraints in the original list of constraints.

Example 48 includes the subject matter of any of Examples 30-47, and wherein a portion of the original constraints in the optimization problem are related to the first sub-problem and are reformulated into the objective function of the first sub-problem.

Example 49 includes the subject matter of any of Examples 30-48, and wherein the second sub-problem has a second list of constraints comprising a first portion of the second list of constraints directly come from or derived from an original list of constraints for the original optimization problem, and optionally a second portion of the second list of constraints related to the first sub-problems and updated based on the current solution of the first algorithm solved by the quantum processor in each iteration.

Example 50 includes the subject matter of any of Examples 30-49, and wherein the second portion of the second list of constraints are related to an integer cut, a cutting plane, a partial optimal solution, an optimal solution, a feasible optimal solution, one or more parameters for a second sub-problem, values or ranges for one or more variables for the second sub-problem or any combination thereof.

Example 51 includes the subject matter of any of Examples 30-50, and further comprising or links to an instruction unit configured to send instructions based on the optimal solution of the optimization problem.

Example 52 includes the subject matter of any of Examples 30-51, and wherein the instruction unit is selected from a controller, a management system, a central management platform, an onsite management system, a display, a user interface, or any combination thereof.

Example 53 includes a use of the hybrid QC-CC based computation system of example 30 comprises a user submits an optimization problem in a local classical computer, sends to a remote hybrid QC-CC based computation system of example 30 via a network, and the hybrid QC-CC based computation system generates computation results comprising an optimal solution of the optimization problem.

Example 54 includes a use of the hybrid QC-CC based computation system of example 53, wherein the computation results are sent back to the user's local classical computer or sent to one or more designated devices.

Example 55 includes the subject matter of Example 54, and wherein the computation results comprises an optimal solution of the optimization problem and the computation results are converted as instructions to control one or more target devices or systems.

Example 56 includes the subject matter of any of Examples 54 and 55, and wherein the instructions are substantially real-time, in time series, in dynamic or in static.

Example 57 includes the subject matter of any of Examples 54-56, and wherein the computation comprises one or more iterations, wherein each iteration comprises at least two phases comprising a first phase and a second phase; wherein the first phase comprises using the quantum computing system to solve the first sub-problem to generate results comprise a feasible solution for the first sub-problem; and wherein the second phase comprises using the classical computing system to receive results from the quantum computing system comprising a feasible solution; generate a first set of updated parameters based on the computation results of the first phase for updating parameters of the second phase computation; solve the second sub-problem in the second phase computation to generate an optimal result of the second sub-problem and optionally a second set of updated parameters based on the computation results of the second phase for updating parameters of the first phase computation.

Example 58 includes the subject matter of any of Examples 54-57, and wherein the first set of updated parameters and/or the second set of updated parameters comprises at least one updated parameter selected from a lower bound (LB), an upper bound (UP), an integer cut, a cutting plane, a partial optimal solution, an optimal solution, a feasible optimal solution, one or more parameters for a second sub-problem, values or ranges for one or more variables for the second sub-problem and/or any combination thereof.

Example 59 includes the subject matter of any of Examples 54-58, and wherein the optimization problem is a large scale optimization problem comprising at least 1,000 variables wherein the variables comprises integer variables and continuous variables.

Example 60 includes the subject matter of any of Examples 54-59, and wherein the optimization problem is a large scale optimization problem comprising at least 1,000 variables wherein the variables comprises integer variables and continuous variables.

Example 61 includes the subject matter of any of Examples 54-60, and wherein the optimization problem is solvable by the hybrid QC-CC based computation system within a computation time and is not solvable by only using classical computers and optimization solvers for classical computers within the computation time.

Example 62 includes the subject matter of any of Examples 54-61, and wherein the quantum computer and the classical computer are integrated into one local computer comprising a quantum processor and at least one classical processor.

Example 63 includes the subject matter of any of Examples 54-62, and wherein the quantum computer further comprising a classical processor to further decompose the at least one sub-problem or the first sub-problem into at least two sub-sub-problems and the quantum processor solves the sub-sub-problems in parallel, in sequence or in iterations in order to solve the at least one sub-problem or the first sub-problem; wherein the decomposition method used to get the sub-sub-problems is different from the decomposition method used to get the sub-problems.

Example 64 includes the subject matter of any of Examples 54-63, and wherein the decomposition method used to get the sub-sub-problems decompose a large QUBO problem into at least two smaller QUBO problems.

Example 65 includes the subject matter of any of Examples 54-64, and wherein the optimization problem can be derived from other problems comprising a machine learning problem, wherein the machine learning problem can be submitted to the hybrid QC-CC based computation system comprising a classical processor to convert or reformulate the machine learning problem into an optimization problem.

Example 66 includes the subject matter of any of Examples 54-65, and wherein the optimization problem is to determine a molecular conformation, a schedule, a manufacturing cell formation, a vehicle routing, a production plan or schedule, a production schedule, a drug design, a protein folding structure, or a transportation system plan.

Example 67 includes a method for solving a computation problem comprising (i) providing an original computation problem; (ii) initializing by a classical computer and/or input data from one or more users, a plurality of parameters of the original computation problem; (iii) decomposing the original computation problem into at least two sub-problems comprising a first sub-problem to be solved by a first algorithm on a quantum processor and a second sub-problem to be solved by a second algorithm on a classical processor; (iv) executing the first algorithm for the first sub-problem with use of the quantum processor to determine a current result of the first algorithm; (v) executing the second algorithm for the second sub-problem with use of the classical processor, and optionally with use of the current result of the first algorithm, to determine a current result of the second algorithm; (vi) executing the first algorithm for the first sub-problem with use of the quantum processor and with use of the current result of the second algorithm to determine an updated current result of the first algorithm; (vii) executing the second algorithm for the second sub-problem with use of the classical processor and with use of the current result of the first algorithm to determine an updated current result of the second algorithm; (viii) repeating steps (vi) and (vii) one or more times; (ix) generating a result for the original computation problem based on the latest current result of the second algorithm and optionally the latest current result of the first algorithm; (x) sending the result of the original computation problem to an instruction unit or a reporting unit.

Example 68 includes a method of example 67, wherein the repeat of steps (vi) and (vii) forms a loop between at least one classical processor and at least one quantum processor, wherein at least one parameter in the first sub-problem and/or at least one parameter the second sub-problem is updated in the loop in each iteration, wherein the parameter is selected from an upper bound, an lower bound, a parameter of an objective function of a sub-problem, a parameter of an constraint of a sub-problem, a partial solution, or any combination thereof.

Example 69 includes a method of example 67-68, further comprising decomposing the first sub-problem into at least two sub-sub-problems to be solved (directly or optionally by a third algorithm) on a quantum processor, wherein the sub-sub-problems are smaller than the first sub-problem; wherein the first algorithm, the second algorithm and optionally the third algorithm are different algorithms.

Example 70 includes a method of example 67-69, wherein the original computation problem, the first sub-problems and the second sub-problems are different optimization problems comprising different objective functions and/or different constraints.

Example 71 includes a method of example 67-70, wherein the original computation problem is a problem convertible to an optimization problem and the method further comprising reformulating or converting the original computation problem into an optimization problem; decomposing the optimization problem into at least two sub-problems comprising a first sub-problem to be solved by a first algorithm on a quantum processor and a second sub-problem to be solved by a second algorithm on a classical processor.

Example 72 includes a method of example 67-71, wherein the first algorithm is to solve a quadratic unconstrained binary optimization (QUBO) problem; and wherein the second algorithm is a optimization algorithm stored in a non-transitory computer readable medium of a classical computer system or hybrid QC-CC computation system configured to solve an optimization problem selected from a mixed-integer linear programming (MILP) problem, a relaxed mixed-integer linear programming (MILP) problem, a mixed-integer non-linear programming (MINLP) problem, a linear programming (LP), a non-linear programming (NLP) problem, a binary quadratic programming (BQP) problem, a mixed-integer quadratic programming (MIQP) problem, or a mixed-integer fractional programming (MIFP) problem.

Example 73 includes a method of example 67-72, further comprising identifying the type of the computation problem by a classification unit and a library stored in a non-transitory computer readable medium, automatically selecting and executing a decomposition method matching the type of the computation problem to decompose the computation problem into at least two sub-problems with the first sub-problem solvable by a quantum computer or a quantum processor.

Example 74 includes a method of example 67-73, further comprising automatically selecting the second algorithm from a library of multiple algorithms for a plurality of optimization problems by matching the type of the second sub-problem with the second algorithm.

Example 75 includes a method of example 67-74, wherein the first algorithm is a quadratic unconstrained binary optimization (QUBO) problem solver and the second algorithm is selected from a library of optimization solvers comprises a mixed-integer linear programming (MILP) problem solver, a MINLP problem solver, a LP problem solver, a NLP problem solver, a global optimization problem solver, or any combination thereof.

Example 76 includes a method of example 67-75, wherein the second algorithm is selected manually or automatically by a pre-processing unit or classification unit.

Example 77 includes the subject matter of Example 30-76, and wherein the first communication circuitry of the quantum computer part and the second communication circuitry of the classical computer part are separate or two communication circuitries.

Example 78 includes the subject matter of any of Examples 1-76, wherein at least a portion the first communication circuitry of the quantum computer part and at least a portion of the second communication circuitry of the classical computer part are the same or comprising shared circuitry portion in an integrated hybrid QC-CC computer.

Example 79 includes the subject matter of any of Examples 1-78, and wherein the original optimization problem has an original objective function having a format of minimizing or maximizing a function A and subjects to an original set of constraints; the first sub-problem has a first objective function having a format of minimizing or maximizing a function B and subjects to no constraint or a constraint set formulated as objective function, and the second sub-problem has second objective function having a format of minimizing or maximizing the function A and subjects to relaxed set of constraints wherein the relaxed set of constraints has a portion of the original set of constraints.

Example 80 includes the subject matter of any of Examples 1-79, and wherein the first sub-problem comprises a Hamiltonian represents a single objective function.

Example 81 includes the subject matter of any of Examples 1-80, and wherein the first sub-problem comprises at least two Hamiltonians, wherein a first Hamiltonian represents an objective function, and a second Hamiltonian represents at least a portion of constraints in the original optimization problem.

Example 82 includes the subject matter of any of Examples-1-81, and wherein the quantum computer part determines a lower bound of an optimal solution of the optimization problem and the classical computer part determines an upper bound of an optimal solution of the optimization problem in order to maximize an objective; or wherein the quantum computer part determines an upper bound of an optimal solution of the optimization problem and the classical computer part determines a lower bound of an optimal solution of the optimization problem in order to minimize an objective.

Example 83 includes a hybrid QC-CC computation system or a method, comprising a quantum computing system comprises a quantum processor to solve at least one type of optimization problems and a first communication circuitry configured to receive data from or send data to a classical computing system; and a classical computing system comprises a classical processor configured to perform classical computation, a second communication circuitry configured to send data to and receive data from a quantum computing system and optionally a second classical computing system, and at least one non-transitory computer readable storage medium to store data and algorithms; wherein the quantum computing system and the classical computing system, in combination, are configured to solve a computation problem by the steps of (a) using the classical computing system to decompose the computation problem, formulate the decomposed parts into two or more sub-problems and generate a first sub-problem part with at least one sub-problem solvable by the quantum computing system and a second sub-problem part with the rest of sub-problems solvable by the classical computing system; (b) using the quantum computing system to solve the first sub-problem part and send the computing results by the first communication circuitry to the classical computing system; (c) using the second communication circuitry to receive the computation results from the quantum computing system for the first sub-problem part; (d) using the classical computing system to solve the second sub-problem part and optionally send the computing results to the quantum computing system by the second communication circuitry; (e) executing at least one step from the steps of (f)-(g): (f) updating at least one parameter for the first sub-problem part based on the computation results from the second sub-problem part; and/or (g) updating at least one parameter for the second sub-problem part based on the computation results from the first sub-problem part; and (h) repeating the steps of (b)-(e) iteratively until reaching a preset convergence limit.

Example 84 includes the subject matter of any of examples 1-83, wherein an optimal solution of the optimization problem is determined by meeting a preset convergence criteria wherein a gap between a first value of the current result of the first algorithm in the latest iteration/repeat and a second value of the current result of the second algorithm in the latest iteration/repeat is less than a threshold value.

Example 85 includes the subject matter of any of examples 1-84, further comprising: a user interface locally integrated to or remotely connected to the computation system configured to input initialization values of the optimization problem and report computation result of the solved optimization problem wherein computation result comprising at least one optimized objective, and/or at least a portion of optimal values for variables associated with the optimized objective. Example 86 includes the subject matter of any of examples 1-85, wherein the classical computing system (e.g. the classical computer) is configured to receive a plurality of signals from a plurality of sensors (e.g. local or remote sensors through a network) as parameters or at least a portion of parameters in the optimization problem and to send the computation results (e.g. optimized objective and/or at least a portion of the optimal variables associated with the optimized objective) to one or more control systems, a central control platform or a control network system for controlling a plurality of actuators, vehicles or devices.

Example 87 includes the subject matter of any of examples 1-85, wherein the optimization problem is a molecular conformation problem, the optimized objective is a total potential energy, and the at least a portion of the optimal variables comprising optimized locations of atoms (or functional groups), bond lengths and/or bond angles or the combination thereof.

Example 88 includes the subject matter of any of examples 1-85, further comprising: a control system comprising at least one controller; a plurality of actuators controlled by the at least one controller and optionally a plurality of sensors or detectors; wherein the at least one controller is able communicatively coupled to the hybrid QC-CC system, and wherein the controller is configured to receive the computation results from the hybrid QC-CC system for an optimization problem of the control system and to send at least a portion of the optimal values of the variables to at least a portion of the actuators to control the system, optionally the sensors send signals to the QC-CC to initial at least a portion of parameters of the optimization problem. In some embodiments, the sensors comprise a vehicle sensor, the controller comprises a vehicle controller, and the actuator comprises a vehicle engine or motor. In some embodiments, the optimization problem is a vehicle routing problem and the optimal results computed by the hybrid QC-CC system are configured to control one or more vehicles to achieve best optimal solution. In some embodiments, one or more external devices comprise a plurality of sensors, wherein the sensors send signals or data to one or more classical computers, a control system and/or a central management platform which are communicatively coupled to a hybrid QC-CC system directly or indirectly, to initialize at least of portion of parameters for the computation problem (e.g. optimization problem), wherein the sensors are selected from a GPS sensor, a Inertial Measurement Units (IMU) sensor, an image sensor, a video sensor, a camera, an optical sensor, a radar, an acoustic sensor, a pressure sensor, a temperature sensor, a chemical sensor or any combination thereof.

Example 89 includes the subject matter of any of examples 1-88, further comprising: a plurality of sensors configured to sense one or more parameters and to output one or more signals corresponding to the one or more parameters to the control systems, wherein the control system is configured to send the one or more signals to the hybrid QC-classical system as at least one parameter for the optimization problem to generate optimal solutions for the optimization problem, wherein the one or more parameters includes at least one of an operational parameter, location parameter, a diagnostic parameter or a status parameter.

Example 90 includes the subject matter of any of examples 88-89, wherein the control system is a manufacturing system, a vehicle network controlling system, a fault detecting system, a scheduling system or a planning system.

Example 91 includes the subject matter of any of examples 88-90, wherein the at least one controller is a central controller or a discrete controller network.

Example 92 includes the subject matter of any of examples 1-85, wherein the optimization problem is reformulated into two or more sub-problems comprising a first part with at least one sub-problem solvable by the quantum computing system and a second part with at least one sub-problem solvable by the classical computing system, and wherein the optimization problem and/or the first part with at least one sub-problem comprises an optimization problem with no constraint.

Example 93 includes the subject matter of any of examples 1-85, wherein the at least one type of optimization sub-problem or the at least one sub-problem in the first part is a quadratic unconstrained binary optimization problem (QUBO) and wherein the second part with at least one sub-problem comprising one or more constraints.

Example 94 includes the subject matter of any of examples 1-85, wherein the optimization problem is reformulated or divided into two or more sub-problems by applying at least one decomposition algorithm.

Example 95 includes the subject matter of any of examples 1-94, wherein the optimization problem is formulated as a linear or non-linear optimization problem comprising at least one objective for optimization and optionally a set of constraints wherein the objective and/or the constraints comprising a plurality of integer variables and a plurality of continuous variables.

Example 96 includes the subject matter of any of examples 1-95, wherein the at least one sub-problem in the first part (e.g. first sub-problem) is different from the at least one sub-problem in the second part (e.g. second sub-problem).

Example 97 includes the subject matter of any of examples 1-95, wherein the first part with at least one sub-problem is not solvable by a classic computer and/or the second part with at least one sub-problem is not solvable by the quantum computing system. In some embodiments, the sub-problem solved by the classical computer or classical computing system is not solvable by the quantum computer or quantum computing system.

Example 98 includes the subject matter of any of examples 1-85, wherein the optimization problem is a large scale optimization problem comprising at least 1, at least 10, least 100, at least 1,000, at least 5,000, at least 10,000, at least 100,000, at least 1,000,000 integer variables, and/or at least 1, at least 10, at least 100, at least 1,000, at least 5,000, at least 10,000, at least 100,000, at least 1,000,000 continuous variables.

Example 99 includes the subject matter of any of examples 1-85, wherein the optimization problem is not solvable by a classical computing system independently in a computation time of less than 24 hours, less than one week, less than a month, or less than a year and/or wherein the optimization problem is not solvable by a quantum computer-only or quantum computing system-only in a computation time of less than 24 hours, less than one week, less than a month, or less than a year.

Example 100 includes the subject matter of any of examples 30-85, further comprising: an external system (e.g. a remote classical computer or a system in cloud) to assist the classical computing system to solve the second sub-problem (sub-problem not solvable by the quantum computer or quantum computing system);

Example 101 includes a hybrid QC-CC computation system to solve an optimization problem comprising: a quantum computing system comprising a quantum processor configured to solve at least one type of optimization problem or optimization sub-problem and to transmit solutions by a first communication circuitry via a local or remote network; and a classical computing system configured to perform classical computations and to communicate with the quantum computing system by a second communication circuitry via the local or remote network, wherein the quantum computing system and the classical computing system are configured to solve the optimization problem by performing the steps of: (a) decomposing the optimization problem into one or more sub-problems via the classical computing system, wherein each sub-problem is smaller than the original optimization problem and at least two sub-problems are different types of problems; (b) specifying, via the classical computing system, one or more sub-problems wherein at least one sub-problem is solvable by the quantum computing system; (c) sending, from the classical computing system, at least one sub-problem of the one or more sub-problems to the quantum computing system; (d) solving the at least one sub-problem via the quantum computing system; communicating, to the classical computing system, (e) computation results relating to the quantum computing system solution for the at least one sub-problem; (f) updating at least one parameter for the one or more sub-problems by the classical computing system based on the computation results from the at least one sub-problem solved by the quantum computing system; (g) sending the updated at least one sub-problem to the quantum computing system; and repeating the steps of (d)-(g) iteratively until reaching a preset convergence limit, wherein the preset convergence limit is a small enough number based on the optimization problem.

Example 102 includes a hybrid QC-CC computation system to solve an optimization problem comprising: a hybrid QC-CC system configured to solve an optimization problem comprising: a quantum computing system comprising a quantum processor; a classical computing system; at least one communication device (e.g. communication engine or communication circuitry) communicatively coupling the quantum computing system and the classical computing system; wherein the hybrid QC-CC system is configured to solve the optimization problem by performing the steps of: reformulating the optimization problem into two or more sub-problems via the classical computing system; generating the one or more sub-problems via the classical computing system, wherein at least one sub-problem is solvable by the quantum computing system; outputting the at least one sub-problem generated by the classical computing system to the quantum computing system via the communication device; solving the at least one sub-problem via the quantum computing system and outputting the result to the classical computing system via the communication device; and selecting at least one optimized objective and optimal values of the variables associated with the at least one optimized objective as at least one possible solution for the optimization problem by the classical computing system.

Example 103 includes the subject matter of any of examples 30-102, wherein the hybrid QC-CC system is further configured to, via the classical computing sub-system, decompose the one or more sub-problems for the quantum computing system into two or more sub-sub-problems with smaller computation sizes required of the quantum computing system and, via the quantum computing sub-system, iteratively or recursively compute results for the sub-sub-problems and to generate computation results for the one or more sub-problems.

Example 104 includes a method for molecular conformation design, the method comprising: establishing, by a quantum computing device, a classical computing device, a computation model (e.g. a mixed integer linear or mixed integer non-linear programming model, or the quadratic unconstrained binary optimization model) for a molecule that comprises a plurality of atoms or functional groups of atoms modeled as beads in a three-dimensional cubic lattice with a plurality of lattice sites with at least a set of constraints; splitting, by the classical computing device, the computation model (e.g. the quadratic unconstrained binary optimization model) into two or more sub-problems (e.g. two or more sub-quadratic unconstrained binary optimization models which are each expressed into a Chimera lattice of qubits on the quantum computing device); iteratively minimizing, by the quantum computing device, each of the sub-problems (e.g. sub-quadratic unconstrained binary optimization models) expressed as the Chimera lattices of qubits by selecting different variables associated with each pair of beads and in view of one or more constraints related to each of the pair of beads until a total potential energy of the sub-problems (e.g. sub-quadratic unconstrained binary optimization models) is minimized; and outputting, by the quantum computing device or a classical computing device communicatively coupled to the quantum computing device, an optimized location for each of the pair of the beads, a bond length between each of the pair of the beads, and/or a bond angle for each of the pair of the beads for the molecule associated with the minimized total potential energy.

Example 105 includes the subject matter of Example 104, wherein the different variables comprise different ones of the locations, bond lengths, and bond angles for each of the pairs of the beads.

Example 106 includes the subject matter of example 104-105, wherein the constraints comprise one or more of an assignment constraint, a bond length constraint, and a bond angle constraint.

Example 107 includes the subject matter of example 104-106, wherein the assignment constraint further comprises that each of the beads occupies exactly one of the lattice sites and that at most one of the beads occupies each of the lattice sites.

Example 108 includes the subject matter of example 104-107, wherein the bond length constraint further comprises a set allowable distance of the bond length between each of the pair of the beads.

Example 109 includes the subject matter of example 104-108, wherein the assignment constraint is modeled as a weight penalty function in the established quadratic unconstrained binary optimization model.

Example 110 includes a hybrid QC-classical system to solve molecular conformation problems or similar problems like protein folding comprising: a mixed-integer nonlinear or mixed integer linear programming model to optimize potential energy comprising at least one objective subject to at least one constraint comprising at least one parameter related to a molecule under test; a classical computing system configured to receive, via a user input device, a user input comprising at least one objective, at least one parameter related to the molecule under test, and/or at least one constraint, the classical computing system being further configured to implement the optimization models along with two or more sub-models (i.e. sub-problem) comprising one quadratic unconstrained binary optimization model; and a quantum computing system with a quantum processor configured to solve the quadratic unconstrained binary optimization models.

Example 111 includes the subject matter of example 110, further comprising a communication device to selectively connect to a local or remote network to transmit solutions with variable values and objective values.

Example 112 includes the subject matter of example 110-111, wherein the binary quadratic program is initialized using structural and functional data from molecular data banks which is acquired through molecular simulations or experiments.

Example 113 includes the subject matter of example 110-112, transmits to a user, via a cloud-based communication pathway, the values of the different variables comprising ones of the locations, bond lengths, and bond angles for each pair of beads.

Example 114 includes a method for job-shop scheduling, the method comprising: establishing, by a quantum processor in a quantum computing device, a non-quantum processor in a classical computing device, a mixed integer linear or mixed integer non-linear programming model to schedule a plurality of jobs on a plurality of machines with at least a set of constraints; iteratively determining, by the non-quantum processor in the classical computing device, at least a partial solution using a relaxed mixed integer linear programming problem; iteratively applying, by the quantum processor in the quantum computing device, a Hamiltonian function on the determined partial solution to obtain an updated solution; identifying, by non-quantum processor in the classical computing device, in the updated solution any sets of jobs which cannot be performed on any of the machines; adding, by the classical computing device, one or more corresponding integer cuts in the mixed integer linear programming function and repeating the iteratively determining, the iteratively applying, and the identifying until the updated solution does not have any sets of jobs which cannot be performed on any of the machines; and outputting, by the quantum computing device, the updated solution for the jobs on the machines.

Example 115 includes the subject matter of example 114, further comprising transmitting, by the classical computing device, a notification that the partial solution is infeasible when the iteratively determining is unable to provide at least the partial solution.

Example 116 includes the subject matter of example 114-115, wherein the set of constraints comprises one or more of an assignment constraint, a due date constraint, a release date constraint, a sequencing constraint, or any combination thereof.

Example 117 includes the subject matter of example 114-115, further comprising transmitting, by the classical computing device, a notification that the partial solution is infeasible when the iteratively determining is unable to provide at least the partial solution.

Example 118 includes the subject matter of example 114-117, wherein the set of constraints comprises one or more of an assignment constraint, a due date constraint, a release date constraint, or a sequencing constraint.

Example 119 includes the subject matter of example 114-118, wherein the assignment constraint ensures that each of the plurality of jobs is processed by a single one of the plurality of machines.

Example 120 includes the subject matter of example 114-119, wherein the due date constraint ensures that each of the plurality of jobs is processed by a corresponding one of the due dates for each of the plurality of jobs.

Example 121 includes the subject matter of example 114-119, wherein the release date constraint ensures that each of the plurality of jobs is processed after a corresponding one of the release dates for each of the plurality of jobs.

Example 122 includes the subject matter of example 114-121, wherein the sequencing constraint ensures with respect to two or more of the jobs assigned to one of the plurality of machines a sequential completion to finish of these jobs.

Example 123 includes the subject matter of example 114-122, wherein the sequencing constraint ensures based on a logic relationship one of the plurality of jobs is processed after another one of the plurality of jobs irrespective of the assignment to one or more of the plurality of machines.

Example 124 includes a hybrid QC-classical system to solve job-shop scheduling problems comprising: a mixed-integer linear or mixed integer nonlinear programming model to determine an optimal schedule of each of a plurality of jobs on one of a plurality of machines; a classical computing system configured to receive, via a user input device, at least one parameter related to the jobs and machines processing times and costs and at least one constraint, the classical computing system being further configured to store the optimization models along with two or more decomposed optimization sub-models comprising at least one quadratic unconstrained binary optimization model; and a quantum computing system with a quantum processor configured to minimize the quadratic unconstrained binary optimization model.

Example 125 includes the subject matter of example 124, further comprising a communication system operatively connecting the classical computing system and the quantum computing system.

Example 126 includes the subject matter of example 124-125, wherein the mixed-integer linear (or non-linear) programming model is initialized using data obtained through available orders, jobs, machines, and other relevant process components.

Example 127 includes the subject matter of example 124-125, wherein one sub-model is a relaxed mixed-integer linear (or non-linear) programming model and is solved with the classical computing system.

Example 128 includes the subject matter of example 124-125, wherein a sequence for plurality of jobs on one of the plurality of machines is determined through the quantum subsystem by minimizing a Hamiltonian function comprising the quadratic unconstrained binary optimization model.

Example 129 includes the subject matter of example 127, wherein the integer cuts are formulated and added to the relaxed mixed-integer linear program by the classical computing system using incorrect assignments that are determined by the quantum computing system.

Example 130 includes the subject matter of example 128-129, wherein an objective value and job-machine assignments are output by the classical computing system and the optimal schedule of jobs output by the quantum computing system.

Example 131 includes a method for forming manufacturing cells, the method comprising: establishing, by a quantum processor in a quantum computing device, a non-quantum processor in a classical computing device, a mixed-integer linear or mixed-integer nonlinear programming model to group a plurality of parts and a plurality of machines into a plurality of cells with at least a set of constraints; iteratively determining, by the non-quantum processor in the classical computing device, at least a partial cell formation solution using the dual linear programming problem; iteratively applying, by the quantum processor in the quantum computing device, a Hamiltonian objective function on the determined partial cell formation solution and a Hamiltonian constraint function on at least one of the constraints to obtain an updated cell formation solution; identifying, by the non-quantum processor in the classical computing device, in the updated cell formation solution whether the lower bound on the optimal value if greater than or equal to an upper bound on optimal value of the objective function; updating, by the quantum computing device, one or more machine assignments in the dual linear programming problem and repeating the iteratively determining, the iteratively applying, and the identifying until the updated cell formation solution have lower bound higher than the upper bound on the objective function value; and outputting, by the hybrid quantum computing device, the updated cell formation solution for the parts and machines.

Example 132 includes the subject matter of example 131, further comprising transmitting, by the classical computing device, a notification that the partial cell formation solution is infeasible when the iteratively determining is unable to provide at least the partial cell formation solution.

Example 133 includes the subject matter of example 131, wherein the set of constraints comprises one or more of an assignment constraint and an operational constraint.

Example 134 includes the subject matter of example 131, wherein the assignment constraint ensures that each of the machines is assigned to only one of the cells.

Example 135 includes the subject matter of example 131, wherein the assignment constraint ensures that each of the parts is assigned to one of the cells.

Example 136 includes a hybrid QC-classical system to solve manufacturing cell formation problems comprising: a mixed-integer nonlinear or mixed-integer linear programming model to determine an optimal division of each of a plurality of parts and each of a plurality of machines into plurality of manufacturing cells; a classical computing system configured to receive, via a user input device, at least one objective, at least one parameter related to the parts and machines processing costs, and at least one constraint, the classical computing system being further configured to store on a memory device quadratic unconstrained binary optimization models along with two or more sub-quadratic unconstrained binary optimization models; and a quantum computing system with a quantum processor to minimize the quadratic unconstrained binary optimization models.

Example 137 includes the subject matter of example 136, further comprising a communication system selectively connecting the classical computing system and the quantum computing system.

Example 138 includes the subject matter of example 136, wherein the mixed-integer quadratic program is initialized using plant data acquired from the manufacturing plant.

Example 139 includes the subject matter of example 136, wherein the assignment of one of the plurality of machines to one of the plurality of manufacturing cells is determined through the quantum subsystem by minimizing the Hamiltonian functions comprising of the quadratic unconstrained binary optimization model.

Example 140 includes the subject matter of example 136, wherein the machine assignments and lower bound on the objective function value are updated and added to a dual linear program by the classical computing system using obtained machine assignments that are determined by the quantum computing system.

Example 141 includes the subject matter of example 136, wherein the objective value and parts assignments to manufacturing cells are output by the classical computing system, and wherein the machine assignments are output by the quantum computing system.

Example 142 includes a method for scheduling vehicle routing, the method comprising: establishing, by a quantum processor in a quantum computing device, a non-quantum processor in a classical computing device, a mixed integer non-linear or mixed-integer linear programming model to schedule a plurality of vehicles on a plurality of routes with at least a set of constraints; iteratively solving, by the quantum processor in the quantum computing device, a Hamiltonian objective function on the integer quadratic programming function and a Hamiltonian constraint function on at least one of the constraints to obtain an routing solution; and iteratively updating, by the non-quantum processor in the classical computing device, the value of control parameter until convergence is reached; outputting, by the quantum computing device, the routing solution for the vehicles.

Example 143 includes the subject matter of example 142, further comprising transmitting, by the quantum computing device, a notification that the routing solution is infeasible when the iteratively applying indicates there the routing solution is infeasible.

Example 144 includes the subject matter of example 142, wherein the integer quadratic fractional programming model comprises a model of total travelling costs of vehicles divided by total working time to serve all customer locations.

Example 145 includes the subject matter of example 142, wherein the set of constraints comprises one or more of an operational constraint and a cost constraint.

Example 146 includes the subject matter of example 145, wherein the operational constraint comprises ensures each of the customers is visited and serviced only once by only one of the vehicles.

Example 147 includes the subject matter of example 145, wherein the operational constraint comprises ensures that one of the vehicles leaving one of the customers must either leave for another one of the customers or return to a depot.

Example 148 includes a hybrid QC-classical system to solve vehicle routing and scheduling problems comprising: a mixed-integer linear or mixed-integer nonlinear programming model to determine an optimal set of routes for each of the plurality of vehicles to service each of the plurality of customer locations. a quantum computing system with a quantum processor to minimize the quadratic unconstrained binary optimization models and to transmit solutions or data relating to solutions over a communication pathway via at least one of a local or remote network; a classical computing system configured to receive, via a user input device, at least one objective, at least one parameter related to the vehicle travelling costs and customer service times, and/or at least one constraint, the classical computing system being further configured to store on a physical storage medium the quadratic unconstrained binary optimization models along with two or more sub-quadratic unconstrained binary optimization models.

Example 149 includes the subject matter of example 148, wherein the integer quadratic fractional program is initialized using order data from customers and vehicular data available beforehand or collected in real-time, the control parameter is also initialized to numerical value zero.

Example 150 includes the subject matter of example 148, wherein the assignment of one of the plurality of vehicles to one of the plurality of customers is determined through the quantum subsystem by minimizing Hamiltonian functions comprising of the quadratic unconstrained binary optimization model.

Example 151 includes the subject matter of example 148, wherein the numerical value of control parameter is updated and added to the Hamiltonian function by the classical computing system using obtained optimal routes that are determined by the quantum computing system.

Example 152 includes the subject matter of example 148, wherein the objective value and vehicle assignments to customers are output by the quantum computing system to the classical computing system, or to an external system, via a communication system, after the tolerance criteria is satisfied. Example 153 includes the subject matter of example 1-152, further comprising a decomposition unit configured to decompose the optimization problem into one or more discrete-variable-rich sub-problems and one or more continuous-variable-rich sub-problems based on the structure and variables of the optimization problem by one or more decomposition algorithm selected from a library comprising a list of decomposition algorithms and instructions.

Example 154 includes the subject matter of example 1-153, wherein the decomposition algorithm comprises an algorithm selected from Dantzig-Wolfe decomposition, Benders decomposition, Generalized Benders decomposition, Lagrange an decomposition, Bilevel decomposition algorithm, Parametric method based reformulation and decomposition, or any combination or derived algorithm thereof Example 155 includes the subject matter of example 1-154, wherein one or more decomposition algorithm is selected from a decomposition algorithm library comprising a list of decomposition algorithms and decomposition instructions, and decompose the optimization problem into two or more sub-problems, wherein the decomposition instructions comprise categories of optimization problems classified based on the structure and variables, suitable decomposition algorithms matching each category of optimization problems, and resulting types of sub-problems after decomposition.

What is claimed is:

1. A system for solving optimization problems, the system comprising:
a classical computer comprising a classical processor and one or more non-transitory storage media comprising a plurality of instructions that, when executed, cause the classical computer to:
initialize a plurality of parameters of an optimization problem, wherein the optimization problem is decomposed into a first sub-problem to be solved by a first algorithm on the classical computer and a second sub-problem to be solved by a second algorithm utilizing quantum computing processing, wherein the first sub-problem has a first set of one or more variables and the second sub-problem has a second set of one or more variables, wherein at least one variable of the second set of one or more variables is different from the variables of the first set of one or more variables and wherein at least one variable of the first set of one or more variables is different from the variables of the second set of one or more variables;

execute the first algorithm for the first sub-problem with use of the classical computer to determine a current result of the first algorithm; and further comprising a quantum processor to execute the second algorithm for the second sub-problem with use of the quantum processor based on the current result of the first algorithm to determine a current result of the second algorithm;

wherein the plurality of instructions further cause the classical computer to execute the first algorithm for the first sub-problem with use of the classical computer and with use of the current result of the second algorithm to determine the current result of the first algorithm;

wherein the classical computer and the quantum processor are configured to repeat the execution of the first algorithm based on the current result of the second algorithm and repeat execution of the second algorithm based on the current result of the first algorithm, respectively, one or more times; and wherein the second algorithm comprises a quadratic unconstrained binary optimization (QUBO) problem solver.

2. The system of claim 1, wherein the first algorithm is a relaxed mixed-integer linear programming (MILP) problem solver.

3. The system of claim 2, wherein the optimization problem is a job-shop scheduling problem.

4. The system of claim 1, wherein the first algorithm is a dual linear programming (LP) problem solver.

5. The system of claim 4, wherein the optimization problem is a cellular manufacturing problem.

6. The system of claim 1, wherein the optimization problem is an integer quadratic fractional program (IQFP) problem, and wherein the first algorithm is an operation for assigning a value to a parameter and the second algorithm is configured to solve a QUBO problem based on the parameter.

7. The system of claim 6, wherein the optimization problem is a vehicle routing problem.

8. The system of claim 1, wherein each variable of the second set of one or more variables is a binary variable.

9. The system of claim 1, wherein the classical computer and the quantum processor are configured to repeat the execution of the first algorithm based on the current result of the second algorithm and repeat execution of the second algorithm based on the current result of the first algorithm, respectively, one or more times until an optimal solution of the optimization problem is determined.

10. The system of claim 9, wherein the optimal solution of the optimization problem is determined by meeting a preset convergence criteria wherein a gap between a first value of the current result of the first algorithm in the latest repeat and a second value of the current result of the second algorithm in the latest repeat is less than a threshold value.

11. The system of claim 1, wherein the classical computer and the quantum processor are connected by a network.

12. The system of claim 1, further comprising a pre-processing unit configured to convert the optimization problem and a selected algorithm into a converted optimization problem, and a post-processing unit configured to convert an optimal solution of the converted optimization problem into a solution of the optimization problem; wherein the pre-processing unit and the post-processing unit are stored in the one or more non-transitory storage media and wherein the converted optimization problem is solved by the system to generate the optimal solution.

13. The system of claim 12, wherein the optimization problem is a machine learning problem and the selected algorithm is a machine learning algorithm.

14. The system of claim 1, further comprising an instruction unit configured to send instructions based on a determined optimal solution of the optimization problem, wherein the instruction unit is selected from a controller, a management system, a central management platform, an onsite management system, a display, a user interface, or any combination thereof.

15. The system of claim 1, wherein the current result of the second algorithm comprises at least one updated parameter selected from a lower bound (LB), an upper bound (UP), an integer cut, a cutting plane, a partial optimal solution, an optimal solution, a feasible optimal solution, and/or any combination thereof.

16. The system of claim 1, wherein the first set of one or more variables is continuous variable rich and the second set of one or more variables is discrete variable rich.

17. A method for solving optimization problems, the method comprising:
(i) initializing, by a classical computer, a plurality of parameters of an optimization problem, wherein the optimization problem has a first sub-problem comprising a first set of one or more variables and a second sub-problem comprising a second set of one or more variables, the first sub-problem to be solved by a first algorithm on the classical computer and the second sub-problem to be solved by a second algorithm on a quantum processor, the first set of one or more variables has at least one variable that is different from the second set of one or more variables and the second set of one or more variables has at least one variable that is different from the first set of one or more variables;
(ii) executing the first algorithm for the first sub-problem with use of the classical computer to determine a current result of the first algorithm;
(iii) executing the second algorithm for the second sub-problem with use of the quantum processor based on the current result of the first algorithm to determine a current result of the second algorithm;
(iv) executing the first algorithm for the first sub-problem with use of the classical computer and with use of the current result of the second algorithm to determine the current result of the first algorithm; and
(v) repeating steps (iii) and (iv) one or more times;
wherein the second algorithm comprises a quadratic unconstrained binary optimization (QUBO) problem solver.

18. The method of claim 17, wherein the first algorithm is a relaxed mixed-integer linear programming (MILP) problem solver.

19. The method of claim 18, wherein the optimization problem is a job-shop scheduling problem.

20. The method of claim 17, wherein the first algorithm is a dual linear programming (LP) problem solver.

21. The method of claim 20, wherein the optimization problem is a cellular manufacturing problem.

22. The method of claim 17, wherein the optimization problem is an integer quadratic fractional program (IQFP) problem, wherein the first algorithm is an operation for assigning a value to a parameter and the second algorithm is configured to solve a QUBO problem based on the parameter.

23. The method of claim 22, wherein the optimization problem is a vehicle routing problem.

24. The method of claim 17, wherein each variable of the second set of one or more variables is a binary variable.

25. The method of claim 17, wherein repeating steps (iii) and (iv) one or more times comprises repeating steps (iii) and (iv) one or more times until an optimal solution of the optimization problem is determined.

26. The method of claim 17, further comprising decomposing the optimization problem into the first sub-problem and the second sub-problem.

27. The method of claim 26, further comprising decomposing the first sub-problem or the second sub-problem into two or more sub-sub-problems.

28. The method of claim 17, wherein the original optimization problem is decomposed into at least two sub-problems manually or automatically by a pre-processing unit comprising a decomposer, and optionally a classifier and a library stored in a memory of the classical computer.

29. The method of claim 17, wherein the first set of one or more variables is continuous variable rich and the second set of one or more variables is discrete variable rich.

30. A method for solving optimization problems, the method comprising:
(i) initializing, by a classical computer, a plurality of parameters of an optimization problem, wherein the optimization problem has a first sub-problem comprising a first set of one or more variables and a second sub-problem comprising a second set of one or more variables, the first sub-problem to be solved by a first algorithm on the classical computer and the second sub-problem to be solved by a second algorithm on a quantum processor, the first set of one or more variables has at least one variable that is different from the second set of one or more variables and the second set of one or more variables has at least one variable that is different from the first set of one or more variables;
(ii) executing the first algorithm for the first sub-problem with use of the classical computer to determine a current result of the first algorithm;
(iii) executing the second algorithm for the second sub-problem with use of the quantum processor based on the current result of the first algorithm to determine a current result of the second algorithm;
(iv) executing the first algorithm for the first sub-problem with use of the classical computer and with use of the current result of the second algorithm to determine the current result of the first algorithm; and
(v) repeating steps (iii) and (iv) one or more times;
wherein the second algorithm is configured to solve a quadratic unconstrained binary optimization (QUBO) problem; and
wherein the first algorithm is an optimization algorithm stored in one or more non-transitory storage media and configured to solve the optimization problem, the optimization problem comprising at least one of a mixed-integer linear programming (MILP) problem, a relaxed mixed-integer linear programming (MILP) problem, a mixed-integer non-linear programming (MINLP) problem, a linear programming (LP), a non-linear programming (NLP) problem, a binary quadratic programming (BQP) problem, a mixed-integer quadratic programming (MIQP) problem, and a mixed-integer fractional programming (MIFP) problem.

31. A system for solving optimization problems, the system comprising:
a classical computer comprising a classical processor and one or more non-transitory storage media comprising a plurality of instructions that, when executed, cause the classical computer to:
initialize a plurality of parameters of an optimization problem, wherein the optimization problem is decomposed into a first sub-problem to be solved by a first algorithm on the classical computer and a second sub-problem to be solved by a second algorithm utilizing quantum computing processing, wherein the first sub-problem has a first set of one or more variables and the second sub-problem has a second set of one or more variables, wherein at least one variable of the second set of one or more variables is different from the variables of the first set of one or more variables and wherein at least one variable of the first set of one or more variables is different from the variables of the second set of one or more variables;
execute the first algorithm for the first sub-problem with use of the classical computer to determine a current result of the first algorithm; and
further comprising a quantum processor to execute the second algorithm for the second sub-problem with use of the quantum processor based on the current result of the first algorithm to determine a current result of the second algorithm;
wherein the plurality of instructions further cause the classical computer to execute the first algorithm for the first sub-problem with use of the classical computer and with use of the current result of the second algorithm to determine the current result of the first algorithm;
wherein the classical computer and the quantum processor are configured to repeat the execution of the first algorithm based on the current result of the second algorithm and repeat execution of the second algorithm based on the current result of the first algorithm, respectively, one or more times;
wherein the second algorithm is configured to solve a quadratic unconstrained binary optimization (QUBO) problem; and
wherein the first algorithm is an optimization algorithm configured to solve the optimization problem, the optimization problem comprising at least one of a mixed-integer linear programming (MILP) problem, a relaxed mixed-integer linear programming (MILP) problem, a mixed-integer non-linear programming (MINLP) problem, a linear programming (LP), a non-linear programming (NLP) problem, a binary quadratic programming (BQP) problem, a mixed-integer quadratic programming (MIQP) problem, and a mixed-integer fractional programming (MIFP) problem.

* * * * *